United States Patent
Leo

(10) Patent No.: US 11,528,855 B2
(45) Date of Patent: Dec. 20, 2022

(54) CANNABIS FARMING METHODS

(71) Applicant: Daniel Michael Leo, Baltimore, MD (US)

(72) Inventor: Daniel Michael Leo, Baltimore, MD (US)

(73) Assignee: INSECTERGY, LLC, Baltimore, MD (US)

( * ) Notice: Subject to any disclaimer, the term of this patent is extended or adjusted under 35 U.S.C. 154(b) by 398 days.

(21) Appl. No.: 16/827,579

(22) Filed: Mar. 23, 2020

(65) Prior Publication Data
US 2020/0229359 A1 Jul. 23, 2020

Related U.S. Application Data

(63) Continuation of application No. 15/609,472, filed on May 31, 2017, now Pat. No. 10,595,474.

(51) Int. Cl.
| | |
|---|---|
| A01G 22/00 | (2018.01) |
| A01G 7/02 | (2006.01) |
| A01G 9/24 | (2006.01) |
| A01G 9/029 | (2018.01) |
| A01G 24/40 | (2018.01) |
| A01G 31/06 | (2006.01) |
| A23N 15/00 | (2006.01) |
| A01C 23/04 | (2006.01) |
| C05B 17/00 | (2006.01) |
| C05C 11/00 | (2006.01) |
| C05D 1/00 | (2006.01) |
| C05D 3/00 | (2006.01) |
| C05D 5/00 | (2006.01) |
| C05D 9/00 | (2006.01) |
| C05G 1/00 | (2006.01) |
| A01G 24/30 | (2018.01) |
| A23L 33/10 | (2016.01) |

(52) U.S. Cl.
CPC ............... *A01G 22/00* (2018.02); *A01G 7/02* (2013.01); *A01G 9/0297* (2018.02); *A01G 9/246* (2013.01); *A01G 9/247* (2013.01); *A01G 9/249* (2019.05); *A01G 24/30* (2018.02); *A01G 24/40* (2018.02); *A01G 31/06* (2013.01); *A23L 33/10* (2016.08); *A23N 15/00* (2013.01); *C05B 17/00* (2013.01); *C05C 11/00* (2013.01); *C05D 1/00* (2013.01); *C05D 3/00* (2013.01); *C05D 5/00* (2013.01); *C05D 9/00* (2013.01); *C05G 1/00* (2013.01); *A01C 23/042* (2013.01)

(58) Field of Classification Search
None
See application file for complete search history.

(56) References Cited

U.S. PATENT DOCUMENTS

| | | | |
|---|---|---|---|
| 2006/0123699 A1* | 6/2006 | Lo Presti | A01G 9/246 47/17 |
| 2016/0212948 A1* | 7/2016 | McGuire | C02F 9/00 |

OTHER PUBLICATIONS

Lindblom, J., et al., WIT Transactions on Ecology and the Environment, "Subsurface Irrigation By Condensation Of Humid Air," 96:181. (Year: 2006).*

Dorais, M., et al., Impact of water quality and irrigation management on organic greenhouse horticulture. BioGreenhouse COST Action FA 1105, www.biogreenhouse.org. (Year: 2016).*

* cited by examiner

Primary Examiner — Michael Barker

(57) ABSTRACT

A method to grow *cannabis* is described, wherein the method includes providing and treating a source of water, mixing the water with an additive to form a liquid mixture, transferring the liquid mixture to a plurality of *cannabis* plants grown in a growing medium including a mycorrhiza fungus, and growing the *cannabis* using a humidity control method, then harvesting the *cannabis* plants. Trimming and grinding the *cannabis* along with use of environmental control methods including temperature, humidity, lighting schedules, and carbon dioxide concentrations are also described.

27 Claims, 17 Drawing Sheets

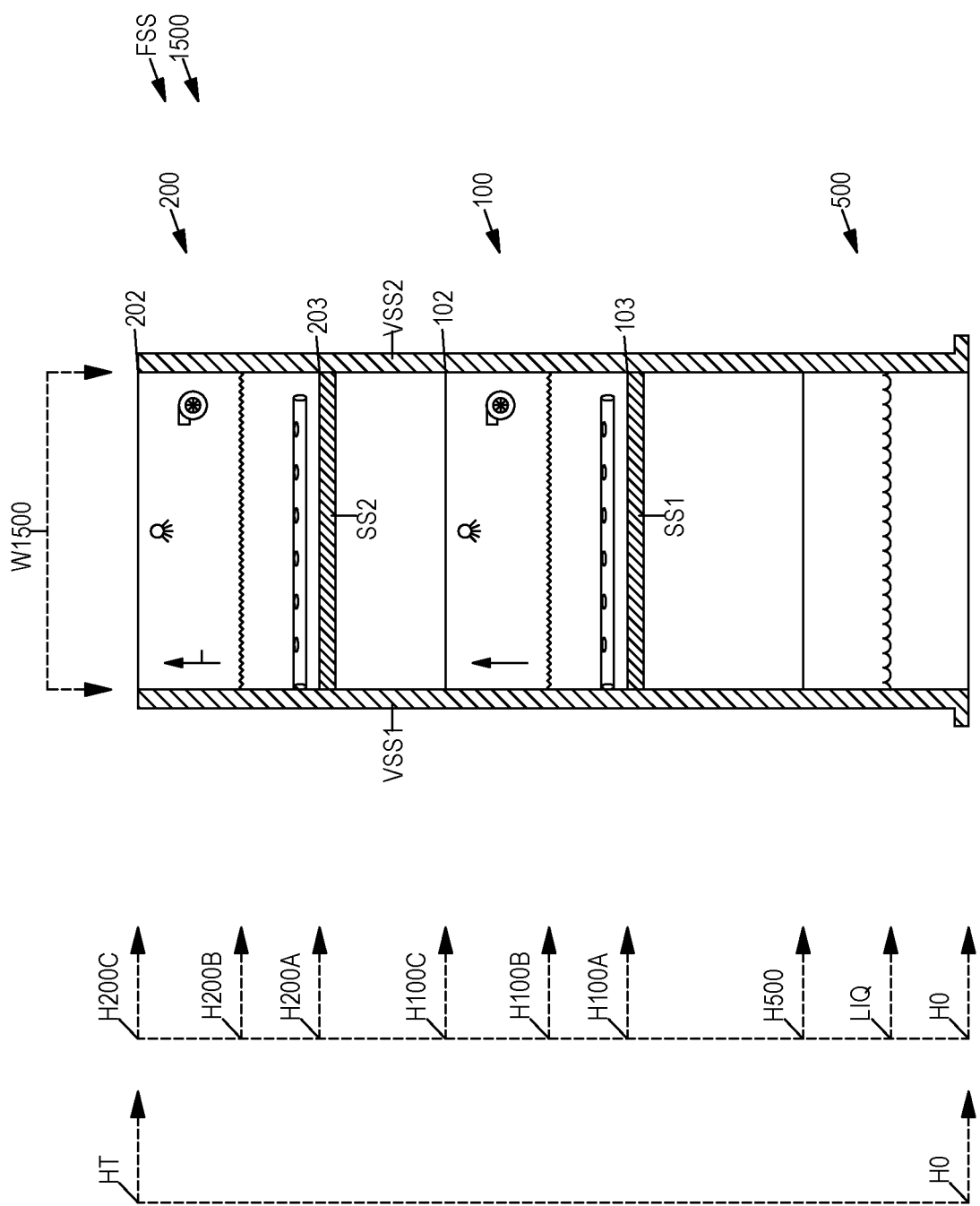

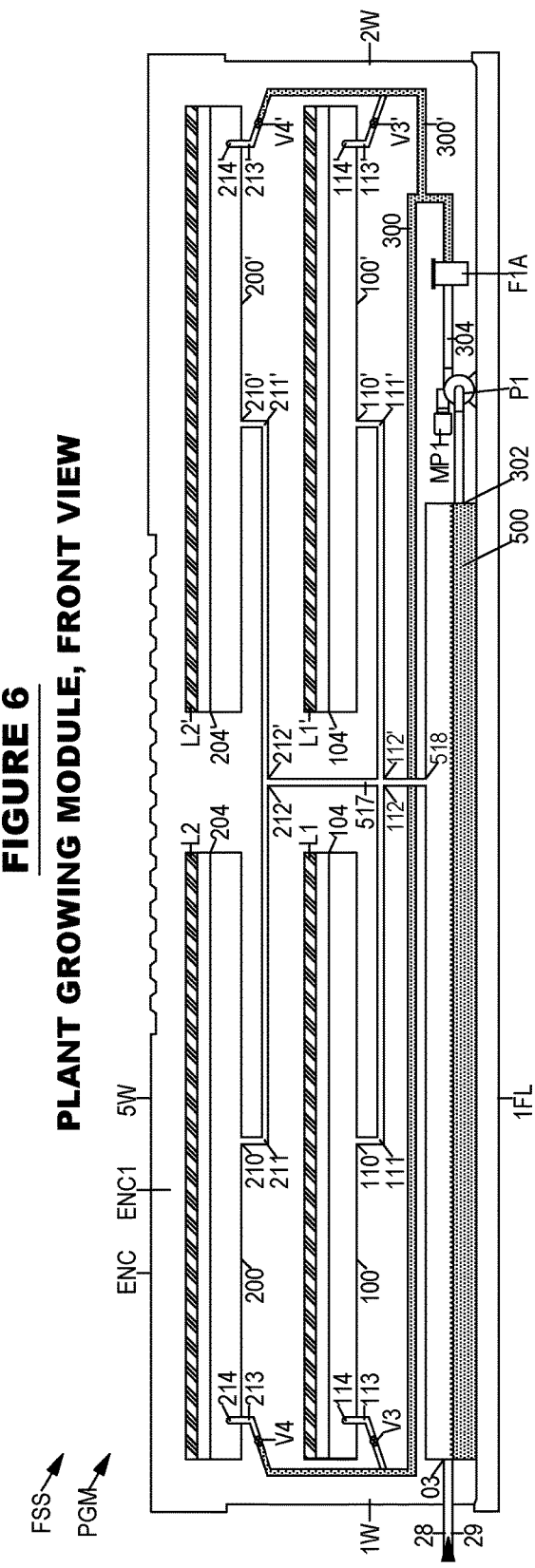
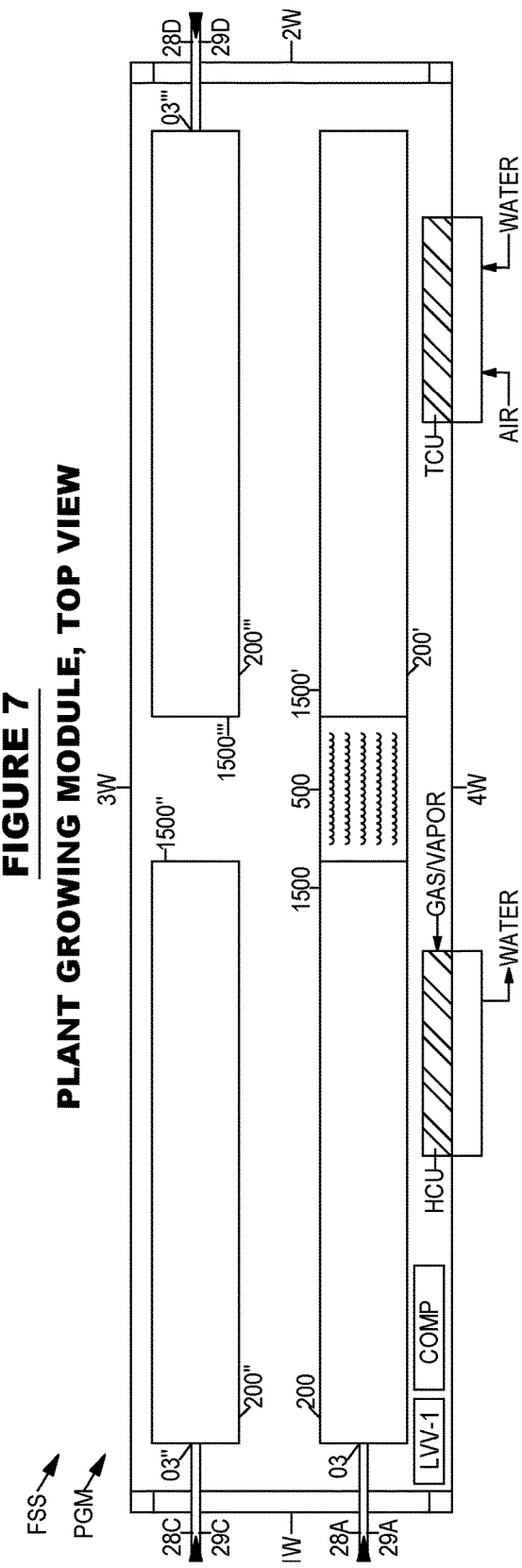

PLANT GROWING MODULE, SIDE VIEW

LIQUID DISTRIBUTION MODULE, FRONT VIEW

SOLUTION MIXING MODULE, TOP VIEW

LIQUID DISTRIBUTION MODULE, SIDE VIEW

CANNABIS GRINDING**

MULTIFUNCTIONAL COMPOSITION MIXING MODULE

CANNABIS FARMING METHODS

RELATED APPLICATIONS

This application is a Continuation now patented patent application Ser. No. 15/609,472, U.S. Pat. No. 10,595,474, filed on May 31, 2017, and issued on Mar. 24, 2020. The contents of the aforementioned applications are incorporated by reference in their entirety.

TECHNICAL FIELD

The present disclosure relates to improvements to *cannabis* farming systems and methods.

BACKGROUND

Efficient, reliable, and consistent, computer-operated *cannabis* farming systems and methods are needed to meet the *cannabis* production demands of society. In recent years, there has been an increasing demand for *cannabis* for medicinal or recreational use. Large-scale *cannabis* farming systems must be designed responsibly to minimize environmental impact, reduce manual labor and human interaction, and automate the system as much as possible while maximizing plant growth. These systems must be precisely sized and situated to be able to provide systematically timed and controlled computer-operated methods to maintain a sufficient amount of water and nutrients for the *cannabis* at a precise temperature, humidity level, pH, oxygen and/or carbon dioxide level, air velocity, and light wavelength and schedule. A need exists for *cannabis* farming facilities that maximize plant production on a small physical outlay while providing adequate space for high-density plant growth all at an economically attractive cost.

The ability to grow *cannabis* with minimal human interaction has been long regarded as desirable and needed to facilitate widespread use for human consumption and for the production of food. It is of importance that large-scale, standardized, modular, easily manufacturable, energy efficient, reliable, computer-operated *cannabis* farming systems and facilities are extensively deployed to produce *cannabis* for medicinal and recreation use with minimal water and environmental impact.

There is a need for *cannabis* farming facilities to employ systems and methods that can clean and decontaminate water from harsh and unpredictable sources and provide a clean water source suitable to feed and grow *cannabis*. There is a need to re-use old containerized shipping containers to promote the implementation of widespread commercial production of *cannabis* to promote regional, rural, and urban job opportunities that maximize the quality of living where the *cannabis* is farmed.

SUMMARY

This Summary is provided merely to introduce certain concepts and not to identify any key or essential features of the claimed subject matter.

Paragraph A: A *cannabis* farming method, including:
(a) providing a farming superstructure system (FSS), including:
  (a1) an enclosure (ENC) having an interior (ENC1);
  (a2) a plurality of growing assemblies (100, 200) positioned within the interior (ENC1) of the enclosure (ENC), each growing assembly (100, 200) configured to grow *cannabis* (107, 207);
  (a3) a plurality of lights (L1, L2) configured to illuminate the interior (ENC1) of the enclosure (ENC);
  (a4) a carbon dioxide tank (CO2T), at least one carbon dioxide valve (V8, V9, V10), the at least one carbon dioxide valve (V8, V9, V10) configured to take a pressure drop of greater than 50 pounds per square inch, carbon dioxide is made available to the *cannabis* (107, 207) within the enclosure (ENC);
(b) providing a source of water;
(c) removing positively charged ions, negatively charged ions, and undesirable compounds from the water of step (b);
(d) mixing the water after step (c) with macro-nutrients, micro-nutrients, or a pH adjustment solution to form a liquid mixture;
(e) pressurizing the liquid mixture after step (d) to form a pressurized liquid mixture;
(f) transferring the pressurized liquid mixture of step (e) to the plurality of growing assemblies; and
(g) adjusting the carbon dioxide concentration within the enclosure to a range between 400 parts per million and 30,000 parts per million;
wherein:
the positively charged ions are comprised of one or more from the group consisting of calcium, magnesium, sodium, and iron;
the negatively charged ions are comprised of one or more from the group consisting of iodine, chloride, and sulfate;
the undesirable compounds are comprised of one or more from the group consisting of dissolved organic chemicals, viruses, bacteria, and particulates;
the macro-nutrients are comprised of one or more from the group consisting of nitrogen, phosphorus, potassium, calcium, magnesium, and sulfur;
the micro-nutrients are comprised of one or more from the group consisting of iron, manganese, boron, molybdenum, copper, zinc, sodium, chlorine, and silicon;
the pH adjustment solution is comprised of one or more from the group consisting acid, nitric acid, phosphoric acid, potassium hydroxide, sulfuric acid, organic acids, citric acid, and acetic acid;
the lights illuminate the interior of the enclosure at an illumination on-off ratio ranging from between greater than 0.5 to less than 5, the illumination on-off ratio is defined as the duration of time when the lights are on and illuminate the *cannabis* in hours divided by the subsequent duration of time when the lights are off and are not illuminating the *cannabis* in hours before the lights are turned on again;
the water after step (c) and before step (d) has an electrical conductivity ranging from 0.10 microsiemens to 100 microsiemens.

Paragraph B: The method according to Paragraph A, further comprising:
(h) growing *cannabis* within the plurality of growing assemblies after step (g);
(i) harvesting *cannabis* after growing the *cannabis* in step (h);
(j) grinding the *cannabis* after step (i);
(k) creating a multifunctional composition by mixing *cannabis* after step (j) with one or more from the group consisting of a fiber-starch material, a binding agent, a density improving textural supplement, a moisture improving textural supplement, and insects;
wherein:
the fiber-starch materials are comprised of one or more from the group consisting of cereal-grain-based materials, grass-based materials, nut-based materials, powdered fruit materials, root-based materials, tuber-based materials, and vegetable-based materials;

the binding agents are comprised of one or more from the group consisting of agar, agave, alginin, arrowroot, carrageenan, collagen, cornstarch, egg whites, finely ground seeds, furcellaran, gelatin, guar gum, honey, katakuri starch, locust bean gum, pectin, potato starch, proteins, *psyllium* husks, sago, sugars, syrups, tapioca, vegetable gums, and xanthan gum;

the density improving textural supplements are comprised of one or more from the group consisting of extracted arrowroot starch, extracted corn starch, extracted lentil starch, extracted potato starch, and extracted tapioca starch;

the moisture improving textural supplements are comprised of one or more from the group consisting of almonds, brazil nuts, cacao, cashews, chestnuts, coconut, filberts, hazelnuts, Indian nuts, macadamia nuts, nut butters, nut oils, nut powders, peanuts, pecans, pili nuts, pine nuts, pinon nuts, pistachios, soy nuts, sunflower seeds, tiger nuts, and walnuts; the insects are comprised of one or more from the group consisting of Orthoptera order of insects, grasshoppers, crickets, cave crickets, Jerusalem crickets, katydids, weta, lubber, acrida, locusts, cicadas, ants, mealworms, agave worms, worms, bees, centipedes, cockroaches, dragonflies, beetles, scorpions, tarantulas, and termites.

Paragraph C: The method according to Paragraph B, further comprising mixing a fiber-starch material at a fiber-starch mass ratio that ranges from between 100 pounds of fiber-starch material per ton of multifunctional composition to 1800 pounds of fiber-starch material per ton of multifunctional composition.

Paragraph D: The method according to Paragraph B, further comprising mixing a binding agent at a binding agent mass ratio that ranges from between 10 pounds of binding agent per ton of multifunctional composition to 750 pounds of binding agent per ton of multifunctional composition.

Paragraph E: The method according to Paragraph B, further comprising mixing a density improving textural supplement at a density improving textural supplement mass ratio that ranges from between 10 pounds of density improving textural supplement per ton of multifunctional composition to 1000 pounds of density improving textural supplement per ton of multifunctional composition.

Paragraph F: The method according to Paragraph B, further comprising mixing a moisture improving textural supplement at a moisture improving textural supplement mass ratio that ranges from between 10 pounds of moisture improving textural supplement per ton of multifunctional composition to 1000 pounds of moisture improving textural supplement per ton of multifunctional composition.

Paragraph G: The method according to Paragraph B, further comprising mixing insects at an insect mass ratio that ranges from between 25 pounds of insects per ton of multifunctional composition to 1500 pounds of insects per ton of multifunctional composition.

Paragraph H: The method according to Paragraph B, further comprising mixing *cannabis* at a *cannabis* ratio that ranges from between 25 pounds of *cannabis* per ton of multifunctional composition to 1800 pounds of *cannabis* per ton of multifunctional composition.

Paragraph I: The method according to Paragraph A, further comprising:
(a) providing:
 (a1) a refrigerant (Q31) that is configured to be transferred from a compressor (Q30) to a condenser (Q32), from the condenser (Q32) to an evaporator (Q34), and from the evaporator (Q34) to the compressor (Q30);
 (a2) a compressor (Q31) is in fluid communication with a condenser (Q32);
 (a3) a condenser (Q32) is in fluid communication with an evaporator (Q34);
 (a4) an evaporator (Q34) is in fluid communication with the compressor (Q30), the evaporator (Q34) is configured to evaporate the refrigerant (Q31) to absorb heat from the interior (ENC1) of an enclosure (ENC);
(b) removing heat from the interior of the enclosure; and
(c) optionally condensing water vapor from the interior of the enclosure;
wherein:
the system is configured to operate in a plurality of modes of operation, the modes of operation including at least:
a first mode of operation in which compression of a refrigerant takes place within the compressor, and the refrigerant leaves the compressor as a superheated vapor at a temperature above the condensing point of the refrigerant;
a second mode of operation in which condensation of refrigerant takes place within the condenser, heat is rejected and the refrigerant condenses from a superheated vapor into a liquid, and the liquid is cooled to a temperature below the boiling temperature of the refrigerant; and
a third mode of operation in which evaporation of the refrigerant takes place, and the liquid phase refrigerant boils in evaporator to form a vapor or a superheated vapor while absorbing heat from the interior of the enclosure.

Paragraph J: The method according to Paragraph A, further comprising:
(a) providing:
 (a1) an air input (Q1) to the interior (ENC1) of the enclosure (ENC), said air input (Q1) is in fluid communication with an air heater (HXA) via an air supply entry conduit (Q2);
 (a2) an air supply fan (Q12) in fluid communication with an air heater (HXA), said air supply fan (Q12) is configured to provide an air supply (Q3) to the interior (ENC1) of the enclosure (ENC) via said air supply entry conduit (Q2) and said air input (Q1);
 (a3) enclosure temperature sensor (QT0) operatively in communication with said interior (ENC1) of the enclosure (ENC), said enclosure temperature sensor (QT0) configured to measure the temperature within said interior (ENC1) and input a temperature signal (QXT0) to said computer (COMP);
 (a4) an air supply fan motor (Q13) connected to said air supply fan (Q12), said air supply fan motor (Q13) operatively in communication with a controller (Q14), said controller (Q14) configured to input or output a signal (Q15) to a computer (COMP);
(b) the air supply fan (Q12), air supply fan motor (Q13), air heater (HXA), enclosure temperature sensor (QT0), and computer (COMP) are configured to maintain the interior (ENC1) of the enclosure (ENC) within a temperature ranging from between 50 degrees Fahrenheit to 80 degrees Fahrenheit.

Paragraph K: The method according to Paragraph J, further comprising maintaining the interior (ENC1) of the enclosure (ENC) within a temperature ranging from between 65 degrees Fahrenheit to 75 degrees Fahrenheit.

Paragraph L: The method according to Paragraph J, further comprising:
(a) providing:
 (a1) an enclosure humidity sensor (QH0) that is operatively in communication with the interior (ENC1) of the enclosure (ENC), said enclosure humidity sensor (QH0) is configured to measure the humidity within the interior (ENC1) of the enclosure (ENC);

(a2) a water and gas mixing section (Q21) in fluid communication with said air supply entry conduit (Q2), said water and gas mixing section (Q21) is configured to accept a source of water (Q16) from a water transfer conduit (Q17);

(b) the water (Q16) is mixed with air that is provided from said air supply fan (Q12) to form a mixture of air and water;

(c) the mixture of air and water of step (b) is introduced to the interior (ENC1) of the enclosure (ENC) via an air input (Q1) and air supply entry conduit (Q2);

Paragraph M: The method according to Paragraph L, wherein the water and gas mixing section (Q21) is positioned upstream or downstream of the air heater (HXA).

Paragraph N: The method according to Paragraph L, wherein the enclosure humidity sensor (QH0) and computer (COMP) are configured to regulate water (Q16) provided to the water and gas mixing section (Q21) to maintain the interior (ENC1) of the enclosure (ENC) within a humidity range between about 35 percent humidity to about 55 percent humidity.

Paragraph O: The method according to Paragraph N, wherein the enclosure humidity sensor (QH0) and computer (COMP) are configured to regulate water (Q16) provided to the water and gas mixing section (Q21) to maintain the interior (ENC1) of the enclosure (ENC) within a humidity range between about 40 percent humidity to about 50 percent humidity.

Paragraph P: The method according to Paragraph A, further comprising:

(a) providing:
  (a1) an air supply fan (Q12) that accepts an air supply (Q3) from the interior (ENC1) of the enclosure (ENC) via an air discharge exit conduit (Q23);
  (a2) the air discharge exit conduit (Q23) is connected at one end to the enclosure (ENC) via an air output (Q22) and at another end to the air supply fan (Q12);
  (a3) the air supply fan (Q12) is connected to the enclosure (ENC) via an air input (Q1) and an air supply entry conduit (Q2), the air supply fan (Q12) is configured to introduce air to the interior (ENC1) of the enclosure (ENC);
  (a4) an air filter (Q24) is installed on the air discharge exit conduit (Q23) in between the enclosure (ENC) and the air supply fan (Q12), the air filter (Q24) is configured to remove particulates from the air;
(b) filtering out particulates from the interior (ENC1) of an enclosure (ENC); and
(c) recycling the filtered air to the interior (ENC1) of the enclosure (ENC) after step (b).

Paragraph Q: The method according to Paragraph P, further comprising:
(a) cooling the filtered air to form cooled filtered air;
(b) introducing cooled filtered air of step (b) into the interior (ENC1) of the enclosure (ENC).

Paragraph R: The method according to Paragraph P, further comprising:
(a) heating the filtered air to form heated filtered air;
(b) introducing heated filtered air of step (b) into the interior (ENC1) of the enclosure (ENC).

Paragraph S: The method according to Paragraph A, further comprising:
(a) filtering out particulates from the interior (ENC1) of an enclosure (ENC); and
(b) recycling the filtered air back to the interior (ENC1) of the enclosure (ENC).

Paragraph T: A *cannabis* farming method, including:
(a) providing: a farming superstructure system (FSS) including:
  (a1) a refrigerant (Q31) that is configured to be transferred from a compressor (Q30) to a condenser (Q32), from the condenser (Q32) to an evaporator (Q34), and from the evaporator (Q34) to the compressor (Q30);
  (a2) a compressor (Q31) is in fluid communication with a condenser (Q32);
  (a3) a condenser (Q32) is in fluid communication with an evaporator (Q34);
  (a4) an evaporator (Q34) in fluid communication with the compressor (Q30), the evaporator (Q34) is configured to evaporate the refrigerant (Q31) to absorb heat from the interior (ENC1) of an enclosure (ENC);
  (a5) an enclosure (ENC) that contains a plurality of growing assemblies (100, 200) within its interior (ENC1);
  (a6) a plurality of growing assemblies (100, 200), each growing assembly (100, 200) is configured to grow *cannabis* (107, 207);
(b) providing a source of water;
(c) removing positively charged ions, negatively charged ions, or undesirable compounds from the water of step (b);
(d) mixing the water after step (c) with macro-nutrients, micro-nutrients, or a pH adjustment solution to form a liquid mixture;
(e) pressurizing the liquid mixture after step (d) to form a pressurized liquid mixture; and
(f) transferring the pressurized liquid mixture of step (e) to the plurality of growing assemblies;
wherein:
  the positively charged ions are comprised of one or more from the group consisting of calcium, magnesium, sodium, and iron;
  the negatively charged ions are comprised of one or more from the group consisting of iodine, chloride, and sulfate;
  the undesirable compounds are comprised of one or more from the group consisting of dissolved organic chemicals, viruses, bacteria, and particulates;
  the macro-nutrients are comprised of one or more from the group consisting of nitrogen, phosphorus, potassium, calcium, magnesium, and sulfur;
  the micro-nutrients are comprised of one or more from the group consisting of iron, manganese, boron, molybdenum, copper, zinc, sodium, chlorine, and silicon;
  the pH adjustment solution is comprised of one or more from the group consisting acid, nitric acid, phosphoric acid, potassium hydroxide, sulfuric acid, organic acids, citric acid, and acetic acid;
  the system is configured to operate in a plurality of modes of operation, the modes of operation including at least:
  a first mode of operation in which compression of a refrigerant takes place within the compressor, and the refrigerant leaves the compressor as a superheated vapor at a temperature above the condensing point of the refrigerant;
  a second mode of operation in which condensation of refrigerant takes place within the condenser, heat is rejected and the refrigerant condenses from a superheated vapor into a liquid, and the liquid is cooled to a temperature below the boiling temperature of the refrigerant; and a third mode of operation in which evaporation of the refrigerant takes place, and the liquid phase refrigerant boils in evaporator to form a vapor or a superheated vapor while absorbing heat from the interior of the enclosure.

Paragraph U: A method for farming *cannabis*, the method including:
(a) providing a farming superstructure system (FSS), including:
   (a1) a pump (P1) configured to accept and pressurize a source of liquid, the pump is configured to be turned on and off by a computer (COMP);
   (a2) a plurality of growing assemblies (100, 200), each growing assembly (100, 200) configured to grow *cannabis* (107, 207);
   (a3) a plurality of lights (L1, L2) configured to illuminate each growing assembly (100, 200);
   (a4) each growing assembly (100, 200) is configured to accept pressurized liquid from a pump (P1) and introduce the liquid into each growing assembly (100, 200), each growing assembly (100, 200) is configured to receive liquid from a liquid supply conduit (113, 213);
   (a5) pump discharge conduit (304) in fluid communication with the liquid supply conduits (113, 213), the pump discharge conduit (304) is in fluid communication with the pump (P1);
   (a6) at least one filter (F1, F2) installed in between the pump (P1) and the liquid supply conduits (113, 213), the pump (P1) pressurizes and transfers liquid through the filter (F1, F2) and into the liquid supply conduits (113, 213);
   (a7) a pressure tank (PT) installed in between the pump (P1) and the filter (F1, F2), the pressure tank (PT) serves as a pressure storage reservoir in which a liquid is held under pressure;
   (a8) at least one valve (V1, V3, V4) positioned in between the filter (F1, F2) and each growing assembly (100, 200), the at least one valve (V1, V3, V4) configured to be opened and closed by a computer (COMP);
(b) providing a source of liquid;
(c) turning the pump on;
(d) pumping the liquid of step (b) into a pressure tank;
(e) pressurizing the pressure tank;
(f) turning the pump off;
(g) opening at least one valve to decrease the pressure within the pressure tank;
(h) filtering the liquid that is discharged from the pressure tank;
(i) passing the filtered liquid of step (h) through at least one valve and into at least one growing assembly;
(j) contacting the roots of the plants with the liquid of step (i);
wherein the lights illuminate each growing assembly with an illumination on-off ratio ranging from between 0.5 to 11, the illumination on-off ratio is defined as the duration of time when the lights are on and illuminate the *cannabis* in hours divided by the subsequent duration of time when the lights are off and are not illuminating the *cannabis* in hours before the lights are turned on again.

Paragraph V: A method for farming *cannabis*, the method including:
(a) providing a farming superstructure system (FSS), including:
   (a1) a first water treatment unit (A1) including a cation configured to remove positively charged ions from water to form a positively charged ion depleted water (06A), the positively charged ions are comprised of one or more from the group consisting of calcium, magnesium, sodium, and iron;
   (a2) a second water treatment unit (A2) including an anion configured to remove negatively charged ions from the positively charged ion depleted water (06A) to form a negatively charged ion depleted water (09A), the negatively charged ions are comprised of one or more from the group consisting of iodine, chloride, and sulfate;
   (a3) a third water treatment unit (A3) including a membrane configured to remove undesirable compounds from the negatively charged ion depleted water (09A) to form an undesirable compounds depleted water (12A), the undesirable compounds are comprised of one or more from the group consisting of dissolved organic chemicals, viruses, bacteria, and particulates;
   (a4) a common reservoir (500) configured to accept a portion of the undesirable compounds depleted water (12A);
   (a5) a pump (P1) configured to accept and pressurize at least a portion of the undesirable compounds depleted water (12A) transferred from the common reservoir (500);
   (a6) a plurality of growing assemblies (100, 200), each growing assembly (100, 200) configured to grow *cannabis* (107, 207), each growing assembly (100, 200) is configured to accept a liquid provided from a common reservoir (500);
   (a7) a plurality of lights (L1, L2) configured to illuminate the growing assemblies (100, 200);
   (a8) a carbon dioxide tank (CO2T), at least one carbon dioxide valve (V8, V9, V10), the at least one carbon dioxide valve (V8, V9, V10) configured to take a pressure drop of greater than 50 pounds per square inch, carbon dioxide is made available to each growing assembly (100, 200);
   (a9) each growing assembly (100, 200) is configured to accept pressurized liquid from a pump (P1) and introduce the liquid into each growing assembly (100, 200), each growing assembly (100, 200) is configured to receive liquid from a liquid supply conduit (113, 213);
   (a10) a pump discharge conduit (304) in fluid communication with the liquid supply conduits (113, 213), the pump discharge conduit (304) is in fluid communication with the pump (P1);
(b) providing a source of water;
(c) removing positively charged ions from the water of step (b) to form a positively charged ion depleted water;
(d) removing negatively charged ions from the water after step (c) to form a negatively charged ion depleted water;
(e) removing undesirable compounds from the water after step (d) to form an undesirable compound depleted water;
(f) mixing the undesirable compounds depleted water after step (e) with one or more from the group consisting of macro-nutrients, micro-nutrients, and a pH adjustment to form a liquid mixture;
(g) pressurizing the liquid mixture of step (f) to form a pressurized liquid mixture;
(h) splitting the pressurized liquid mixture into a plurality of pressurized liquid mixtures;
(i) transferring the plurality of pressurized liquid mixtures to each growing assembly;
wherein:
the macro-nutrients are comprised of one or more from the group consisting of nitrogen, phosphorus, potassium, calcium, magnesium, and sulfur;

the micro-nutrients are comprised of one or more from the group consisting of iron, manganese, boron, molybdenum, copper, zinc, sodium, chlorine, and silicon;

the pH adjustment solution is comprised of one or more from the group consisting acid, nitric acid, phosphoric acid, potassium hydroxide, sulfuric acid, organic acids, citric acid, and acetic acid;

the undesirable compounds depleted water formed in step (e) has an electrical conductivity ranging from 0.10 microsiemens to 100 microsiemens;

the carbon dioxide concentration in each growing assembly ranges from 400 parts per million to 30,000 parts per million.

DESCRIPTION OF THE DRAWINGS

The accompanying figures show schematic process flowcharts of preferred embodiments and variations thereof. A full and enabling disclosure of the content of the accompanying claims, including the best mode thereof to one of ordinary skill in the art, is set forth more particularly in the remainder of the specification, including reference to the accompanying figures showing how the preferred embodiments and other non-limiting variations of other embodiments described herein may be carried out in practice, in which:

FIG. 2 depicts one non-limiting embodiment of a farming superstructure system (FSS) including a first vertically stacked system (1500) including a plurality of vertically stacked growing assemblies (100, 200) integrated with a first and second vertical support structure (VSS1, VSS2) wherein the first growing assembly (100) is supported by a first horizontal support structure (SS1) and a second growing assembly (200) is supported by a second horizontal support structure (SS2).

FIG. 6 shows a front view of one embodiment of a plant growing module (PGM) provided inside of a cube container conforming to the International Organization for Standardization (ISO) specifications.

FIG. 7 shows a top view of one embodiment of a plant growing module (PGM) provided inside of a cube container conforming to the International Organization for Standardization (ISO) specifications.

DETAILED DESCRIPTION

Reference will now be made in detail to various embodiments of the disclosure. Each embodiment is provided by way of explanation of the disclosure, not limitation of the disclosure. In fact, it will be apparent to those skilled in the art that modifications and variations can be made in the disclosure without departing from the teaching and scope thereof. For instance, features illustrated or described as part of one embodiment to yield a still further embodiment derived from the teaching of the disclosure. Thus, it is intended that the disclosure or content of the claims cover such derivative modifications and variations to come within the scope of the disclosure or claimed embodiments described herein and their equivalents.

Additional objects and advantages of the disclosure will be set forth in part in the description which follows, and in part will be obvious from the description, or may be learned by practice of the claims. The objects and advantages of the disclosure will be attained by means of the instrumentalities and combinations and variations particularly pointed out in the appended claims.

FIG. 1A

Figure 1A:
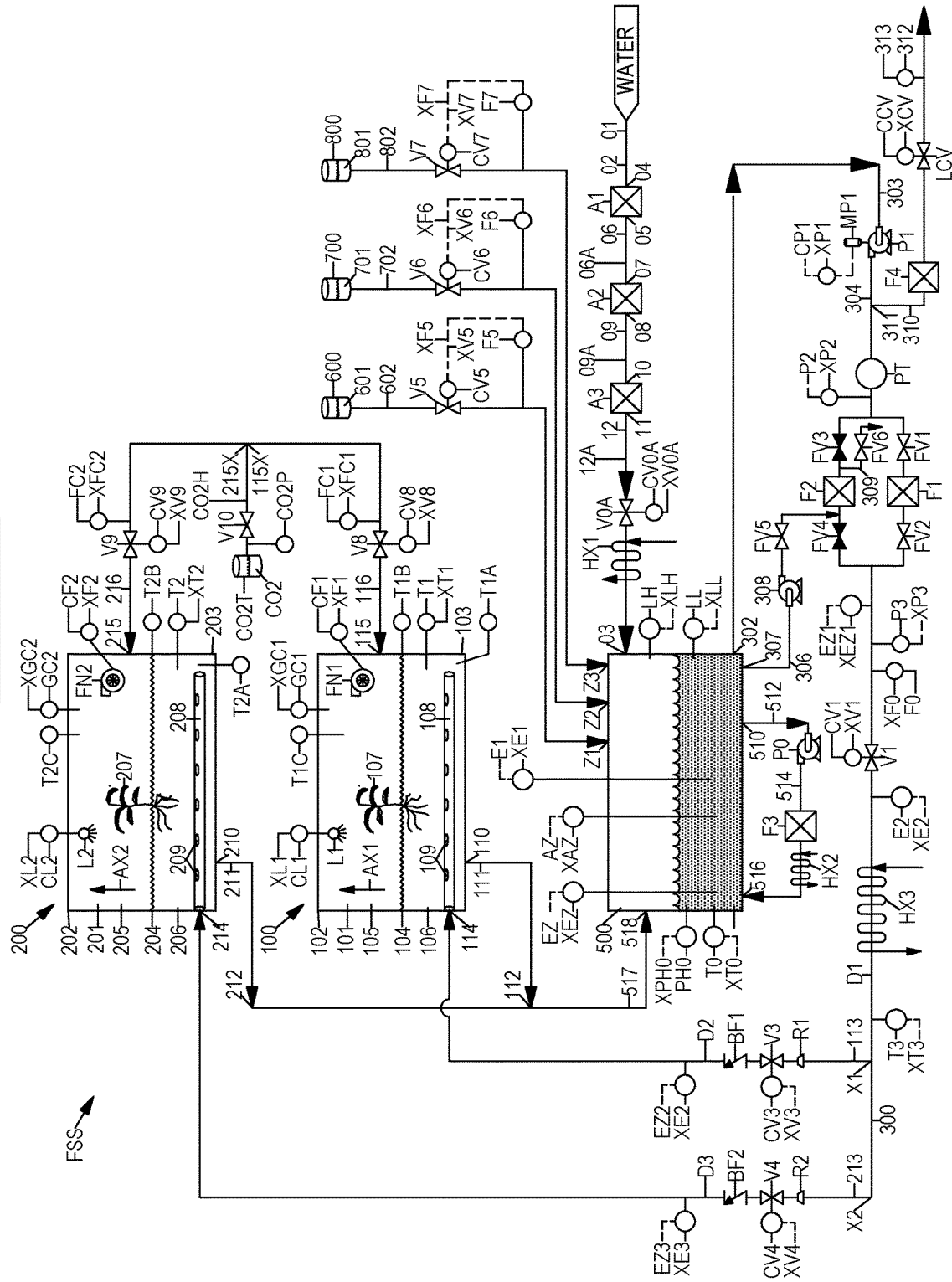
FIG. 1A depicts one non-limiting embodiment of a farming superstructure system (FSS) including a first water treatment unit (A1), a second water treatment unit (A2), a third water treatment unit (A3), a common reservoir (500), a pump (P1), a plurality of vertically stacked growing assemblies (100, 200), a fabric (104, 204) that partitions each growing assembly (100, 200) into an upper-section (105, 205) and a lower-section (106, 206), a plurality of lights (L1, L2) positioned within the upper-section (105, 205) of each growing assembly.

FIG. 1A depicts one non-limiting embodiment of a farming superstructure system (FSS) including a first water treatment unit (A1), a second water treatment unit (A2), a third water treatment unit (A3), a common reservoir (500), a pump (P1), a plurality of vertically stacked growing assemblies (100, 200), a fabric (104, 204) that partitions each growing assembly (100, 200) into an upper-section (105, 205) and a lower-section (106, 206), a plurality of lights (L1, L2) positioned within the upper-section (105, 205) of each growing assembly, a carbon dioxide tank (CO2T), a plurality of fans (FN1, FN2), a plurality of liquid supply conduits (113, 213), a liquid supply header (300), at least one filter (F1, F2), a plurality of valves (V1, V3, V4), a drain port (110, 210), and a computer (COMP).

FIG. 1A discloses a farming superstructure system (FSS). The farming superstructure system (FSS) includes a first growing assembly (100) and a second growing assembly (200) in fluid communication with a common reservoir (500). The common reservoir (500) is provided with a water supply (01) via a water supply conduit (02) and a first water inlet (03). A plurality of water treatment units (A1, A2, A2), along with a contaminant depleted water valve (V0A), and a water heat exchanger (HX1) may be installed on the water supply conduit (02).

A first water treatment unit (A1) may be installed on the water supply conduit (02). The first water treatment unit (A1) has a first input (04) and a first output (05). A water supply (01) may be provided to the first water treatment unit (A1) via a first input (04). Contaminants may be removed by the first water treatment unit (A1) to produce a first contaminant depleted water (06) that is discharged via a first output (05). In embodiments, the first water treatment unit (A1) includes a cation and is configured to remove positively charged ions from water to form a positively charged ion depleted water (06A). The "positively charged ions" include of one or more from the group consisting of calcium, magnesium, sodium, and iron. In embodiments, the first contaminant depleted water (06) may be a positively charged ion depleted water (06A). In embodiments, the first water treatment unit (A1) may include a cation, an anion, a membrane, filter, activated carbon, adsorbent, or absorbent. In embodiments, an activated carbon bed may be used to remove chlorine from the water.

A second water treatment unit (A2) may be installed on the water supply conduit (02) after the first water treatment unit (A1). The second water treatment unit (A2) may include a second input (07) and a second output (08). The first contaminant depleted water (06) may be provided to the second water treatment unit (A2) via a second input (07). The first contaminant depleted water (06) may be provided to the second water treatment unit (A2) from the first output (05) of the first water treatment unit (A1). In embodiments, the positively charged ion depleted water (06A) may be provided to the second water treatment unit (A2) via a second input (07). Contaminants may be removed by the second water treatment unit (A2) to produce a second contaminant depleted water (09) that is discharged via a second output (08). In embodiments, the second water treatment unit (A2) includes an anion that is configured to remove negatively charged ions from the positively charged ion depleted water (06A) to form a negatively charged ion depleted water (09A). The "negatively charged ions" include one or more from the group consisting of iodine, chloride, and sulfate. In embodiments, the second contaminant depleted water (09) may be a negatively charged ion depleted water (09A). In embodiments, the second water treatment unit (A2) may include a cation, an anion, a membrane, filter, activated carbon, adsorbent, or absorbent.

A third water treatment unit (A3) may be installed on the water supply conduit (02) after the second water treatment unit (A2). The third water treatment unit (A3) may include a third input (10) and a third output (11). The second contaminant depleted water (09) may be provided to the third water treatment unit (A3) via a third input (10). The second contaminant depleted water (09) may be provided to the third water treatment unit (A3) from the second output (08) of the second water treatment unit (A2). In embodiments, the negatively charged ion depleted water (09A) may be provided to the third water treatment unit (A3) via a third input (10). Contaminants may be removed by the third water treatment unit (A3) to produce a third contaminant depleted water (12) that is discharged via a third output (11). In embodiments, the third water treatment unit (A3) includes a membrane that is configured to remove undesirable compounds from the negatively charged ion depleted water (09A) to form an undesirable compound depleted water (12A). The "undesirable compounds" include one or more from the group consisting of dissolved organic chemicals, viruses, bacteria, and particulates. In embodiments, the third contaminant depleted water (12) may be an undesirable compound depleted water (12A). In embodiments, the third water treatment unit (A3) may include a cation, an anion, a membrane, filter, activated carbon, adsorbent, or absorbent. In embodiments, the (10) the undesirable compounds depleted water (12A) has an electrical conductivity ranging from 0.10 microsiemens to 100 microsiemens.

In embodiments, the first water treatment unit (A1) containing a cation may be a disposable cartridge, portable tank, cylindrical vessel, automatic unit, or a continuous unit. In embodiments, the second water treatment unit (A2) containing an anion may be a disposable cartridge, portable tank, cylindrical vessel, automatic unit, or a continuous unit. In embodiments, the third water treatment unit (A3) containing a membrane may have: a diameter that ranges from 1 inch to 6 inches; and a pore size ranging from 0.0001 microns to 0.5 microns.

The common reservoir (500) is configured to accept a portion of a contaminant depleted water (06A, 09A, 12A) from the at least one water treatment unit (A1, A2, A3). In embodiments, the water treatment units (A1, A2, A3) may be configured to remove solids from the water supply (01). In embodiments, a contaminant depleted water valve (V0A) is installed on the water supply conduit (02) to regulate the amount of water transferred to the common reservoir (500) through the water supply conduit (02) and first water inlet (03). The contaminant depleted water valve (V0A) is equipped with a controller (CV0A) which sends a signal (XV0A) to and from a computer (COMP). In embodiments, a water heat exchanger (HX1) is installed on the water supply conduit (02) to control the temperature of the water transferred to the common reservoir (500) through the water supply conduit (02) and first water inlet (03). In embodiments, the water heat exchanger (HX1) increases the temperature of the water supply (01) introduced to the common reservoir (500). In embodiments, the water heat exchanger (HX1) decreases the temperature of the water supply (01) introduced to the common reservoir (500). In embodiments, the water heat exchanger (HX1) is positioned in between the contaminant depleted water valve (V0A) and the water inlet (03) of the common reservoir (500). So, it is shown that water may be treated with a plurality of water treatment units (A1, A2, A3) before being introduced to the common reservoir (500).

In embodiments, the common reservoir (500) is comprised of metal, plastic, fiberglass, composite materials, or combinations thereof, or any other conceivable material that may contain a liquid within its interior. In embodiments, the common reservoir (500) is configured to accept a water supply (01) from the water supply conduit (02). In embodiments, the common reservoir (500) may be configured to accept any permutation or combination of a water supply (01) either a first contaminant depleted water (06), second contaminant depleted water (09), or third contaminant depleted water (12), that is heated or cooled or not heated or cooled. In embodiments, the common reservoir (500) may be configured to accept any permutation or combination of a water supply (01) either a positively charged ion depleted water (06A), negatively charged ion depleted water (09A), or undesirable compounds depleted water (12A) that is heated or cooled or not heated or cooled. In embodiments, the common reservoir (500) may be configured to accept any permutation or combination of a water supply (01) from any number of water treatment units (A1, A2, A3) that includes at least a cation, an anion, a membrane, a filter, activated carbon, adsorbent, or absorbent.

In embodiments, the common reservoir (500) is equipped with an upper level switch (LH) for detecting a high level and a lower level switch (LL) for detecting a lower level. The upper level switch (LH) is configured to output a signal (XLH) to the computer (COMP) when the upper level switch (LH) is triggered by a high level of liquid within the common reservoir (500). The lower level switch (LL) is configured to output a signal (XLL) to the computer (COMP) when the lower level switch (LL) is triggered by a low level of liquid within the common reservoir (500). In embodiments, when the lower level switch (LL) sends a signal (XLL) to the computer (COMP), the contaminant depleted water valve (V0A) is opened and introduces water into the common reservoir (500) until the upper level switch (LH) is triggered thus sending a signal (XLH) to the computer (COMP) to close the contaminant depleted water valve (V0A). This level control loop including the upper level switch (LH) for detecting a high level and a lower level switch (LL) for detecting a lower level may be coupled to the operation of the contaminant depleted water valve (V0A) for introducing a water supply (01) through the water supply conduit (02) and into the common reservoir (500) via the first water inlet (03).

In embodiments, a pump (P1) is configured to accept, pressurize, and transfer liquid within the common reservoir (500) into a plurality of vertically stacked growing assemblies (100, 200). In embodiments, the pump (P1) is configured to accept, pressurize, and transfer at least a portion of the undesirable compounds depleted water (12A) transferred from the common tank (500T) into a plurality of vertically stacked growing assemblies (100, 200). Each of the plurality of vertically stacked growing assemblies (100, 200) are positioned above the common reservoir (500).

The first growing assembly (100) has an interior (101), a top (102), a bottom (103), and a longitudinal axis (AX1) extending along a height direction of the first growing assembly (100). The first growing assembly (100) has a fabric (104) that partitions the first growing assembly (100) into an upper-section (105) close to the top (102) and a lower-section (106) close to the bottom (103). The fabric (104) is used to provide structure for *cannabis* (107) to root into. *Cannabis* (107) rooted in the fabric (104) have roots that grow downward and extend into the lower-section (106). The first growing assembly (100) is equipped with a plurality of lights (L1) positioned within the upper-section (105) above the fabric (104). *Cannabis* (107) rooted in the fabric (104) grow upward extending into the upper-section (105) towards the plurality of lights (L1). The plurality of lights (L1) are configured to be controlled by a computer (COMP) to operate at a wavelength ranging from 400 nm to 700 nm. In embodiments, the lights (L1) have a controller (CL1) that sends a signal (XL1) to and from the computer (COMP). In embodiments, the lights (L1, L2) may be compact fluorescent (CFL), light emitting diode (LED), incandescent lights, fluorescent lights, or halogen lights. In embodiments, light emitting diodes are preferred.

The second growing assembly (200) has an interior (201), a top (202), a bottom (203), and a longitudinal axis (AX2) extending along a height direction of the first growing assembly (200). The second growing assembly (200) has a fabric (204) that partitions the second growing assembly (200) into an upper-section (205) close to the top (202) and a lower-section (206) close to the bottom (203). The fabric (204) is used to provide structure for *cannabis* (207) to root into. *Cannabis* (207) rooted in the fabric (204) have roots that grow downward and extend into the lower-section (206). The second growing assembly (200) is equipped with a plurality of lights (L2) positioned within the upper-section (205) above the fabric (204). *Cannabis* (207) rooted in the fabric (204) grow upward extending into the upper-section (205) towards the plurality of lights (L2). The plurality of lights (L2) are configured to be controlled by a computer (COMP) to operate at a wavelength ranging from 400 nm to 700 nm. In embodiments, the lights (L2) have a controller (CL2) that sends a signal (XL2) to and from the computer (COMP).

In embodiments, the farming superstructure system (FSS) is equipped with a carbon dioxide tank (CO2T). The carbon dioxide tank (CO2T) contains pressurized carbon dioxide (CO2) and is equipped with a carbon dioxide pressure sensor (CO2P). A carbon dioxide supply header (CO2H) is connected to the carbon dioxide tank (CO2T). A first carbon dioxide supply valve (V10) is installed on the carbon dioxide supply header (CO2H) and is configured to take a pressure drop of greater than 50 pounds per square inch (PSI). The first growing assembly (100) is equipped with a CO2 input (115) that is connected to a CO2 supply conduit (116). The second growing assembly (200) is also equipped with a CO2 input (215) that is connected to a CO2 supply conduit (216).

The CO2 supply conduit (116) of the first growing assembly (100) is connected to the carbon dioxide supply header (CO2H) via a CO2 header connection (115X). The CO2 supply conduit (116) of the first growing assembly (100) is configured to transfer carbon dioxide into the first interior (101) of the first growing assembly (100). In embodiments, a second carbon dioxide supply valve (V8) is installed on the CO2 supply conduit (116) of the first growing assembly (100). The second carbon dioxide supply valve (V8) is equipped with a controller (CV8) that sends a signal (XV8) to and from a computer (COMP). In embodiments, a CO2 flow sensor (FC1) is installed on the CO2 supply conduit (116) of the first growing assembly (100). The CO2 flow sensor (FC1) sends a signal (XFC1) to the computer (COMP). In embodiments, a gas quality sensor (GC1) is installed on the first growing assembly (100) to monitor the concentration of carbon dioxide within the first interior (101). The gas quality sensor (GC1) is equipped to send a signal (XGC1) to the computer (COMP).

The CO2 supply conduit (216) of the second growing assembly (200) is connected to the carbon dioxide supply header (CO2H) via a CO2 header connection (215X). The CO2 supply conduit (216) of the second growing assembly (200) is configured to transfer carbon dioxide into the second interior (201) of the second growing assembly (100). In embodiments, a third carbon dioxide supply valve (V9) is installed on the CO2 supply conduit (216) of the second growing assembly (200). The third carbon dioxide supply valve (V9) is equipped with a controller (CV9) that sends a signal (XV9) to and from a computer (COMP). In embodiments, a CO2 flow sensor (FC2) is installed on the CO2 supply conduit (216) of the second growing assembly (200). The CO2 flow sensor (FC2) sends a signal (XFC2) to the computer (COMP). In embodiments, a gas quality sensor (GC2) is installed on the second growing assembly (200) to monitor the concentration of carbon dioxide within the second interior (201). The gas quality sensor (GC2) is equipped to send a signal (XGC2) to the computer (COMP).

In embodiments, the carbon dioxide concentration in the upper-section (105, 205) of each growing assembly ranges from between greater than 400 parts per million to 30,000 parts per million. In embodiments, the gas quality sensor (GC2) is equipped to send a signal (XGC2) to the computer (COMP) to operate the first, second, or third carbon dioxide supply valves (V10, V8, V9).

At least one fan (FN1) is positioned in the upper-section (105) of the first growing assembly (100). The fan (FN1) is configured to blow air onto the *cannabis* (107). The fan (FN1) is configured to distribute a mixture of air and CO2 onto the *cannabis* (107). The fan (FN1) is equipped with a controller (CF1) that sends a signal (XF1) to and from a computer (COMP).

A plurality of fans (FN2) are positioned in the upper-section (205) of the second growing assembly (200). The fans (FN2) are configured to blow air onto the *cannabis* (207). In embodiments, the fans blow air and the air is comprised of a gas, vapor, and solid particulates. In embodiments, the gas within air may be oxygen, carbon dioxide, or nitrogen. In embodiments, the vapor within the air may be water vapor. In embodiments, the solid particulates within air may be dust, dirt, or pollen. The fans (FN2) are configured to distribute a mixture of air and CO2 onto the *cannabis* (207). The fans (FN2) are equipped with a controller (CF2) that sends a signal (XF2) to and from a computer (COMP). Each of the fans (FN1, FN2) is configured to operate at a RPM less than 6,000 RPM. In embodiments, it is preferred to operate the fans (FN1, FN2) at a RPM less than 6,000 so that the velocity of air blown onto the *cannabis* ranges from 0.5 feet per second to 50 feet per second.

Figure 12:
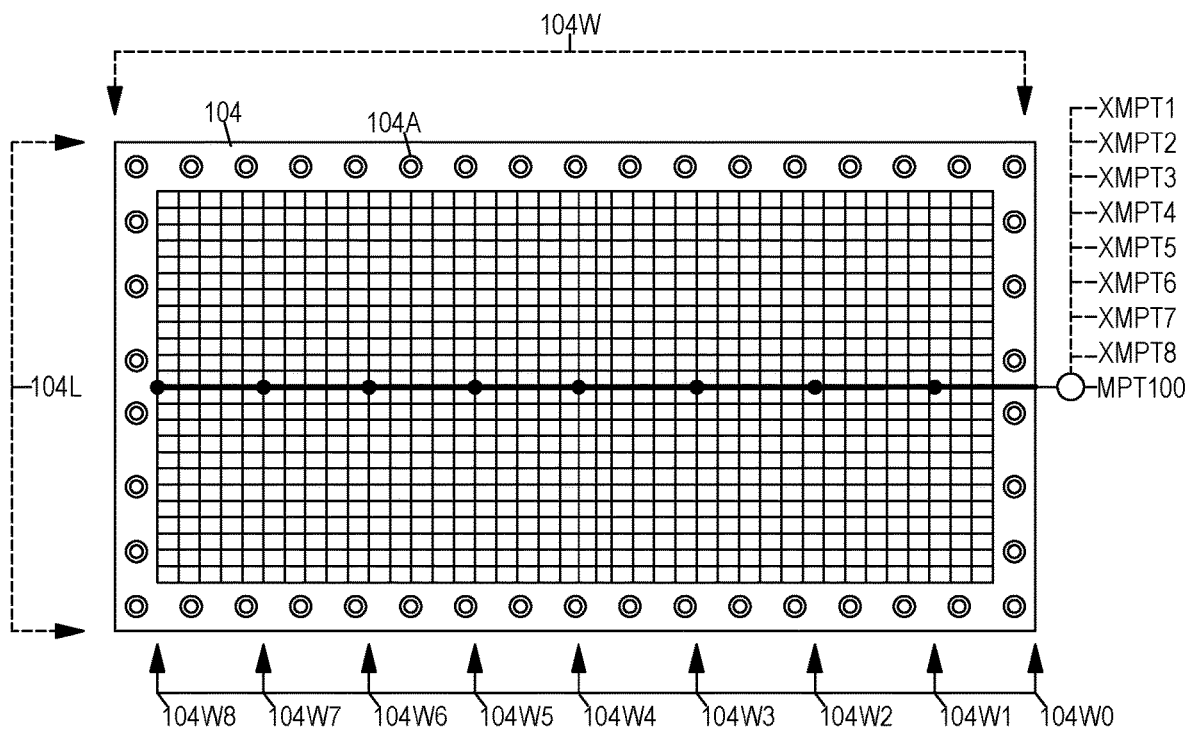
FIG. 12 shows one non-limiting embodiment of a fabric (104) used in a growing assembly (100), the fabric (104) having a multi-point temperature sensor (MPT100) connected thereto for measuring temperatures at various lengths along the sensor's length.
Figure 13:
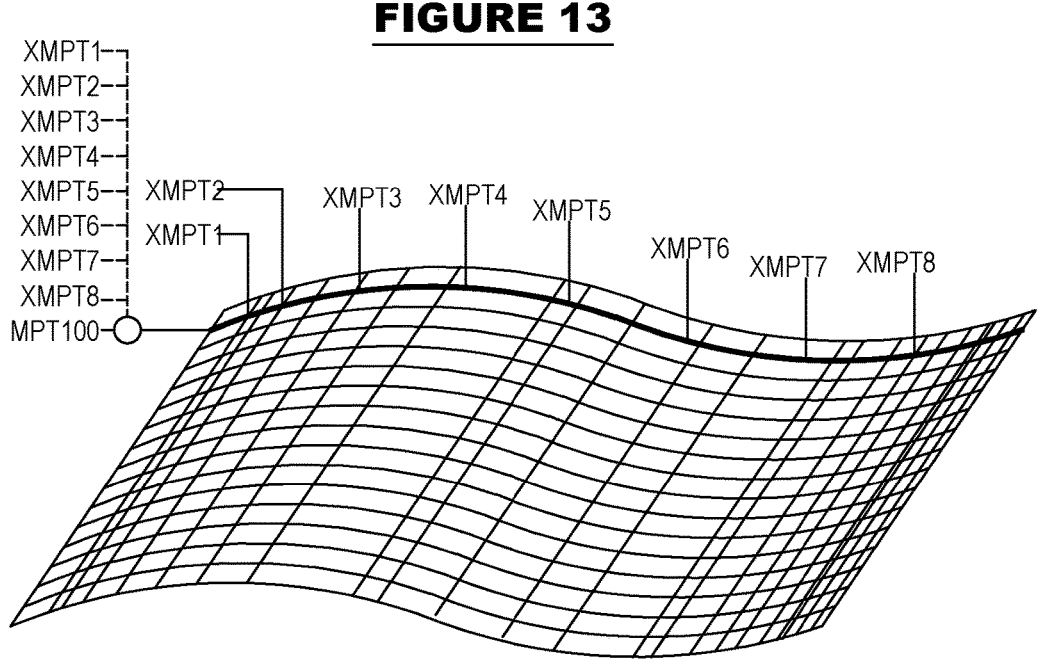
FIG. 13 shows another one non-limiting embodiment of a fabric (104) used in a growing assembly (100).

The first growing assembly (100) is equipped with a temperature sensor (T1) to monitor the temperature within the first interior (101). The temperature sensor (T1) is configured to send a signal (XT1) to the computer (COMP). In embodiments, the temperature sensor (T1) may be a multi-point temperature sensor (MPT100) that is connected to the fabric (104) for measuring temperatures at various lengths along the sensor's length and long the length of the fabric (104), as depicted in FIGS. 12 and 13.

The second growing assembly (200) is equipped with a temperature sensor (T2) to monitor the temperature within the second interior (201). The temperature sensor (T2) is configured to send a signal (XT2) to the computer (COMP). In embodiments, the temperature sensor (T2) may be a multi-point temperature sensor (MPT100) that is connected to the fabric (204) for measuring temperatures at various lengths along the sensor's length and long the length of the fabric (204), as depicted in FIGS. 12 and 13.

In embodiments, each growing assembly (100, 200) is equipped with an upper temperature sensor (T1C, T2C) positioned within the upper-section (105, 205), a partition temperature sensor (T1B, T2B) positioned at the fabric (104), and a lower temperature sensor (T1A, T2A) positioned within the lower-section (106, 206). Preferably the partition temperature sensor (T1B) is a multi-point temperature sensor (MPT100) that is integrated with the fabric (104) as disclosed in FIGS. 12 and 13.

In embodiments, the upper temperature sensor (T1C, T2C) is configured to input a signal (XT1C, XT2C) (not shown) to the computer (COMP). In embodiments, the partition temperature sensor (T1B, T2B) is configured to input a signal (XT1B, XT2B) (not shown) to the computer (COMP). In embodiments, the lower temperature sensor (T1A, T2B) is configured to input a signal (XT1A, XT2A) (not shown) to the computer (COMP). In embodiments, during the day-time, the upper-section (105, 205) has a temperature that is greater than the temperature within lower-section (106, 206). In embodiments, during the night-time, the upper-section (105, 205) has a temperature that is less than the temperature within the lower-section (106, 206).

A first liquid distributor (108) is positioned in the lower-section (106) of the first growing assembly (100) below the fabric (104) and equipped with a plurality of restrictions (109) installed thereon. In embodiments, the restrictions (109) of the first liquid distributor (108) are spray nozzles, spray balls, or apertures. Each restriction (109) is configured to accept pressurized liquid from the pump (P1) and introduce the liquid into the lower-section (106) of the first growing assembly (100) while reducing the pressure of the liquid that passes through each restriction (109). The first liquid distributor (108) is connected to a first liquid supply conduit (113) via a liquid input (114). The first liquid distributor (108) is configured to receive liquid from a first liquid supply conduit (113).

A second liquid distributor (208) is positioned in the lower-section (206) of the second growing assembly (200) below the fabric (204) and equipped with a plurality of restrictions (209) installed thereon. In embodiments, the restrictions (209) of the second liquid distributor (208) are spray nozzles, spray balls, or apertures. Each restriction (209) is configured to accept pressurized liquid from the pump (P1) and introduce the liquid into the lower-section (206) of the second growing assembly (200) while reducing the pressure of the liquid that passes through each restriction (209). The second liquid distributor (208) is connected to a second liquid supply conduit (213) via a liquid input (214). The second liquid distributor (208) is configured to receive liquid from a second liquid supply conduit (213).

The first liquid supply conduit (113) is connected to a liquid supply header (300) via a first connection (X1). The second liquid supply conduit (213) is connected to a liquid supply header (300) via a second connection (X2). The liquid supply header (300) is connected to the pump discharge conduit (304). In embodiments, the liquid supply header (300) has a diameter (D1) that is greater than both the first smaller diameter (D2) of the first liquid supply conduit (113) and the second smaller diameter (D3) of the second liquid supply conduit (213). A first reducer (R1) may be positioned on the first liquid supply conduit (113) in between the first connection (X1) to the liquid supply header (300) and the liquid input (114) to the first growing assembly (100). A second reducer (R2) may be positioned on the second liquid supply conduit (213) in between the second connection (X2) to the liquid supply header (300) and the liquid input (214) to the second growing assembly (200).

A first growing assembly liquid supply valve (V3) may be positioned on the first liquid supply conduit (113) in between the liquid supply header (300) and the first growing assembly (100). The first growing assembly liquid supply valve (V3) has a controller (CV3) that is configured to input and output a signal (XV3) to or from the computer (COMP). A second growing assembly liquid supply valve (V4) may be positioned on the second liquid supply conduit (213) in between the liquid supply header (300) and the second growing assembly (200). The second growing assembly liquid supply valve (V4) has a controller (CV4) that is configured to input and output a signal (XV4) to or from the computer (COMP).

A back-flow prevention valve (BF1) may be positioned on the first liquid supply conduit (113) in between the liquid supply header (300) and the first growing assembly (100). FIG. 1A shows the back-flow prevention valve (BF1) positioned in between the first growing assembly liquid supply valve (V3) and the first growing assembly (100). A back-flow prevention valve (BF2) may be positioned on the second liquid supply conduit (213) in between the liquid supply header (300) and the second growing assembly (200). FIG. 1A shows the back-flow prevention valve (BF2) positioned in between the second growing assembly liquid supply valve (V4) and the second growing assembly (200).

A second oxygen emitter (EZ2) may be positioned on the first liquid supply conduit (113) in between the liquid supply header (300) and the first growing assembly (200). The second oxygen emitter (EZ2) is configured to oxygenate a portion of the liquid that flows through the first liquid supply conduit (113). The second oxygen emitter (EZ2) inputs signal (XEZ3) from a computer (COMP). A third oxygen emitter (EZ3) may be positioned on the second liquid supply conduit (213) in between the liquid supply header (300) and the second growing assembly (200). The third oxygen emitter (EZ3) is configured to oxygenate a portion of the liquid that flows through the second liquid supply conduit (213). The third oxygen emitter (EZ3) inputs signal (XEZ3) from a computer (COMP).

In embodiments, the oxygen emitter is an electrolytic cell configured to produce oxygenated water. In embodiments, oxygenated water produced by the electrolytic cell may have microbubbles and nanobubbles of oxygen suspended within it. In embodiments, the oxygen emitter is an electrolytic cell which generates microbubbles and nanobubbles of oxygen in a liquid, which bubbles are too small to break the surface tension of the liquid, resulting in a liquid that is supersaturated with oxygen. "Supersaturated" means oxygen at a higher concentration than normal calculated oxygen solubility at a particular temperature and pressure. In embodiments, the very small oxygen bubbles remain suspended in the liquid, forming a solution supersaturated in oxygen. The use of supersaturated or oxygenated water for enhancing the growth of *cannabis* may be incorporated into the FSS. Electrolytic generation of microbubbles or nanobubbles of oxygen for increasing the oxygen content of flowing liquid may be incorporated into the FSS. In embodiments, the production of oxygen and hydrogen by the electrolysis of water may be used to enhance the efficiency of the FSS.

In embodiments, an electrolytic cell is comprised of an anode and a cathode. A current is applied across an anode and a cathode of the electrolytic cell which are immersed in a liquid. Hydrogen gas is produced at the cathode and oxygen gas is produced at the anode. In embodiments, the electrolytic cell tends to deactivate and have a limited life if exposed to the positively charged ions, negatively charged ions, or undesirable compounds. Therefore, a sophisticated water treatment unit is needed for the electrolytic cell to work properly deactivate by unpredictable amounts of positively charged ions, remove negatively charged ions, or undesirable components. The roots of the *cannabis* in the lower section (106, 206) are healthier when contacted with an oxygenated liquid. Further, oxygenated and/or supersaturated water inhibits the growth of deleterious fungi on the fabric (104, 204). In embodiments, the oxygen emitter may be a sparger for increasing the oxygen content of a liquid by sparging with air or oxygen. In embodiments, the oxygen emitter may be a microbubble generator that achieves a bubble size of about 0.10 millimeters to about 3 millimeters in diameter. In embodiments, the oxygen emitter may be a microbubble generator for producing microbubbles, ranging in size from 0.1 to 100 microns in diameter, by forcing air into the fluid at high pressure through an orifice.

The common reservoir (500) is configured to accept a water supply (01). In embodiments, the common reservoir (500) is configured to accept a water supply (01) that has passed through one or more water treatment units (A1, A2, A3). In embodiments, the common reservoir (500) is configured to accept a portion of the undesirable compounds depleted water (12A).

The common reservoir (500) is configured to accept macro-nutrients (601) from a macro-nutrient supply tank (600), micro-nutrients (701) from a micro-nutrient supply tank (700), and a pH adjustment solution (801) from a pH adjustment solution supply tank (800). In embodiments, the macro-nutrients (601) include one or more from the group consisting of nitrogen, phosphorus, potassium, calcium, magnesium, and sulfur. In embodiments, the micro-nutrients (701) include one or more from the group consisting of iron, manganese, boron, molybdenum, copper, zinc, sodium, chlorine, and silicon. In embodiments, the pH adjustment solution (801) includes one or more from the group consisting acid, nitric acid, phosphoric acid, potassium hydroxide, sulfuric acid, organic acids, citric acid, and acetic acid.

In embodiments, the macro-nutrient supply tank (600) is connected to the common reservoir (500) via a macro-nutrient transfer conduit (602) and a macro-nutrient reservoir input (Z1). A macro-nutrient supply valve (V5) is installed on the macro-nutrient transfer conduit (602). The macro-nutrient supply valve (V5) is equipped with a controller (CV5) that inputs and outputs a signal (XV5) to and from the computer (COMP). A macro-nutrient flow sensor (F5) is installed on the macro-nutrient transfer conduit (602) and configured to output a signal (XF5) to or from a computer (COMP). Macro-nutrients (601) may be transferred to the interior of the common reservoir (500) via a macro-nutrient transfer conduit (602) by operation with a macro-nutrient supply tank (600) load cell (604) to measure the loss-in-mass of the macro-nutrients (601) within the macro-nutrient supply tank (600) or the macro-nutrient transfer conduit (602). Macro-nutrients (601) are introduced into the interior of the common reservoir (500) beneath the liquid level via a diptube (606).

In embodiments, the micro-nutrient supply tank (700) is connected to the common reservoir (500) via a micro-nutrient transfer conduit (702) and a micro-nutrient reservoir input (Z2). A micro-nutrient supply valve (V6) is installed on the micro-nutrient transfer conduit (702). The micro-nutrient supply valve (V6) is equipped with a controller (CV6) that inputs and outputs a signal (XV6) to and from the computer (COMP). A micro-nutrient flow sensor (F6) is installed on the micro-nutrient transfer conduit (702) and configured to output a signal (XF6) to or from a computer (COMP). Micro-nutrients (701) may be transferred to the interior of the common reservoir (500) via a micro-nutrient transfer conduit (702) by operation with a micro-nutrient supply tank (700) load cell (704) to measure the loss-in-mass of the micro-nutrients (701) within the micro-nutrient supply tank (700) or the micro-nutrient transfer conduit (702). Macro-nutrients (601) are introduced into the interior of the common reservoir (500) beneath the liquid level via a diptube (606) (not shown).

In embodiments, the pH adjustment solution supply tank (800) is connected to the common reservoir (500) via a pH adjustment solution transfer conduit (802) and a pH adjustment solution reservoir input (Z3). A pH adjustment solution supply valve (V8) is installed on the pH adjustment solution transfer conduit (802). The pH adjustment solution supply valve (V8) is equipped with a controller (CV8) that inputs and outputs a signal (XV8) to and from the computer (COMP). A pH adjustment solution flow sensor (F7) is installed on the pH adjustment solution transfer conduit (802) and configured to output a signal (XF7) to or from a computer (COMP). A pH adjustment solution (801) may be transferred to the interior of the common reservoir (500) via a pH adjustment solution transfer conduit (802) by operation with a pH adjustment solution supply tank (800) load cell (804) to measure the loss-in-mass of the pH adjustment solution (801) within the pH adjustment solution supply tank (800) or the pH adjustment solution transfer conduit (802). The pH adjustment solution (801) are introduced into the interior of the common reservoir (500) beneath the liquid level via a diptube (806) (not shown).

The common reservoir (500) is configured to accept liquid drained from each growing assembly (100, 200). The common reservoir (500) is configured to accept liquid drained from the first growing assembly (100). A drain port (110) is installed on the lower-section (106) of the first growing assembly (100) and is configured to drain liquid into a common reservoir (500) via a drain conduit (111). In embodiments, the first growing assembly (100) is connected to the common reservoir (500) via a drain conduit (111). The common reservoir (500) is configured to accept liquid drained from the second growing assembly (200). A drain port (210) is installed on the lower-section (206) of the second growing assembly (200) and is configured to drain liquid into a common reservoir (500) via a drain conduit (211). In embodiments, the second growing assembly (200) is connected to the common reservoir (500) via a drain conduit (211). It is preferable to drain liquid from each growing assembly at a velocity less than 3 feet per second.

Figure 8:
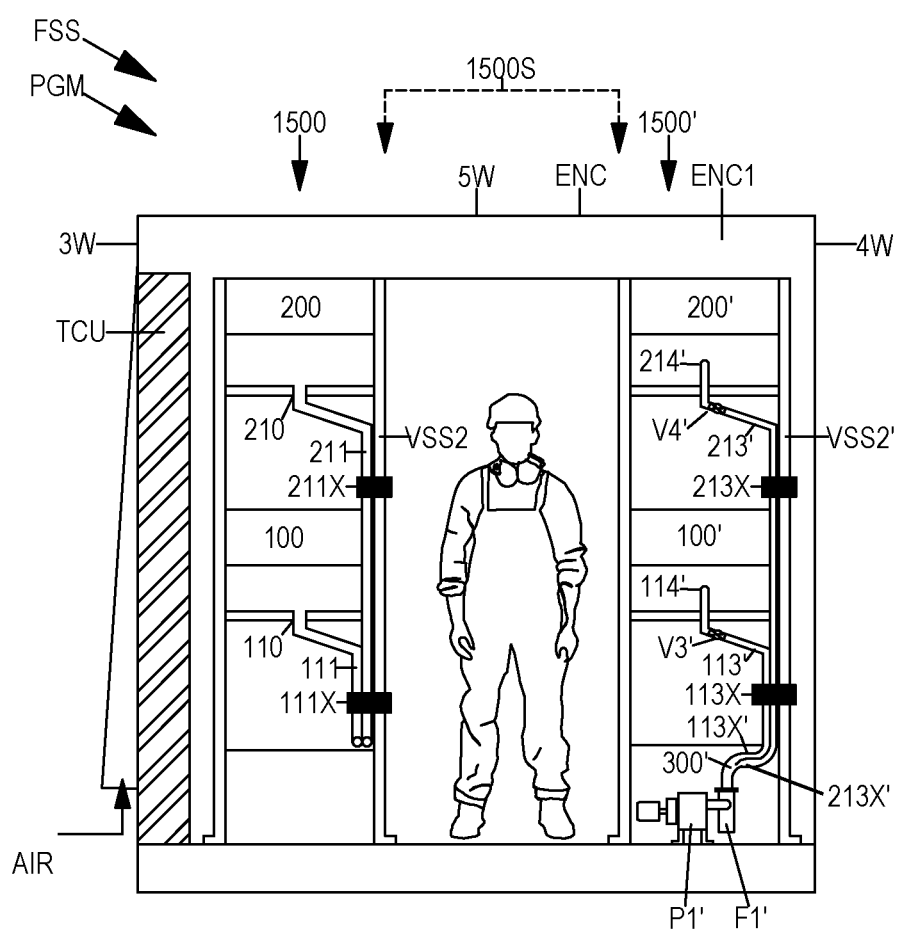
FIG. 8 shows a first side view of one embodiment of a plant growing module (PGM).

In embodiments, the drain conduit (111) is connected at one end to the first growing assembly (100) via a drain port (110) and connected at another end to the common reservoir (500) via a common drain conduit (517). In embodiments, the drain conduit (211) is connected at one end to the second growing assembly (200) via a drain port (210) and connected at another end to the common reservoir (500) via a common drain conduit (517). The common drain conduit (517) is connected at one end to the common reservoir (500) via a drain input (518) and at another end to the first drain conduit (111) via a first drain connection (112). The common drain conduit (517) is connected at one end to the common reservoir (500) via a drain input (518) and at another end to the second drain conduit (211) via a second drain connection (212). In embodiments, the common drain conduit (517) is connected to both drain conduits (111, 211) from both growing assemblies (100, 200) and is configured to combine the liquid contents of both drain conduits (111, 211) prior to introducing them into the common reservoir (500). In embodiments, as shown in FIG. 8, there is no common drain conduit (517) and each drain conduit (111, 211) of the growing assemblies (100, 200) drains directly into the common reservoir (500).

The interior of the common reservoir (500) is configured to hold water, macro-nutrients (601), micro-nutrients (701) from a micro-nutrient supply tank (700), and a pH adjustment solution (801). In embodiments, the common reservoir (500) is equipped with a reservoir pH sensor (PH0) that is configured to input a signal (XPH0) to a computer (COMP). In embodiments, the acidity of the water is measured by the reservoir pH sensor (PH0) and adjusted to a desirable range from 5.15 to 6.75. In embodiments, the common reservoir (500) is equipped with a reservoir temperature sensor (T0) that is configured to input a signal (XT0) to a computer (COMP). In embodiments, the common reservoir (500) is equipped with a reservoir oxygen emitter (EZ) that is configured to input a signal (XEZ) to a computer (COMP). In embodiments, the common reservoir (500) is equipped with a reservoir electrical conductivity sensor (E1) that is configured to input a signal (XE1) to a computer (COMP).

In embodiments, the common reservoir (500) is equipped with a reservoir recirculation pump (P0) followed by a reservoir recirculation filter (F3) to remove solids from the common reservoir (500). In embodiments, the common reservoir (500) is equipped with a reservoir heat exchanger (HX2) to maintain a temperature of the liquid contents within the common reservoir (500). In embodiments, the common reservoir (500) is equipped with a reservoir recirculation pump (P0) followed by a reservoir heat exchanger (HX2) to maintain a temperature of the liquid contents within the common reservoir (500). The common reservoir (500) has a reservoir recirculation outlet (510) that is connected to a reservoir recirculation pump suction conduit (512). The reservoir recirculation pump suction conduit (512) is connected to a reservoir recirculation pump (P0). The reservoir recirculation pump (P0) is connected to a reservoir recirculation pump discharge conduit (514) that transfers liquid back to the common reservoir (500) via a reservoir recirculation inlet (516). In embodiments, a reservoir recirculation filter (F3) is installed on the reservoir recirculation pump discharge conduit (514). In embodiments, a reservoir heat exchanger (HX2) is installed on the reservoir recirculation pump discharge conduit (514). In embodiments, a reservoir heat exchanger (HX2) is installed on the reservoir recirculation pump discharge conduit (514) after the reservoir recirculation filter (F3). In embodiments, the reservoir heat exchanger (HX2) may increase the temperature of the liquid passing through it. In embodiments, the reservoir heat exchanger (HX2) may decrease the temperature of the liquid passing through it.

The common reservoir (500) is connected to a pump (P1) via a pump suction conduit (303). The pump suction conduit (303) is connected at one end to the common reservoir (500) via a reservoir transfer outlet (302) and connected at the other end to the pump (P1). The pump (P1) is equipped with a motor (MP1) and a controller (CP1) which is configured to input and output a signal (XP1) to and from a computer (COMP). A pump discharge conduit (304) is connected to the pump (P1). The liquid supply header (300) may be synonymous with the pump discharge conduit (304) in that they both accept a portion of pressurized liquid that was provided by the pump (P1).

In embodiments, a pressure tank (PT) is installed on the pump discharge conduit (304). In embodiments, the pressure tank (PT) may be pressurized by the pump (P1). The pressure tank (PT) serves as a pressure storage reservoir in which a liquid is held under pressure. The pressure tank (PT) enables the system to respond more quickly to a temporary demand, and to smooth out pulsations created by the pump (P1). In embodiments, the pressure tank (PT) serves as accumulator to relieve the pump (P1) from constantly operating. In embodiments, the pressure tank (PT) is a cylindrical tank rated for a maximum pressure of 200 PSI or 600 PSI. In embodiments, the pressure tank (PT) is a cylindrical tank that has a length to diameter ratio ranging from 1.25 to 2.5.

A level control discharge conduit (310) is connected to the pump discharge conduit (304) via a connection (311). The level control discharge conduit (310) is configured to pump the contents of the common reservoir (500) away from the system for any number of reasons. Clean-out, replenishing the liquid within the common reservoir (500) or to bleed off some of the liquid contents within may be some purposes for utilizing the level control discharge conduit (310). A filter (F4) is installed on the level control discharge conduit (310). A level control valve (LCV) is installed on the level control discharge conduit (310) and is equipped with a controller (CCV) that sends a signal (XCV) to or from the computer (COMP). The filter (F4) preferably is installed upstream of the level control valve (LCV) to that solids do not clog the level control valve (LCV). Preferably the connection (311) for the level control discharge conduit (310) is connected as close as possible to the pump (P1) on the pump discharge conduit (304) so that if the filters (F1, F2) on the pump discharge conduit (304) clog, there is still a way to drain liquid from the system. A waste treatment unit (312) may be placed on the level control discharge conduit (310) to destroy any organic molecules, waste, bacteria, protozoa, helminths, or viruses that may be present in the liquid. In embodiments, the waste treatment unit (312) is an ozone unit (313) configured to destroy organic molecules, waste, bacteria, protozoa, helminths, or viruses via oxidation.

At least one filter (F1, F2) may be installed on the pump discharge conduit (304). FIG. 1A shows two filters (F1, F2) configured to operate in a cyclic-batch mode where when one is on-line in a first mode of normal operation, the other is off-line and undergoing a back-flush cycle in a second mode of operation. This is depicted in FIG. 1A wherein the first filter (F1) is on-line and filtering the liquid discharged from the pump (P1) while the second filter (F2) is off-line. The first filter (F1) is shown to have a first filter inlet valve (FV1) and a first filter outlet valve (FV2) both of which are open in FIG. 1. The second filter (F2) is shown to have a second filter inlet valve (FV3) and a second filter outlet valve (FV4) both of which are shown in the closed position as indicted by darkened-in color of the valves (FV3, FV4). The second filter (F2) is shown in the back-flush mode of operation while the first filter (F1) is shown in the normal mode of operation. While in the back-flush mode of operation, the second filter (F2) is shown accepting a source of liquid from the common reservoir (500) via a filter back-flush supply conduit (306).

The common reservoir (500) is equipped with a filter back-flush outlet (307) that is connected to a filter back-flush supply conduit (306). The filter back-flush supply conduit (306) is connected at one end to the common reservoir (500) via a filter back-flush outlet (307) and at another end to the filter back-flush pump (308). The filter back-flush pump (308) is connected to the filter back-flush discharge conduit (309). The filter back-flush discharge conduit (309) has a filter back-flush supply valve (FV5) installed thereon to provide pressurized liquid from the common reservoir (500) to the second filter (F2) operating in the second mode of back-flush operation. The filter back-flush supply valve (FV5) provides liquid to the second filter in between the second filter outlet valve (FV4) and the second filter (F2) to back-flush the second filter (F2). A filter back-flush discharge valve (FV6) is provided in between the second filter and the second filter inlet valve (FV3) to flush solids that have accumulated during the first mode of normal operation.

A filter inlet pressure sensor (P2) is installed on the pump discharge conduit (304) before the filters (F1, F2). The filter inlet pressure sensor (P2) is configured to output a signal (XP2) to the computer (COMP). A filter discharge pressure sensor (P3) is installed on the pump discharge conduit (304) after the filters (F1, F2). The filter discharge pressure sensor (P2) is configured to output a signal (XP3) to the computer (COMP). Then the pressure drop across the filters (F1, F2) reached a threshold predetermined value, the filters (F1, F2) switch modes of operation from first to second and from second to first.

A first oxygen emitter (EZ1) is installed on the pump discharge conduit (304). In embodiments, the first oxygen emitter (EZ1) is installed on the pump discharge conduit (304) after the filters (F1, F2). The first oxygen emitter (EZ1) is configured to output a signal (XEZ1) to the computer (COMP). The first oxygen emitter (EZ1) oxygenates the water passing through the pump discharge conduit (304).

A liquid flow sensor (F0) is installed on the pump discharge conduit (304) after the filters (F1, F2). The liquid flow sensor (F0) is configured to output a signal (XF0) to the computer (COMP). The liquid flow sensor (F0) measures the flow rate of water passing through the pump discharge conduit (304).

A growing assembly liquid supply valve (V1) is installed on the pump discharge conduit (304). In embodiments, the growing assembly liquid supply valve (V1) is installed on the pump discharge conduit (304) after the filters (F1, F2). The growing assembly liquid supply valve (V1) is equipped with a controller (CV1) that sends a signal (XV1) to or from a computer (COMP).

An electrical conductivity sensor (E2) is installed on the pump discharge conduit (304). In embodiments, the electrical conductivity sensor (E2) is installed on the pump discharge conduit (304) after the filters (F1, F2). The electrical conductivity sensor (E2) is configured to output a signal (XE2) to the computer (COMP). The electrical conductivity sensor (E2) measures the electrical conductivity of the water passing through the pump discharge conduit (304).

A liquid heat exchanger (HX3) is installed on the pump discharge conduit (304). In embodiments, the liquid heat exchanger (HX3) is installed on the pump discharge conduit (304) after the filters (F1, F2). The liquid heat exchanger (HX3) is configured increase or decrease the temperature of the water passing through the pump discharge conduit- (304).

A liquid temperature sensor (T3) is installed on the pump discharge conduit (304). In embodiments, the liquid temperature sensor (T3) is installed on the pump discharge conduit (304) after the filters (F1, F2). In embodiments, the liquid temperature sensor (T3) is installed on the pump discharge conduit (304) after the liquid heat exchanger (HX3). The liquid temperature sensor (T3) is configured to input a signal (XT3) to the computer (COMP).

In embodiments, the growing assembly liquid supply valve (V1), first growing assembly liquid supply valve (V3), and/or the second growing assembly liquid supply valve (V4), may continuously be open to permit a continuous flow of liquid into the growing assemblies (100, 200). In embodiments, the growing assembly liquid supply valve (V1), first growing assembly liquid supply valve (V3), and/or second growing assembly liquid supply valve (V4), may be opened and closed by their controllers (CV1, CV3, CV4) and operated by a computer (COMP). In embodiments, the growing assembly liquid supply valve (V1), first growing assembly liquid supply valve (V3), and/or second growing assembly liquid supply valve (V4), may be opened and closed by their controllers (CV1, CV3, CV4) and operated by a computer (COMP) on a timer.

It is preferred to have the valves (V1, V3, V4) operated in a plurality of modes of operation. In embodiments, a first mode of operation includes having the growing assembly liquid supply valve (V1), first growing assembly liquid supply valve (V3), second growing assembly liquid supply valve (V4), all in an open valve position to transfer liquid from the common reservoir (500) into the growing assemblies (100, 200). In embodiments, a second mode of operation includes having the growing assembly liquid supply valve (V1) open, first growing assembly liquid supply valve (V3) closed, and second growing assembly liquid supply valve (V4) closed, to stop the transfer liquid to the growing assemblies (100, 200). In embodiments, a third mode of operation includes having the growing assembly liquid supply valve (V1) open, first growing assembly liquid supply valve (V3) open, second growing assembly liquid supply valve (V4) closed, to transfer liquid to the first growing assembly (100) and not into the second growing assembly (200). In embodiments, a fourth mode of operation includes having the growing assembly liquid supply valve (V1) open, first growing assembly liquid supply valve (V3) closed, second growing assembly liquid supply valve (V4) open, to transfer liquid to the second growing assembly (200) and not into the first growing assembly (100).

In embodiments, the farming superstructure system (FSS) is operated in a manner that switches from one mode of operation to another mode of operation. In embodiments, the farming superstructure system (FSS) is operated in a manner that switches on a cyclical basis from: a first mode of operation to the second mode of operation; a second mode of operation to the first mode of operation. In embodiments, the farming superstructure system (FSS) is operated in a manner that switches on a cyclical basis from: a third mode of operation to the fourth mode of operation; a fourth mode of operation to the third mode of operation. It is preferred to turn on and off at least one of the valves (V1, V3, V4) in a cyclical manner to permit to prevent the roots of the *cannabis* from receiving too much mist or spray.

In embodiments, the first mode of operation lasts for 5 seconds open followed by the second mode of operation lasting for 600 seconds closed. In embodiments, the third mode of operation lasts for 5 seconds open followed by the fourth mode of operation lasting for 600 seconds closed. In embodiments, water is transferred to the first growing assembly (100) for 5 seconds followed by not transferring water to the first growing assembly (100) for 600 seconds. In embodiments, water is transferred to the second growing assembly (200) for 5 seconds followed by not transferring water to the second growing assembly (200) for 600 seconds. In embodiments, water is transferred to both the first and second growing assemblies (100, 200) for 5 seconds followed by not transferring water to both the first and second growing assemblies (100, 200) for 600 seconds. 5 divided by 600 is 0.008.

In embodiments, the first mode of operation lasts for 60 seconds open followed by the second mode of operation lasting for 180 seconds closed. In embodiments, the third mode of operation lasts for 60 seconds open followed by the fourth mode of operation lasting for 180 seconds closed. In embodiments, water is transferred to the first growing assembly (100) for 60 seconds followed by not transferring water to the first growing assembly (100) for 180 seconds. In embodiments, water is transferred to the second growing assembly (200) for 60 seconds followed by not transferring water to the second growing assembly (200) for 180 seconds. 60 divided by 180 is 0.333.

The duration of time when liquid is transferred to at least one growing assembly (100, 200) divided by the duration of time when liquid is not transferred to at least one growing assembly (100, 200) may be considered an open-close ratio. The open-close ratio may be the duration of time when at least one valve (V1, V3, V4) is open in seconds divided by the subsequent duration of time when the same valve is closed in seconds before the same valve opens again. In embodiments, the open-close ratio ranges from between 0.008 to 0.33. In embodiments, the computer (COMP) opens and closes the valve (V1, V3, V4) to periodically introduce the pressurized liquid mixture into to each growing assembly with an open-close ratio ranging from between 0.008 to 0.33, the open-close ratio is defined as the duration of time when the valve (V1, V3, V4) is open in seconds divided by the subsequent duration of time when the same valve is closed in seconds before the same valve opens again. The computer (COMP) opens and closes the valves (V1, V3, V4) to periodically introduce the pressurized liquid mixture into to each growing assembly with an open-close ratio ranging from between 0.008 to 0.33.

In embodiments, the open-close ratio varies. The open-close ratio may vary throughout the life of the *cannabis* contained within the growing assemblies (100, 200). The open-close ratio may vary throughout the stage of development of the *cannabis* contained within the growing assemblies (100, 200). Stages of development of the *cannabis* include flowering, pollination, fertilization. In embodiments, the open-close ratio is greater during flowering and less during pollination. In embodiments, the open-close ratio is greater during pollination and less during fertilization. In embodiments, the open-close ratio is greater during flowering and less during fertilization. In embodiments, the open-close ratio is less during flowering and greater during pollination. In embodiments, the open-close ratio is less during pollination and greater during fertilization. In embodiments, the open-close ratio is less during flowering and greater during fertilization.

The open-close ratio may vary throughout a 24-hour duration of time. In embodiments, the open-close ratio is increased during the day-time and decreased during the night-time relative to one another. In embodiments, the open-close ratio varies increased during the night-time and decreased during the day-time relative to one another. Night-time is defined as the time between evening and morning. Day-time is defined as the time between morning and evening.

In embodiments, carbohydrates may be added to the common reservoir (500). The carbohydrates are comprised of one or more from the group consisting of sugar, sucrose, molasses, and plant syrups. In embodiments, enzymes may be added to the common reservoir (500). The enzymes are comprised of one or more from the group consisting of amino acids, orotidine 5'-phosphate decarboxylase, OMP decarboxylase, glucanase, beta-glucanase, cellulase, xylanase, Hygrozyme®, Cannazyme®, Microzyme®, and Sensizyme®. In embodiments, vitamins may be added to the common reservoir (500). The vitamins are comprised of one or more from the group consisting of vitamin B, vitamin C, vitamin D, and vitamin E. In embodiments, hormones may be added to the common reservoir (500). The hormones are comprised of one or more from the group consisting of auxins, cytokinins gibberellins, abscic acid, brassinosteroids, salicylic acid, jasmonates, plant peptide hormones, polyamines, nitric oxide, strigolactones, and triacontanol. In embodiments, microorganisms may be added to the common reservoir (500). The microorganisms are comprised of one or more from the group consisting of bacteria, diazotroph bacteria, diazotroph archaea, *Azotobacter vinelandii*, *Clostridium pasteurianum*, fungi, arbuscular mycorrhizal fungi, *Glomus etunicatum, Glomus intraradices, Rhizophagus irregularis*, and *Glomus mosseae*.

In embodiments, an analyzer (AZ) may be incorporated into the farming superstructure system (FSS). In embodiments, the analyzer analyzes the contents within the common reservoir (500) of analyzes the mixture of water, macro-nutrients, micro-nutrients, and a pH adjustment solution to determine the whether any water, macro-nutrients, micro-nutrients, and a pH adjustment need to be added. A signal (XAZ) from the analyzer may be sent to a computer (COMP). From the signal (XAZ) obtained by the computer (COMP), the computer (COMP) may calculate and automate the introduction of water, macro-nutrients, micro-nutrients, and a pH adjustment solution introduced to the system. In embodiments, the analyzer (AZ) may include a mass spectrometer, fourier transform infrared spectroscopy, infrared spectroscopy, potentiometric pH meter, pH meter, electrical conductivity meter, or liquid chromatography.

FIG. 1B

Figure 1B:
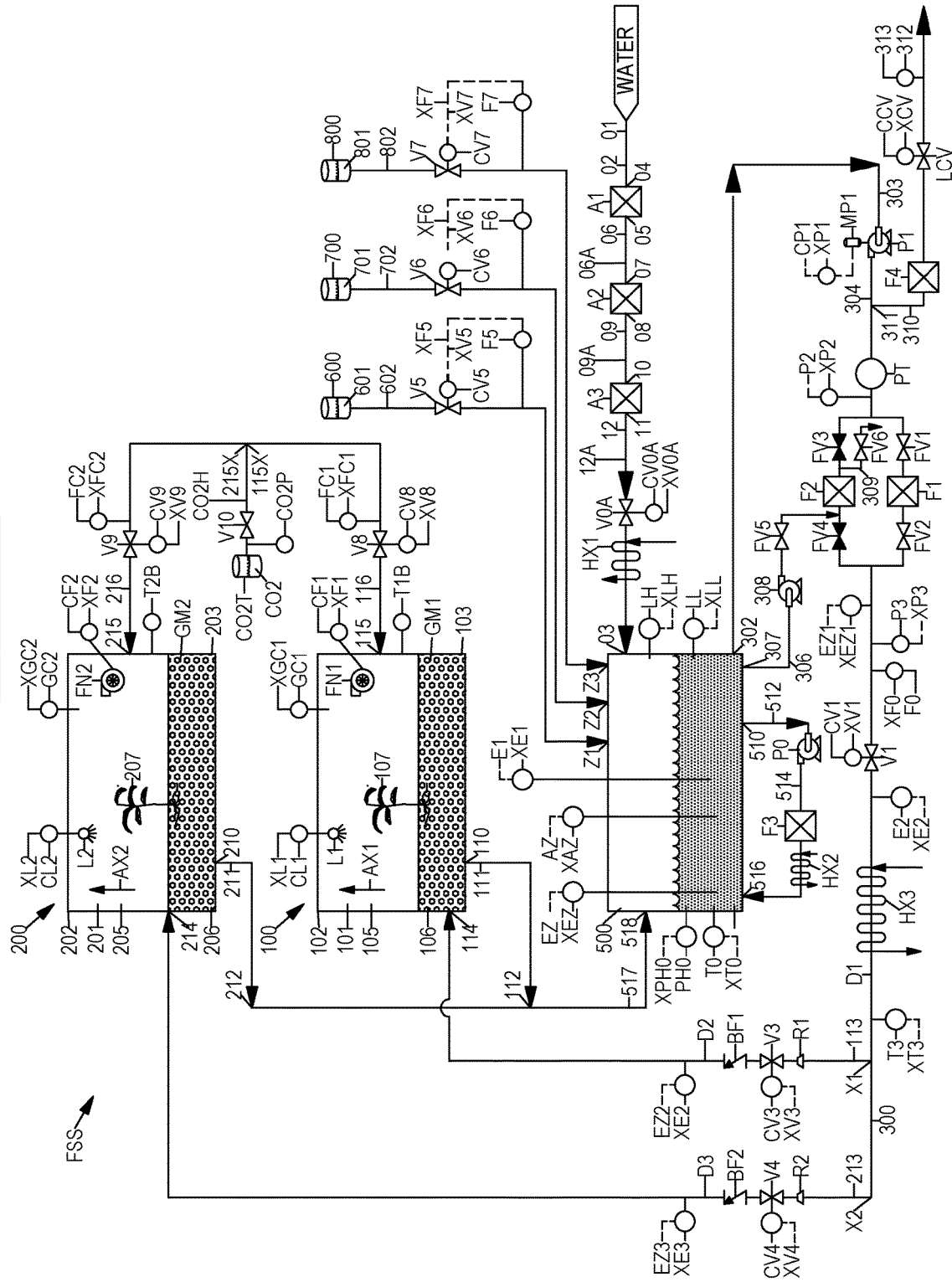
FIG. 1B depicts one non-limiting embodiment of a farming superstructure system (FSS) that includes a first growing assembly (100) having a first growing medium (GM1) and a second growing assembly (200) having a second growing medium (GM2).

FIG. 1B depicts one non-limiting embodiment of a farming superstructure system (FSS) that includes a first growing assembly (100) having a first growing medium (GM1) and a second growing assembly (200) having a second growing medium (GM2).

In embodiments, the first and second growing mediums (GM1, GM2) can be comprised of one or more from the group consisting of rockwool, perlite, amorphous volcanic glass, vermiculite, clay, clay pellets, LECA (lightweight expanded clay aggregate), coco-coir, fibrous coconut husks, soil, dirt, peat, peat moss, sand, soil, compost, manure, fir bark, foam, gel, oasis cubes, lime, gypsum, and quartz. In embodiments, a fungus may be added to the growing medium. In embodiment, the fungus may be mycorrhiza.

FIG. 1B differs from FIG. 1A since a fabric (104, 204) does not partition the growing assembly (100, 200) into an upper-section (105, 205) and a lower-section (106, 206). Instead, the *cannabis* (107, 207) are in contact with the growing medium (GM1, GM2), and the growing medium (GM1, GM2) partitions each growing assembly (100, 200) into an upper-section (105, 205) and a lower-section (106, 206). Liquid from with pump (P1) is introduced into the interior (101, 201) of each growing assembly (100, 200) via a liquid input (114, 214) where the liquid contacts the growing medium (GM1, GM2). In embodiments, liquid is transferred to the interior (101, 201) of each growing assembly (100, 200) via the liquid input (114, 214) on a periodic basis.

In embodiments, the computer (COMP) controls the lights (L1, L2). In embodiments, the lights (L1, L2) illuminate each growing assembly (100, 200) with an illumination on-off ratio ranging from between 0.5 to 11. The illumination on-off ratio is defined as the duration of time when the lights (L1, L2) are on and illuminate the *cannabis* (107, 207) in hours divided by the subsequent duration of time when the lights (L1, L2) are off and are not illuminating the *cannabis* (107, 207) in hours before the lights are turned on again.

In embodiments, the lights (L1, L2) are on and illuminate the *cannabis* for 18 hours and then are turned off for 6 hours. 18 divided by 6 is 3. In embodiments, an illumination on-off ratio of 3 is contemplated. In embodiments, the lights (L1, L2) are on and illuminate the *cannabis* for 20 hours and then are turned off for 4 hours. 20 divided by 4 is 5. In embodiments, an illumination on-off ratio of 5 is contemplated. In embodiments, the lights (L1, L2) are on and illuminate the *cannabis* for 22 hours and then are turned off for 2 hours. 22 divided by 2 is 11. In embodiments, an illumination on-off ratio of 11 is contemplated. In embodiments, the lights (L1, L2) are on and illuminate the *cannabis* for 8 hours and then are turned off for 16 hours. 8 divided by 16 is 0.5. In embodiments, an illumination on-off ratio of 0.5 is contemplated. In embodiments, the lights (L1, L2) are on and illuminate the *cannabis* for 12 hours and then are turned off for 12 hours. 12 divided by 12 is 1. In embodiments, an illumination on-off ratio of 1 is contemplated. In embodiments, the is desirable to operate the growing assemblies at an illumination on-off ratio that is greater than 1 and less than 11. In embodiments, the is desirable to operate the growing assemblies at an illumination on-off ratio that is greater than 0.5 and less than 5.

In embodiments, each growing assembly (100, 200) may include a container that contains a growing medium (GM1, GM2) sufficient to support the roots of the *cannabis* (107, 207). In embodiments, the growing assembly (100, 200) may be a container that contains a growing medium (GM1, GM2).

FIG. 2

FIG. 2 depicts one non-limiting embodiment of a farming superstructure system (FSS) including a first vertically stacked system (1500) including a plurality of vertically stacked growing assemblies (100, 200) integrated with a first and second vertical support structure (VSS1, VSS2) wherein the first growing assembly (100) is supported by a first horizontal support structure (SS1) and a second growing assembly (200) is supported by a second horizontal support structure (SS2).

The first vertically stacked system (1500) shown in FIG. 2 has a base height (H0) located on a floor or support surface. The first vertically stacked system (1500) shown in FIG. 2 has a total height (HT). In embodiments, the total height (HT) may be dictated by the total height of the first and second vertical support structure (VSS1, VSS2). The common reservoir (500) may be positioned on the base height (H0) located on a floor or support surface. The common reservoir (500) has a liquid level (LIQ) that is located below the reservoir height (H500). The reservoir height (H500) is the height of the common reservoir (500).

The bottom (103) of the first growing assembly (100) is located at a first base height (H100A). The first base height (H100A) is the vertical location on the first vertically stacked system (1500) where the first growing assembly (100) is supported by a first horizontal support structure (SS1). The first partition height (H100B) is the vertical location on the first vertically stacked system (1500) of the partition (104) of the first growing assembly (100). The first growing assembly height (H100C) is the vertical location on the first vertically stacked system (1500) where the top (102) of the first growing assembly (100) is located.

The second base height (H200A) is the vertical location on the first vertically stacked system (1500) where the second growing assembly (200) is supported by a second horizontal support structure (SS2). The second partition height (H200B) is the vertical location on the first vertically stacked system (1500) of the partition (204) of the second growing assembly (200). The second growing assembly height (H100C) is the vertical location on the first vertically stacked system (1500) where the top (202) of the second growing assembly (200) is located.

The first vertically stacked system (1500) has a width (W1500). In embodiments, the width (W1500) is greater than the difference between the first growing assembly height (H100C) and the first base height (H100A). In embodiments, the width (W1500) is greater than the difference between the second growing assembly height (H200C) and the second base height (H200A).

FIG. 3

Figure 3:
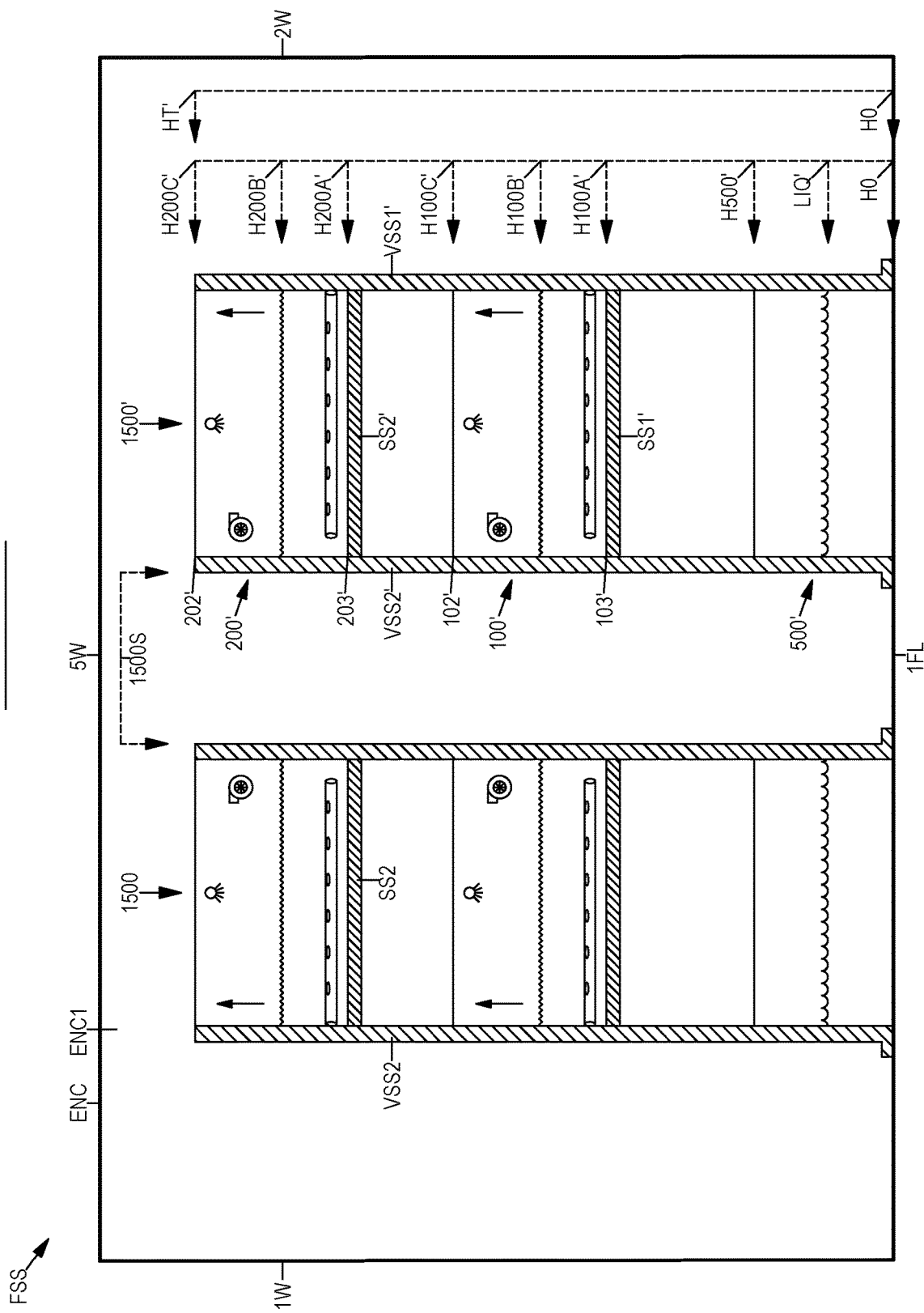
FIG. 3 depicts one non-limiting embodiment of a plurality of vertically stacked systems (1500, 1500') including a first vertically stacked system (1500) and a second vertically stacked system (1500'), the first vertically stacked system (1500) as depicted in FIG. 2, also both vertically stacked systems (1500, 1500') are contained within an enclosure (ENC) having an interior (ENC1).

FIG. 3 depicts one non-limiting embodiment of a plurality of vertically stacked systems (1500, 1500') including a first vertically stacked system (1500) and a second vertically stacked system (1500'), the first vertically stacked system (1500) as depicted in FIG. 2, also both vertically stacked systems (1500, 1500') are contained within an enclosure (ENC) having an interior (ENC1).

The second vertically stacked system (1500') shown in FIG. 3 has a base height (H0) located on a floor or support surface. The second vertically stacked system (1500') shown in FIG. 3 has a total height (HT'). In embodiments, the total height (HT') may be dictated by the total height of the first and second vertical support structure (VSS1', VSS2'). The common reservoir (500') may be positioned on the base height (H0) located on a floor or support surface. The common reservoir (500') has a liquid level (LIQ') that is located below the reservoir height (H500'). The reservoir height (H500') is the height of the common reservoir (500).

The bottom (103') of the first growing assembly (100') is located at a first base height (H100A'). The first base height (H100A') is the vertical location on the second vertically stacked system (1500') where the first growing assembly (100') is supported by a first horizontal support structure (SS1'). The first partition height (H100B) is the vertical location on the second vertically stacked system (1500') of the partition (104') of the first growing assembly (100'). The first growing assembly height (H100C') is the vertical location on the second vertically stacked system (1500') where the top (102') of the first growing assembly (100') is located.

The second base height (H200A') is the vertical location on the second vertically stacked system (1500') where the second growing assembly (200') is supported by a second horizontal support structure (SS2'). The second partition height (H200B') is the vertical location on the second vertically stacked system (1500') of the partition (204') of the second growing assembly (200'). The second growing assembly height (H100C') is the vertical location on the second vertically stacked system (1500') where the top (202') of the second growing assembly (200') is located.

The second vertically stacked system (1500') has a width (W1500'). In embodiments, the width (W1500') is greater than the difference between the first growing assembly height (H100C') and the first base height (H100A'). In embodiments, the width (W1500') is greater than the difference between the second growing assembly height (H200') and the second base height (H200A').

A spacing (1500S) exists between the first vertically stacked system (1500) and the second vertically stacked system (1500'). In embodiments, the spacing (1500S) between the first vertically stacked system (1500) and second vertically stacked system (1500') is less than the width (W1500, W1500) of either of the first vertically stacked system (1500) and second vertically stacked system (1500'). In embodiments, the spacing (1500S) between the first vertically stacked system (1500) and second vertically stacked system (1500') is greater than the width (W1500, W1500) of either of the first vertically stacked system (1500) and second vertically stacked system (1500'). In embodiments, the spacing (1500S) between the first vertically stacked system (1500) and second vertically stacked system (1500') ranges between 3 feet and 12 feet, or 4 feet to 8 feet, or 5 feet to 6 feet.

FIG. 3 shows the first vertically stacked system (1500) and a second vertically stacked system (1500') contained within an enclosure (ENC) having an interior (ENC1). In embodiments, the enclosure may be an area that is sealed off with an artificial or natural barrier. In embodiments, the enclosure may be a building, or a structure with a roof and walls. In embodiments, the enclosure may be a cube container conforming to the International Organization for Standardization (ISO) specifications. FIG. 3 shows the enclosure (ENC) having a first side wall (1W), second side wall (2W), top (5W), and a floor (1FL). For completeness, FIG. 4A shows the enclosure (ENC) of FIG. 3 with a third side wall (3W) and a fourth side wall (4W).

In embodiments, the top (5W), may be comprised of one or more from the group consisting of thatch, overlapping layers, shingles, ceramic tiles, membrane, fabric, plastic, metal, concrete, cement, solar panels, wood, a membrane, tar paper, shale, tile, asphalt, polycarbonate, plastic, cement, and composite materials. In embodiments, the walls (1W, 2W, 3W, 4W) may be comprised of one or more from the group consisting of metal, concrete, cement, wood, plastic, brick, stone, composite materials, insulation, rockwool, mineral wool, fiberglass, clay, and ceramic.

FIG. 4A

Figure 4A:
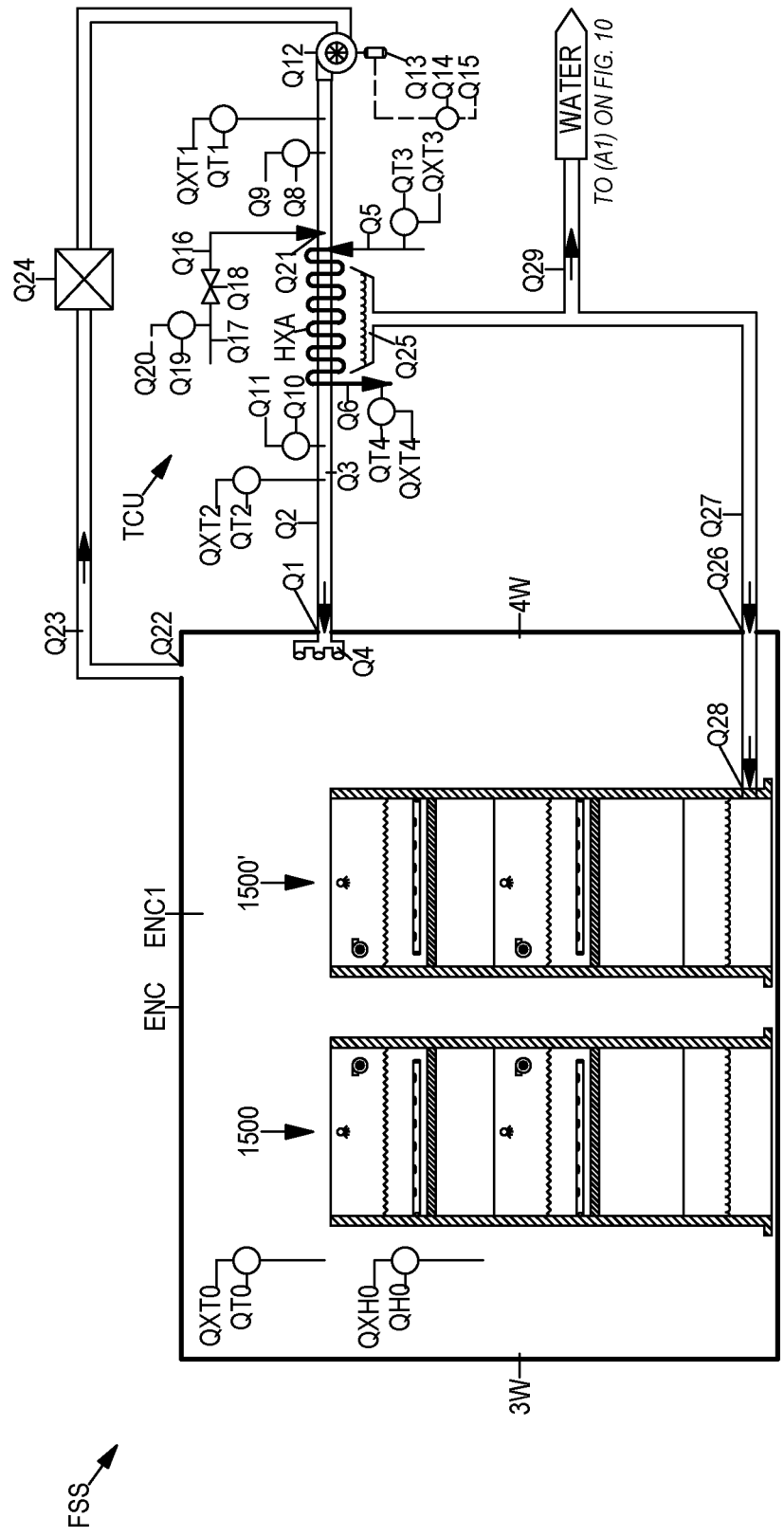
FIG. 4A depicts one non-limiting embodiment of FIG. 3 wherein the enclosure (ENC) is provided with a temperature control unit (TCU) including an air heat exchanger (HXA) that is configured to provide a temperature and/or humidity controlled air supply (Q3) to the interior (ENC1) of the enclosure (ENC) which contains a plurality of vertically stacked systems (1500, 1500').

FIG. 4A depicts one non-limiting embodiment of FIG. 3 wherein the enclosure (ENC) is provided with a temperature control unit (TCU) including an air heat exchanger (HXA) that is configured to provide a temperature and/or humidity controlled air supply (Q3) to the interior (ENC1) of the enclosure (ENC) which contains a plurality of vertically stacked systems (1500, 1500').

The interior (ENC1) of the enclosure (ENC) has an enclosure temperature sensor (QT0) that is configured to output a signal (QXT0) to a computer (COMP). The interior (ENC1) of the enclosure (ENC) has an enclosure humidity sensor (QH0) that is configured to output a signal (QXH0) to a computer (COMP). An air input (Q1) is configured to permit an air supply (Q3) to be transferred to the interior (ENC1) of the enclosure (ENC) via an air supply entry conduit (Q2). An optional inlet distributor (Q4) may be positioned to be in fluid communication with the air supply entry conduit (Q2) to distribute the air supply (Q3) within the interior (ENC1) of enclosure (ENC). In embodiments, the air heater (HXA) provides a heated air supply (Q3) to the interior (ENC1) of the enclosure (ENC) via said air supply entry conduit (Q2) and said air input (Q1). In embodiments, the air heater (HXA) provides a cooled air supply (Q3) to the interior (ENC1) of the enclosure (ENC) via said air supply entry conduit (Q2) and said air input (Q1).

FIG. 4A shows a temperature control unit (TCU) including an air supply fan (Q12) and air heater (HXA) integrated with the interior (ENC1) of the enclosure (ENC). The air supply fan (Q12) is connected to the interior (ENC1) of the enclosure (ENC) via the air supply entry conduit (Q2). The air supply fan (Q12) is equipped with an air supply fan motor (Q13) and controller (Q14) is configured to input and output a signal (Q15) to the computer (COMP). An air heater (HXA) may be interposed in the air supply entry conduit (Q2) in between the air supply fan (Q12) and the enclosure (ENC). In embodiments, the air heater (HXA) may be interposed in the air supply entry conduit (Q2) in between the enclosure (ENC) and the air supply fan (Q12) and interposed on the air discharge exit conduit (Q23).

Water (Q16) in the form of liquid or vapor may be introduced to the air supply entry conduit (Q2) via a water transfer conduit (Q17). A water input valve (Q18), and a water flow sensor (Q19) may also be installed on the water transfer conduit (Q17). The water flow sensor (Q19) is configured to input a signal (Q20) to the computer (COMP).

The air supply (Q3) may be mixed with the water (Q16) in a water and gas mixing section (Q21) of the air supply entry conduit (Q2). FIG. 4A shows the water and gas mixing section (Q21) upstream of the air heater (HXA) but it may alternately also be placed downstream. The air heater (HXA) may be electric, operated by natural gas, combustion, solar energy, fuel cell, heat pipes, or it may be a heat transfer device that uses a working heat transfer medium, such as steam or any other heat transfer medium known to persons having an ordinary skill in the art to which it pertains.

FIG. 4A shows the air heater (HXA) to have a heat transfer medium input (Q5) and a heat transfer medium output (Q6). In embodiments, heat transfer medium input (Q5) of the air heater (HXA) is equipped with a heat exchanger heat transfer medium inlet temperature (QT3) that is configured to input a signal (QXT3) to the computer (COMP). In embodiments, heat transfer medium output (Q6) of the air heater (HXA) is equipped with a heat exchanger heat transfer medium outlet temperature (QT4) that is configured to input a signal (QXT4) to the computer (COMP).

A first humidity sensor (Q8) is positioned on the discharge of the air supply fan (Q12) upstream of the water and gas mixing section (Q21). The first humidity sensor (Q8) is configured to input a signal (Q9) to the computer (COMP). A heat exchanger inlet gas temperature sensor (QT1) may be positioned on the discharge of the air supply fan (Q12) upstream of the air heater (HXA). The heat exchanger inlet gas temperature sensor (QT1) is configured to input a signal (QXT1) to the computer (COMP).

A second humidity sensor (Q10) is positioned on the discharge of the air heater (HXA) upstream of the air input (Q1) to the interior (ENC1) of the enclosure (ENC). The second humidity sensor (Q10) is configured to input a signal (Q11) to the computer (COMP). A heat exchanger outlet gas temperature sensor (QT2) is positioned on the discharge of the air heater (HXA) upstream of the air input (Q1) to the interior (ENC1) of the enclosure (ENC). The heat exchanger outlet gas temperature sensor (QT2) is configured to input a signal (QXT2) to the computer (COMP).

In embodiments, the air supply fan (Q12), air heater (HXA), and air supply (Q2), permit computer automation while integrated with the heat exchanger inlet gas temperature sensor (QT1), heat exchanger outlet gas temperature sensor (QT2), and enclosure temperature sensor (QT0), to operate under a wide variety of automated temperature operating conditions including varying the temperature range in the interior (ENC1) of the enclosure (ENC) from between 50 degrees to 80 degrees Fahrenheit. In embodiments, the interior (ENC1) of the enclosure (ENC) may be maintained within a temperature ranging from between 65 degrees Fahrenheit to 75 degrees Fahrenheit.

In embodiments, the air supply fan (Q12), air heater (HXA), air supply (Q2), and water (Q17) permit the computer automation while integrated with the first humidity sensor (Q8), second humidity sensor (Q10), and enclosure humidity sensor (QH0), to operate under a wide variety of automated operating humidity conditions including varying the humidity range in the growing assembly (100, 200) from between 5 percent humidity to 100 percent humidity. In embodiments, it is preferred to operate from between 35 percent humidity to 55 percent humidity. In embodiments, it is preferred to operate from between 40 percent humidity to 50 percent humidity. In embodiments, it is preferred to operate from between 44 percent humidity to 46 percent humidity.

In embodiments, the air supply fan (Q12) accepts an air supply (Q3) from the interior (ENC1) of the enclosure (ENC) via an air discharge exit conduit (Q23). The air discharge exit conduit (Q23) is connected at one end to the enclosure (ENC) via an air output (Q22) and at another end to the air supply fan (Q12). An air filter (Q24) may be installed on the air discharge exit conduit (Q23) in between the enclosure (ENC) and the air supply fan (Q12) to remove particles prior to entering the air supply fan (Q12) for recycle back to the enclosure (ENC). In embodiments, the air filter (Q24) filters out particulates from the interior (ENC1) of the enclosure (ENC) and the air supply fan (Q12) recycles the filtered air back to the interior (ENC1) of the enclosure (ENC). The filtered air may be cooled or heated prior to being recycled to the interior (ENC1) of the enclosure (ENC).

Figure 10:
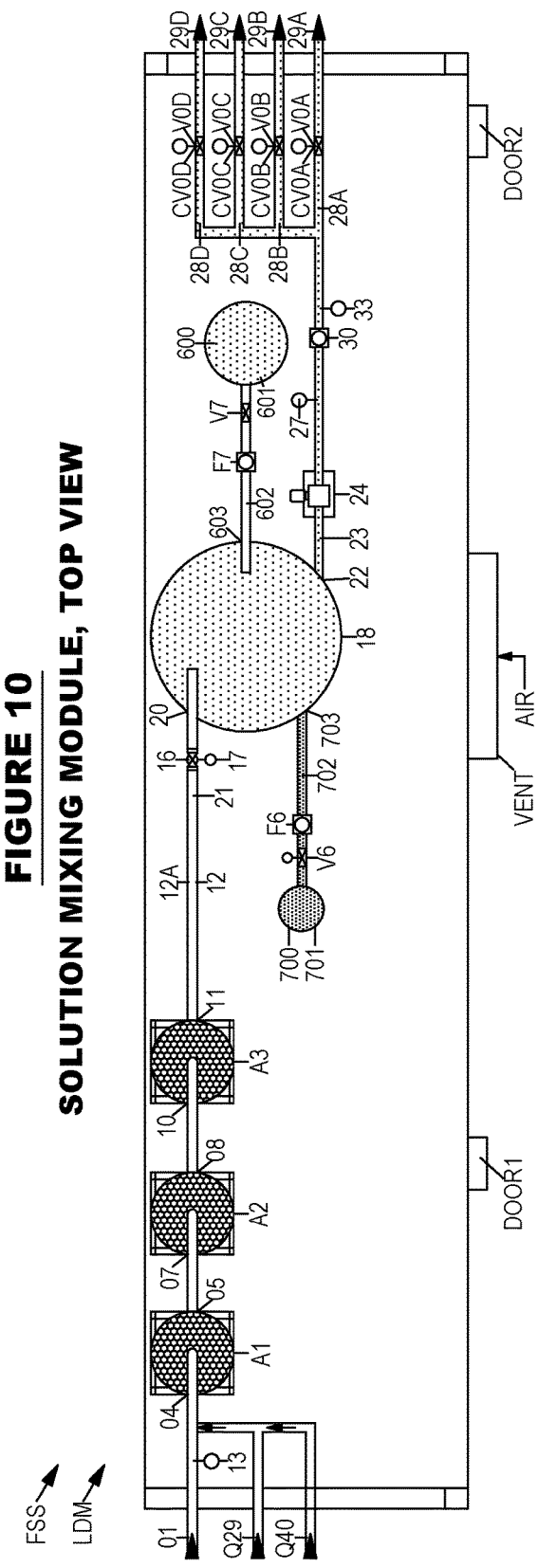
FIG. 10 shows a top view of one embodiment of a liquid distribution module (LDM) provided inside of a cube container conforming to the International Organization for Standardization (ISO) specifications and that is configured to provide a source of liquid to a plurality of plant growing modules (PGM).

In embodiments, the air heater (HXA) adds heat to the interior (ENC1) of the enclosure (ENC). In embodiments, the air heater (HXA) removes heat from the interior (ENC1) of the enclosure (ENC) and as a result may condense water from the air supply (Q3) provided from the from the interior (ENC1) of the enclosure (ENC). In embodiments, where the air heater (HXA) removes heat from the interior (ENC1) of the enclosure (ENC) water is collected in the form of condensate (Q25). In embodiments, the condensate (Q25) may in turn be provided to the enclosure (ENC) via an enclosure condensate input (Q26) and a condensate conduit (Q27). The condensate (Q25) provided to the enclosure (ENC) via an enclosure condensate input (Q26) may be provided to at least one common reservoir (500, 500') via a common tank condensate input (Q28). In embodiments, the condensate (Q25) may contain undesirable compounds (especially viruses and bacteria) and in turn may be provided to the input to the first water treatment unit (A1) as shown in FIG. 10 as a first undesirable compounds-laden condensate (Q29).

FIG. 4B

Figure 4B:
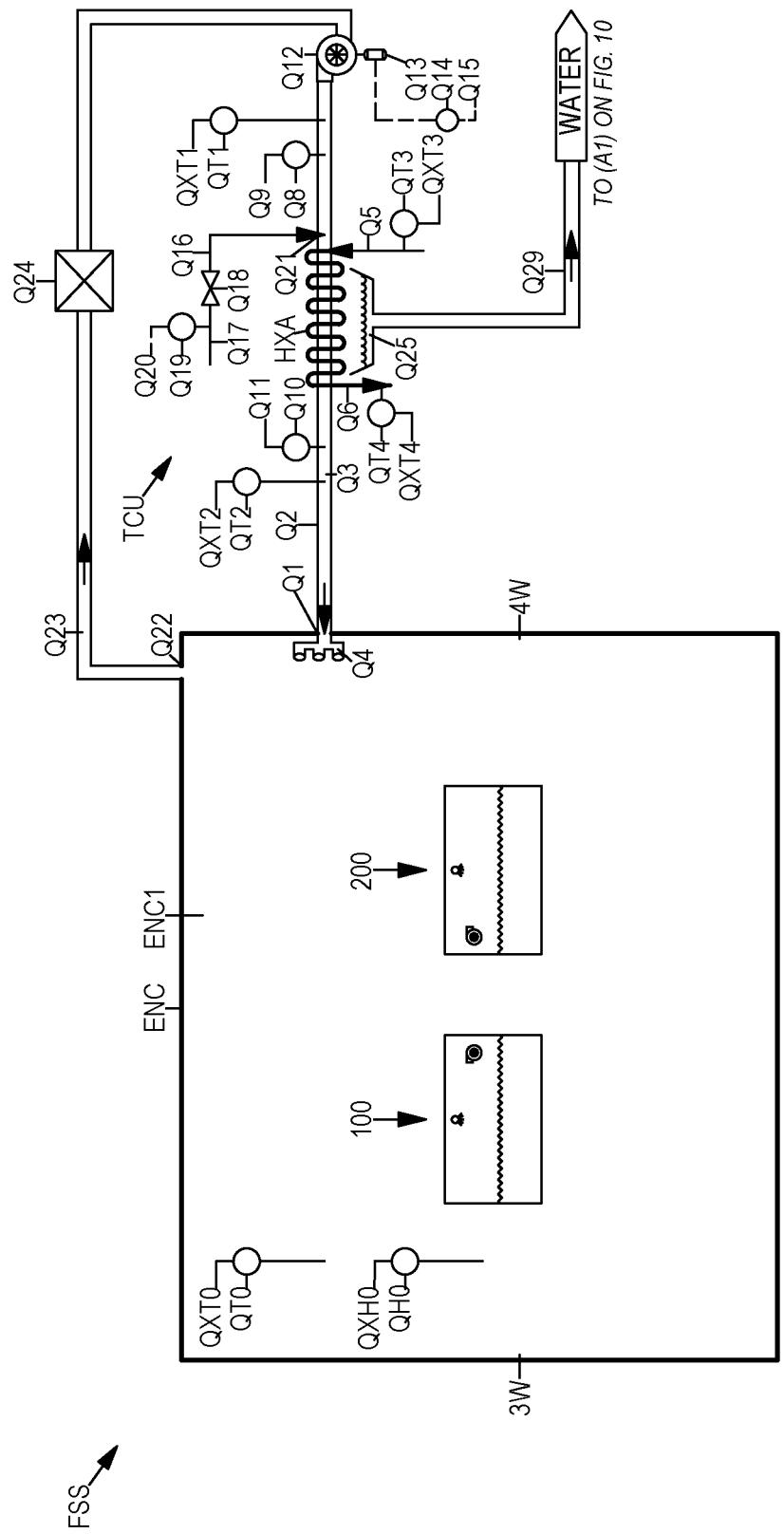
FIG. 4B depicts one non-limiting embodiment of FIG. 1B and FIG. 4A wherein the enclosure (ENC) is provided with a temperature control unit (TCU) including an air heat exchanger (HXA) that is configured to provide a temperature and/or humidity controlled air supply (Q3) to the interior (ENC1) of the enclosure (ENC) which contains a plurality of growing assemblies (100, 200).

FIG. 4B depicts one non-limiting embodiment of FIG. 1B and FIG. 4A wherein the enclosure (ENC) is provided with a temperature control unit (TCU) including an air heat exchanger (HXA) that is configured to provide a temperature and/or humidity controlled air supply (Q3) to the interior (ENC1) of the enclosure (ENC) which contains a plurality of growing assemblies (100, 200).

FIG. 5A

Figure 5A:
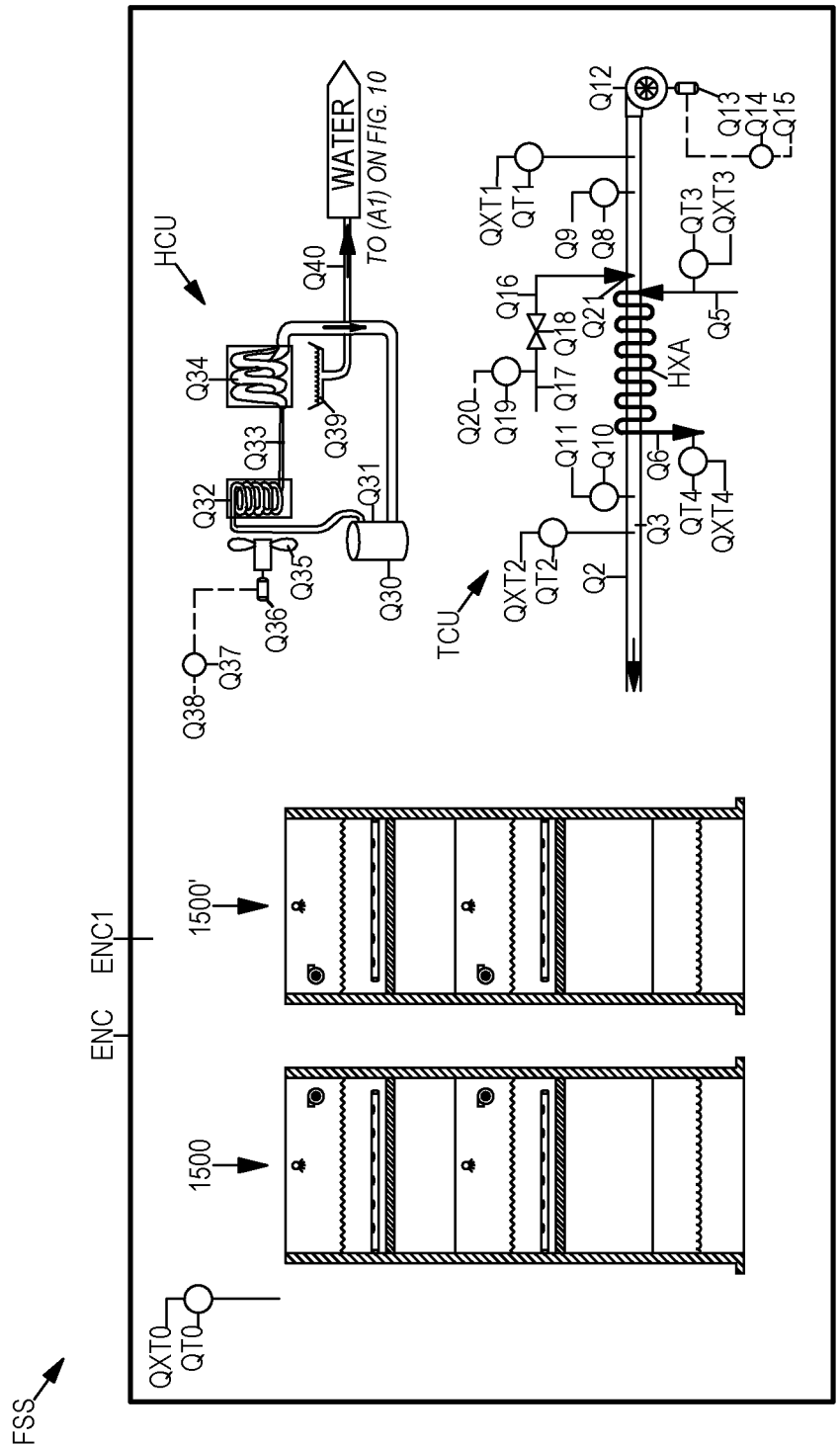
FIG. 5A depicts one non-limiting embodiment of FIG. 4A wherein the temperature control unit (TCU) of FIG. 4A is contained within the interior (ENC1) of the enclosure (ENC) and coupled with a humidity control unit (HCU).

FIG. 5A depicts one non-limiting embodiment of FIG. 4A wherein the temperature control unit (TCU) of FIG. 4A is contained within the interior (ENC1) of the enclosure (ENC) and coupled with a humidity control unit (HCU), FIG. 5A shows the temperature control unit (TCU) of FIG. 4A but contained within the interior (ENC1) of the enclosure (ENC). FIG. 5A also shows a non-limiting embodiment of a humidity control unit (HCU) positioned within the interior (ENC1) of the enclosure (ENC). A portion of the humidity control unit (HCU) may be positioned exterior to the enclosure (ENC) and not positioned within the interior (ENC1).

In embodiments, the humidity control unit (HCU) may include a compressor (Q30), a condenser (Q32), a metering device (Q33), an evaporator (Q34), and a fan (Q35). The fan (Q35) may be equipped with a motor (Q36) and a controller (Q37) that is configured to input or output a signal (Q38) to a computer (COMP).

The compressor (Q31) is connected to the condenser (Q32), the condenser (Q32) is connected to the metering device (Q33), the metering device (Q33) is connected to an evaporator (Q34), and the evaporator (Q34) is connected to the compressor (Q31) to form a closed-loop refrigeration circuit configured to contain a refrigerant (Q31). The metering device (Q33) includes one or more from the group consisting of a restriction, orifice, valve, tube, capillary, and capillary tube. The refrigerant (Q31) is conveyed from the compressor to the condenser, from the condenser to the evaporator through the metering device, and from the evaporator to the compressor. The evaporator (Q34) is positioned within the interior (ENC1) of the enclosure (ENC) and is configured to evaporate refrigerant (Q31) within the evaporator (Q34) by removing heat from the interior (ENC1) of the enclosure (ENC). In embodiments, the evaporator (Q34) is contained within the interior (ENC1) of the enclosure (ENC). In embodiments, the condenser (Q32) is not contained within the interior (ENC1) of the enclosure (ENC). The fan (Q35) is configured to blow air from within the interior (ENC1) of the enclosure (ENC) over at least a portion of the humidity control unit (HCU).

The humidity control unit (HCU) is configured to selectively operate the system in a plurality of modes of operation, the modes of operation including at least:

(1) a first mode of operation in which compression of a refrigerant (Q31) takes place within the compressor (Q30), and the refrigerant (Q31) leaves the compressor (Q30) as a superheated vapor at a temperature above the condensing point of the refrigerant (Q31);

(2) a second mode of operation in which condensation of refrigerant (Q31) takes place within the condenser (Q32), heat is rejected and the refrigerant (Q31) condenses from a superheated vapor into a liquid, and the liquid is cooled to a temperature below the boiling temperature of the refrigerant (Q31); and (3) a third mode of operation in which evaporation of the refrigerant (Q31) takes place, and the liquid phase refrigerant (Q31) boils in evaporator (Q34) to form a vapor or a superheated vapor while absorbing heat from the interior (ENC1) of the enclosure (ENC).

The evaporator (Q34) is configured to absorb heat from the interior (ENC1) of an enclosure (ENC). As a result, the evaporator (Q34) may condense water from the interior (ENC1) of the enclosure (ENC). In embodiments, the evaporator (Q34) condenses water vapor from the interior (ENC1) of an enclosure (ENC) and forms condensate (Q39). In embodiments, the condensate (Q39) may contain undesirable compounds (especially viruses and bacteria) and in turn may be provided to the input to the first water treatment unit (A1) as shown in FIG. 10 as a second undesirable compounds-laden condensate (Q40).

FIG. 5B

Figure 5B:
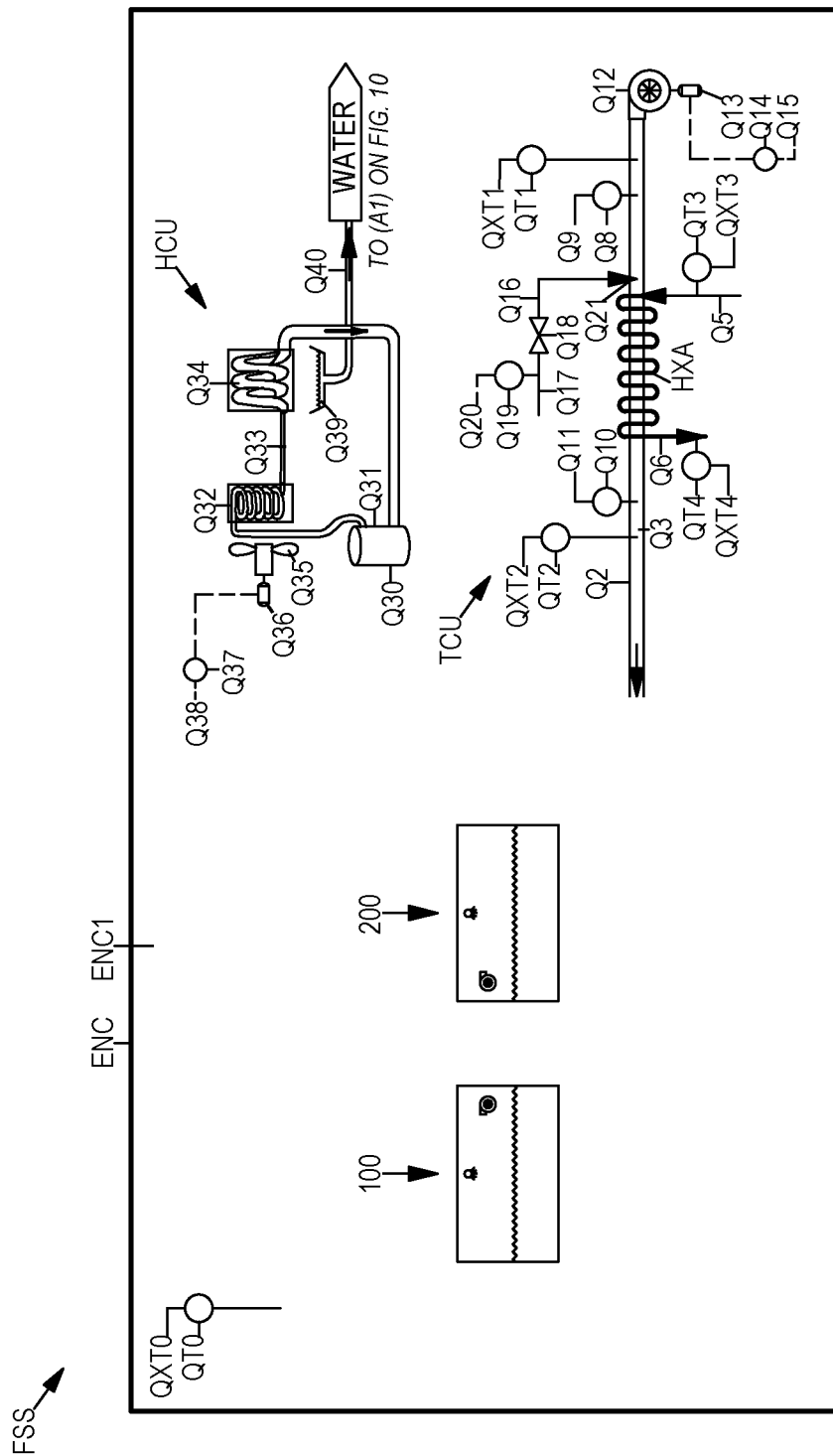
FIG. 5B depicts one non-limiting embodiment of FIG. 4B and FIG. 5A wherein the temperature control unit (TCU) of FIG. 4B is contained within the interior (ENC1) of the enclosure (ENC) and coupled with a humidity control unit (HCU).

FIG. 5B depicts one non-limiting embodiment of FIG. 4B and FIG. 5A wherein the temperature control unit (TCU) of FIG. 4B is contained within the interior (ENC1) of the enclosure (ENC) and coupled with a humidity control unit (HCU).

FIG. 6

FIG. 6 shows a front view of one embodiment of a plant growing module (PGM) provided inside of a cube container conforming to the International Organization for Standardization (ISO) specifications.

FIG. 6 shows a portion of the farming superstructure system (FSS) including a front view of one embodiment of a plant growing module (PGM) provided inside of a cube container conforming to the International Organization for Standardization (ISO) specifications.

The front view shows four growing assemblies (100, 100',200, 200') including two first growing assemblies (100, 100') and two second growing assembly (200, 200') contained within an interior (ENC1) of an enclosure (ENC). FIG. 6 shows the two first growing assemblies (100, 100') and two second growing assembly (200, 200') each equipped with drain ports (110, 110') and drain conduits (111, 111') for draining liquid from each growing assembly (100, 100',200, 200') into a common reservoir (500) via a common drain conduit (517) and drain input (518).

FIG. 6 shows one pump (P1) pulling liquid from one common reservoir (500) and transferring a pressurized liquid through a filter (F1A) into a plurality of liquid supply headers (300, 300') which are in turn then provided to a plurality of first liquid supply conduits (113, 113') and a plurality of second liquid supply conduit (213, 213'). Four liquid supply conduits (113, 113',213, 213') are provided from two liquid supply headers (300, 300') which is provided with pressurized water through one filter (F1A) by one pump (P1) pulling liquid from one common reservoir (500).

Figure 9:
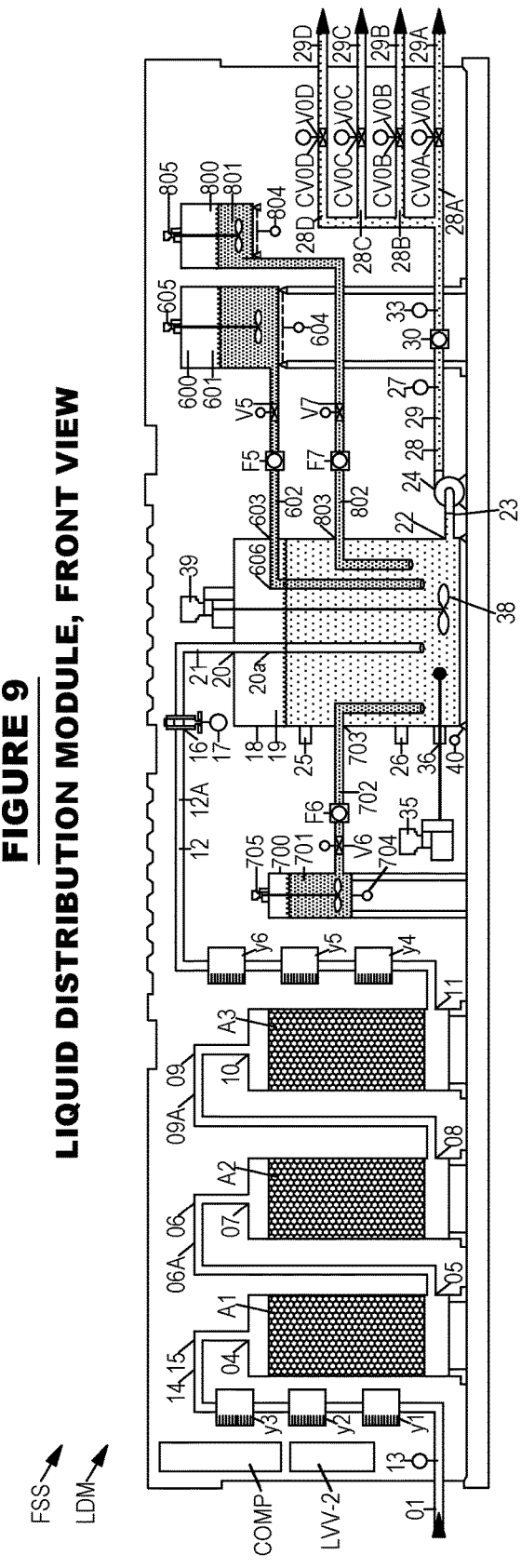
FIG. 9 shows a front view of one embodiment of a liquid distribution module (LDM) provided inside of a cube container conforming to the International Organization for Standardization (ISO) specifications and that is configured to provide a source of liquid to a plurality of plant growing modules (PGM).

The common reservoir (500) of FIG. 6 is provided with a pressurized liquid (29) through a pressurized liquid transfer conduit (28) that enters the common reservoir (500) via a first water inlet (03). FIGS. 9 and 10 describe a liquid distribution module (LDM) that provides the pressurized liquid (29) and transfers it to the plant growing module (PGM) via a pressurized liquid transfer conduit (28).

As depicted in FIG. 6 and FIG. 7, one common reservoir (500) is provided for a first vertically stacked system (1500) and a second vertically stacked system (1500') that contain a total of two first growing assemblies (100, 100') and two second growing assembly (200, 200').

The enclosure (ENC) of FIG. 6 is shown to have a first side wall (1W), second side wall (2W), top (5W), and A floor (1FL). For completeness, the top view of the enclosure (ENC) of FIG. 6 is shown in FIG. 7 and is shown to have a first side wall (1W), second side wall (2W), third side wall (3W), and fourth side wall (4W).

FIG. 7

FIG. 7 shows a top view of one embodiment of a plant growing module (PGM) provided inside of a cube container conforming to the International Organization for Standardization (ISO) specifications.

The enclosure (ENC) of FIG. 7 is shown to have a low voltage shut-off switch (LVV-1), a humidity control unit (HCU) (as described in FIG. 5), and a temperature control unit (TCU) (as described in FIGS. 4A&B). FIG. 7 also shows the first vertically stacked system (1500) and second vertically stacked system (1500') with one common reservoir (500). FIG. 7 also shows a third vertically stacked system (1500") and a fourth vertically stacked system (1500''') each equipped with their own source of pressurized liquid (29C, 29D) provided by a plurality of pressurized liquid transfer conduits (28C, 28D) as described in detail in FIGS. 9 and 10.

FIG. 8

FIG. 8 shows a first side view of one embodiment of a plant growing module (PGM). The enclosure (ENC) of FIG. 8 is shown to have a humidity control unit (HCU) (as described in FIG. 5), and a temperature control unit (TCU) (as described in FIGS. 4A&B). FIG. 8 shows a first vertically stacked system (1500) on the left-hand-side and a second vertically stacked system (1500') on the right-hand-side.

The first vertically stacked system (1500) is shown to have a second growing assembly (200) located above a first growing assembly (100). The second growing assembly (200) has a drain port (210) and a drain conduit (211) that directly drains into a common reservoir (500) located below both growing assemblies (100, 200). The drain conduit (211) from the second growing assembly (200) is secured to the second vertical support structure (VSS2) via a support connection (211X). In embodiments, the drain conduit (211) from the second growing assembly (200) may be secured to the first vertical support structure (VSS1), or alternately to the first horizontal support structure (SS1), or second horizontal support structure (SS2)

The first growing assembly (100) has a drain port (110) and a drain conduit (111) that directly drains into a common reservoir (500) located below both growing assemblies (100, 200). The drain conduit (111) from the first growing assembly (200) is secured to the second vertical support structure (VSS2) via a support connection (111X). In embodiments, the drain conduit (111) from the first growing assembly (100) may be secured to the first vertical support structure (VSS1), or alternately to the first horizontal support structure (SS1).

The second vertically stacked system (1500') is shown to have a second growing assembly (200') located above a first growing assembly (100'). The second growing assembly (200') is configured to receive liquid from the pump (P1) via a second liquid supply conduit (213') and a liquid input (214'). The second liquid supply conduit (213') for the second growing assembly (200') is secured to the second vertical support structure (VSS2') via a support connection (213X'). In embodiments, the second liquid supply conduit (213') for the second growing assembly (200') may be secured to the first vertical support structure (VSS1'), or alternately to the first horizontal support structure (SS1'), or second horizontal support structure (SS2').

The first growing assembly (100') is configured to receive liquid from the pump (P1) via a first liquid supply conduit (113') and a liquid input (114'). The first liquid supply conduit (113') for the first growing assembly (100') is secured to the second vertical support structure (VSS2') via a support connection (113X'). In embodiments, the first liquid supply conduit (113') for the first growing assembly (100') may be secured to the first vertical support structure (VSS1'), or alternately to the first horizontal support structure (SS1'). The spacing (1500S) between the vertically stacked systems (1500, 1500') in FIG. 8 ranges from 3 feet to 5 feet.

FIG. 9

FIG. 9 shows a front view of one embodiment of a liquid distribution module (LDM) provided inside of a cube container conforming to the International Organization for Standardization (ISO) specifications and that is configured to provide a source of liquid to a plurality of plant growing modules (PGM).

FIG. 9 shows one non-limiting embodiment of a liquid distribution module (LDM) to provide a source of liquid to a plurality of plant growing modules (PGM). The liquid distribution module (LDM) of FIGS. 9 and 10 include a first water treatment unit (A1), a second water treatment unit (A2), and a third water treatment unit (A3), that provide a third contaminant depleted water (12) to the interior (19) of a solution tank (18).

The solution tank (18) mixes a water supply (01) with macro-nutrients (601), micro-nutrients (701), and/or a pH adjustment solution (801) to form a mixed solution prior to pumping the mixed solution to at least one common reservoir (500) of at least one plant growing modules (PGM). FIG. 9 depicts the first water treatment unit (A1) to include a cation, a second water treatment unit (A2) to include an anion, and a third water treatment unit (A3) to include a membrane.

A first water pressure sensor (13) is positioned on the water input conduit (14) that is introduced to the first input (04) to the first water treatment unit (A1). In embodiments, a filter (y1), activated carbon (y2), and adsorbent (y3), are positioned on the water input conduit (14) prior to introducing the water supply (01) to the first water treatment unit (A1). The water supply (01) may be considered a contaminant-laden water (15) that includes positively charged ions, negatively charged ions, and undesirable compounds. A first contaminant depleted water (06) is discharged by the first water treatment unit (A1) by a first output (05). The first contaminant depleted water (06) may be a positively charged ion depleted water (06A). The first contaminant depleted water (06) is then transferred to the second water treatment unit (A2) via a second input (07). A second contaminant depleted water (09) is discharged by the second water treatment unit (A2) by a second output (08). The second contaminant depleted water (09) may be a negatively charged ion depleted water (09A). The second contaminant depleted water (09) is then transferred to the third water treatment unit (A3) via a third input (10). A third contaminant depleted water (12) is discharged by the third water treatment unit (A3) by a third output (11). The third contaminant depleted water (12) may be an undesirable compounds depleted water (12A). The third contaminant depleted water (12) is then transferred to the interior (19) of a solution tank (18) via a water supply conduit (21) and water input (20).

Within the interior (19) of the solution tank (18), the third contaminant depleted water (12) may be mixed with macro-nutrients (601) from a macro-nutrient supply tank (600), micro-nutrients (701) from a micro-nutrient supply tank (700), and/or a pH adjustment solution (801) from a micro-nutrient supply tank (700). In embodiments, a cation (y4), an anion (y5), and a polishing unit (y6), are positioned on the water supply conduit (21) in between the third water treatment unit (A3) and the water input (20) of the solution tank (18). The polishing unit (y6) may be any type of conceivable device to improve the water quality such as an ultraviolet unit, ozone unit, microwave unit, or the like.

In embodiments, water supply valve (16) is positioned on the water supply conduit (21) in between the third water treatment unit (A3) and the water input (20) of the solution tank (18). The water supply valve (16) is equipped with a controller (17) that inputs or outputs a signal from a computer (COMP). In embodiments, the solution tank (18) is equipped with a high-level sensor (25) and a low-level sensor (26). The high-level sensor (25) is used for detecting a high level and the low-level sensor (26) is used for detecting a low level. The high-level sensor (25) is configured to output a signal to the computer (COMP) when the high-level sensor (25) is triggered by a high level of liquid within the solution tank (18). The low-level sensor (26) is configured to output a signal to the computer (COMP) when the low-level sensor (26) is triggered by a low level of liquid within the solution tank (18). In embodiments, when the low-level sensor (26) sends a signal to the computer (COMP), the water supply valve (16) on the water supply conduit (21) is opened and introduces water into the solution tank (18) until the high-level sensor (25) is triggered thus sending a signal to the computer (COMP) to close the water supply valve (16). This level control loop including the high-level sensor (25) for detecting a high level and a low-level sensor (26) for detecting a lower level may be coupled to the operation of the water supply valve (16) for introducing a water supply (01) through a first water treatment unit (A1), a second water treatment unit (A2), and a third water treatment unit (A3), to provide a third contaminant depleted water (12) to the interior (19) of a solution tank (18). The liquid distribution module (LDM) is equipped with a low voltage shut-off switch (LVV-2).

The interior (19) of the solution tank (18) is equipped with an oxygen emitter (35) for oxygenating the water within. The oxygen emitter (35) is connected to the interior (19) of the solution tank (18) via an oxygen emitter connection (36) which protrudes the solution tank (18). The solution tank (18) may be placed on a load cell (40) for measuring the mass of the tank. The solution tank (18) may be equipped with a mixer (38) for mixing water with macro-nutrients (601), micro-nutrients (701), and/or a pH adjustment solution (801). The mixer (38) may be of an auger or blade type that is equipped with a motor (39).

The solution tank (18) has a water output (22) that is connected to a water discharge conduit (23). The water discharge conduit (23) is connected at one end to the water output (22) of the solution tank (18) and at another end to a water supply pump (24). The water supply pump (24) provides a source of pressurized liquid (29) via a pressurized liquid transfer conduit (28).

A second water pressure sensor (27) is positioned on the pressurized liquid transfer conduit (28). A flow sensor (30) and a water quality sensor (33) may be positioned on the pressurized liquid transfer conduit (28). The water quality sensor (33) can measure electrical conductivity or resistivity. The pressurized liquid transfer conduit (28) can be split into a plurality of streams for providing to a plurality of plant growing modules (PGM) having a plurality of common reservoirs (500, 500', 500", 500''').

The pressurized liquid transfer conduit (28) can be split into a plurality of streams including a first pressurized liquid transfer conduit (28A) for sending to a common tank (500) for the first vertically stacked system (1500) and second vertically stacked system (1500') of FIG. 6, a second pressurized liquid transfer conduit (28B) as a back-up water source to the common tank (500) of FIG. 6, a third pressurized liquid transfer conduit (28C) for the common tank (500") for the third vertically stacked system (1500") of FIG. 6, and a fourth pressurized liquid transfer conduit (28D) for the common tank (500''') for the fourth vertically stacked system (1500''') of FIG. 6.

FIG. 10

FIG. 10 shows a top view of one embodiment of a liquid distribution module (LDM) provided inside of a cube container conforming to the International Organization for Standardization (ISO) specifications and that is configured to provide a source of liquid to a plurality of plant growing modules (PGM).

FIG. 11

Figure 11:
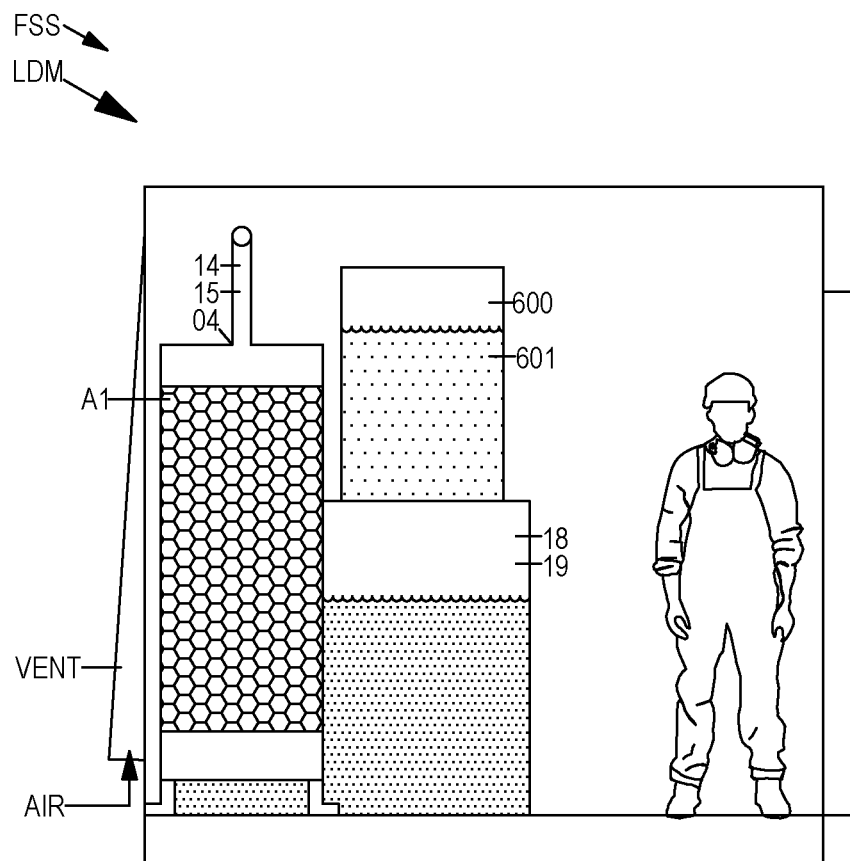
FIG. 11 shows a first side view of one embodiment of a liquid distribution module (LDM).

FIG. 11 shows a first side view of one embodiment of a liquid distribution module (LDM).

FIG. 12

FIG. 12 shows one non-limiting embodiment of a fabric (104) used in a growing assembly (100), the fabric (104) having a multi-point temperature sensor (MPT100) connected thereto for measuring temperatures at various lengths along the sensor's length.

FIGS. 12 and 13 disclose a fabric (104) that includes a multi-point temperature sensor (MPT100). The fabric (104) may be used in each of the growing assemblies (100, 200). The fabric has a width (104W) and a length (104L). The multi-point temperature sensor (MPT100) is connected to the fabric (104) and is configured to measure the temperature of the fabric (104) along several points along the width (104W).

FIG. 12 shows the multi-point temperature sensor (MPT100) having 8 temperature sensor elements to measure the temperature across a first distance (104W1), second distance (104W2), third distance (104W), fourth distance (104W4), fifth distance (104W5), sixth distance (104W6), seventh distance (104W7), and eighth distance (104W8). In embodiments, each of the 8 temperature sensor elements is configured to input a signal to the computer (COMP). The temperature element at the first distance (104W1) sends a first signal (XMPT1) to a computer (COMP). The temperature element at the second distance (104W2) sends a second signal (XMPT2) to a computer (COMP). The temperature element at the third distance (104W) sends a third signal (XMPT3) to a computer (COMP). The temperature element at the fourth distance (104W4) sends a fourth signal (XMPT4) to a computer (COMP). The temperature element at the fifth distance (104W5) sends a fifth signal (XMPT5) to a computer (COMP). The temperature element at the sixth distance (104W6) sends a sixth signal (XMPT6) to a computer (COMP). The temperature element at the seventh distance (104W7) sends a seventh signal (XMPT7) to a computer (COMP). The temperature element at the eighth distance (104W8) sends an eighth signal (XMPT8) to a computer (COMP). An average temperature of the fabric (104) may be obtained by averaging at least two of the signals from the multi-point temperature sensor (MPT100).

Each of the distances (104W1, 104W2, 104W3, 104W4, 104W5, 104W6, 104W7, 104W8) is measured relative to the base width (104W0) of the fabric (104). In embodiments, the fabric (104) is comprised of one or more from the group consisting of plastic, polyethylene, high-density polyethylene (HDPE), low-density polyethylene (LDPE), polyethylene terephthalate (PET), polyacrylonitrile, and polypropylene.

In embodiments, the fabric (104) is configured to have a wicking height constant characterized by a wicking height range from 0.4 inches to 1.9 inches. The wicking height constant is a measurement of an ability of the fabric (104) to absorb moisture. In embodiments, the fabric (104) is configured to have an absorbance constant characterized by an absorbance range from 0.001 lb/in2 to 0.005 lb/in2. In embodiments, the absorbance constant is a measurement of moisture the fabric retains. In embodiments, the moisture that the fabric (104) retains may be provided by a liquid, mist, spray, water, mixture of water with macro-nutrients, micro-nutrients, pH adjustment solution, carbohydrates, enzymes, vitamins, hormones.

FIG. 13

FIG. 13 shows another one non-limiting embodiment of a fabric (104) used in a growing assembly (100).

FIG. 14

Figure 14:
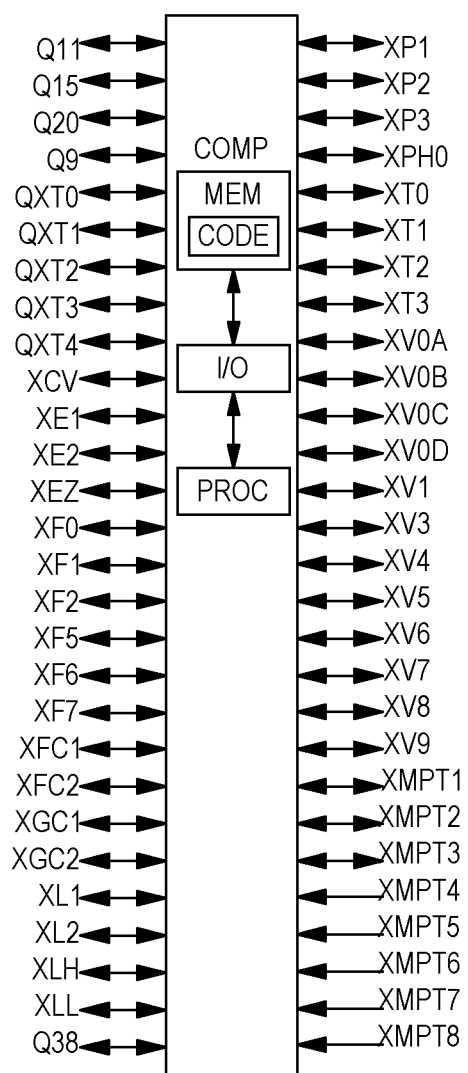
FIG. 14 depicts a computer (COMP) that is configured to input and output signals listed in FIGS. 1-13.

FIG. 14 depicts a computer (COMP) that is configured to input and output signals listed in FIGS. 1-13.

FIG. 15

Figure 15:
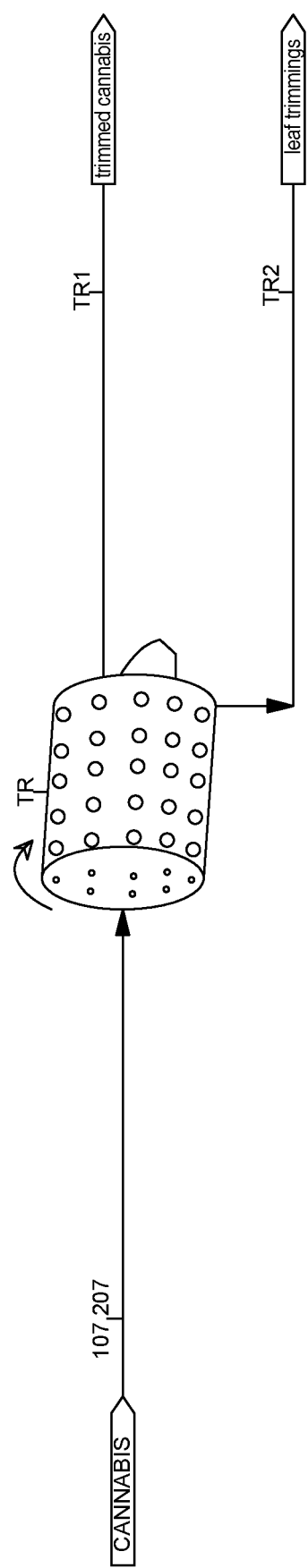
FIG. 15 shows a trimmer (TR) that is configured to trim at least a portion of the *cannabis* (107, 207) that was growing in each growing assembly (100, 200).

FIG. 15 shows a trimmer (TR) that is configured to trim at least a portion of the *cannabis* (107, 207) that was growing in each growing assembly (100, 200).

Once the *cannabis* (107, 207) is harvested from each growing assembly (100, 200), the *cannabis* (107, 207) may be trimmed by use of a trimmer (TR). In embodiments, trimming the *cannabis* (107, 207) is necessary to obtain a final product for medicinal or recreational use. Trimming the *cannabis* (107, 207) may be done for several reasons including improving appearance, taste, and Tetrahydrocannabinol (THC) concentration.

*Cannabis* (107, 207) consists of the flowers, leaves, and stems. Trimming removes at least a portion of the leaves from the flowers. FIG. 15 displays the trimmer (TR) accepting a source of *cannabis* (107, 207) and trims leaves from the flowers to produce trimmed *cannabis* (TR1) and leaf trimmings (TR2).

FIG. 16

Figure 16:
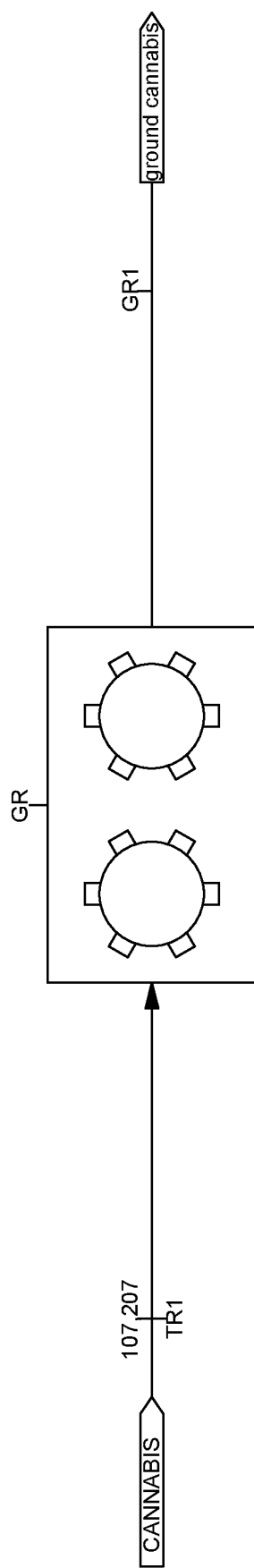
FIG. 16 shows a grinder (TR) that is configured to grind at least a portion of the *cannabis* (107, 207) that was growing in each growing assembly (100, 200).

FIG. 16 shows a grinder (TR) that is configured to grind at least a portion of the *cannabis* (107, 207) that was growing in each growing assembly (100, 200). FIG. 16 also shows a grinder (TR) that is configured to grind at least a portion of the trimmed *cannabis* (TR1) that was trimmed by the trimmer (TR) as shown in FIG. 15.

A grinder (GR) generates a ground *cannabis* (GR1). The grinder may be used to grind (i) a portion of the *cannabis* (107, 207) harvested from each growing assembly (100, 200) or (ii) a portion of the trimmed *cannabis* (TR1) that is trimmed by the trimmer (TR) to produce ground *cannabis* (GR1). In embodiments, grinding of the *cannabis* is required for creating food products including a multifunctional composition.

FIG. 17

Figure 17:
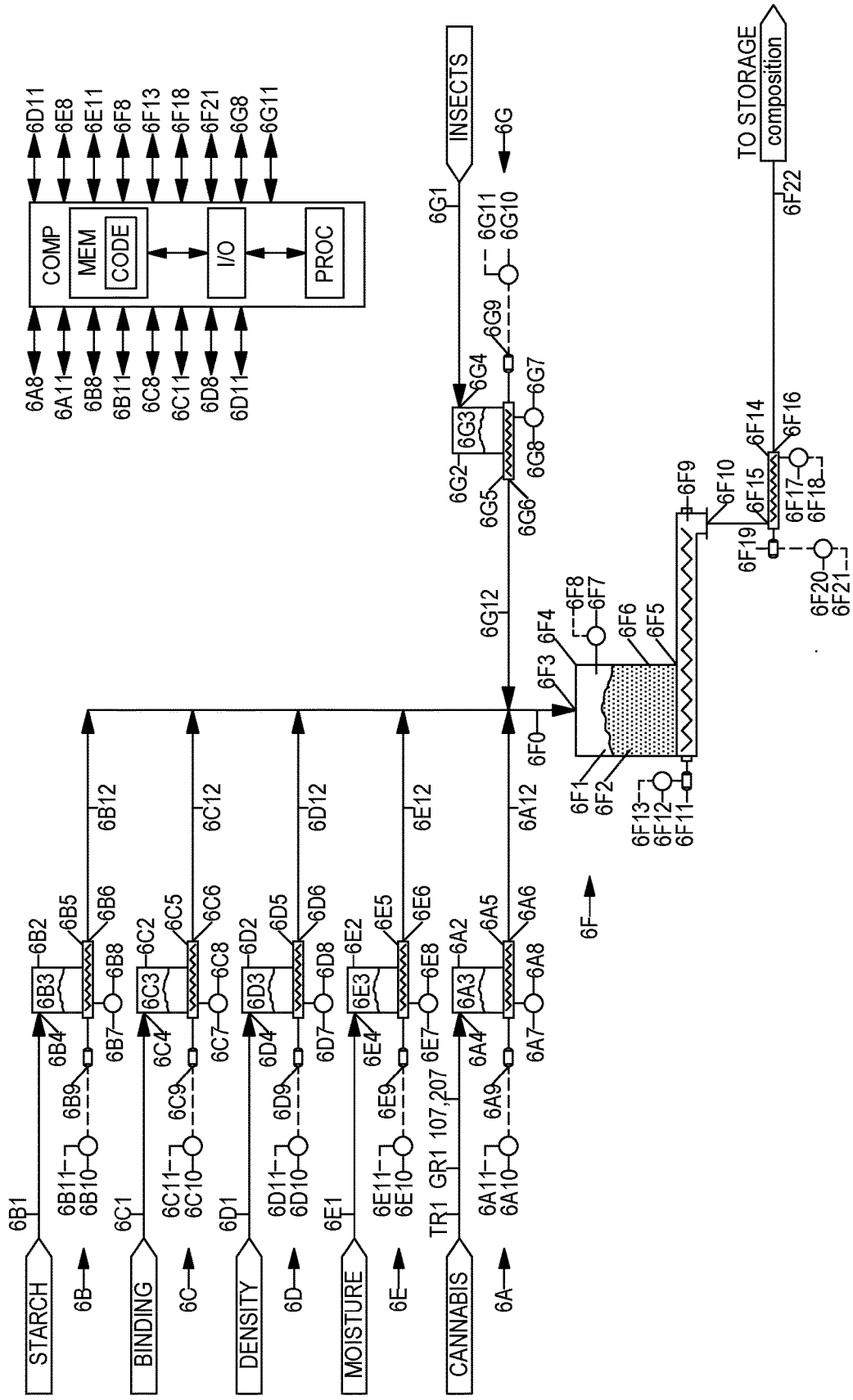
FIG. 17 shows a simplistic diagram illustrating a multifunctional composition mixing module that is configured to generate a multifunctional composition from at least a portion of the *cannabis* (107, 207) that was harvested from each growing assembly (100, 200).

FIG. 17 shows a simplistic diagram illustrating a multifunctional composition mixing module (6000) that is configured to generate a multifunctional composition from at least a portion of the *cannabis* (107, 207) that was harvested from each growing assembly (100, 200). In embodiments, the *cannabis* is first trimmed before being mixed with one or more from the group consisting of fiber-starch, binding agent, density improving textural supplement, moisture improving textural supplement, and insects. In embodiments, the *cannabis* is first trimmed and then grinded before being mixed with one or more from the group consisting of fiber-starch, binding agent, density improving textural supplement, moisture improving textural supplement, and insects.

FIG. 17 displays a *cannabis* distribution module (6A) including a *cannabis* tank (6A2) that is configured to accept at least a portion of the *cannabis* (107, 207) that was harvested from each growing assembly (100, 200). In embodiments, the *cannabis* is first trimmed before being introduced to the *cannabis* tank (6A). In embodiments, the *cannabis* is first trimmed and then grinded before being introduced to the *cannabis* tank (6A).

The *cannabis* tank (6A2) has an interior (6A3), a *cannabis* input (6A4), a *cannabis* conveyor (6A5), and a *cannabis* conveyor output (6A6). The *cannabis* tank (6A2) accepts *cannabis* to the interior (6A3) and regulates and controls an engineered amount of *cannabis* (6A1) downstream to be mixed to form a multifunctional composition. In embodiments, the *cannabis* tank (6A2) accepts trimmed *cannabis* (TR1) to the interior (6A3). In embodiments, the *cannabis* tank (6A2) accepts ground *cannabis* (GR1) to the interior (6A3).

The *cannabis* conveyor (6A5) has an integrated *cannabis* mass sensor (6A7) that is configured to input and output a signal (6A8) to the computer (COMP). The *cannabis* conveyor motor (6A9) has a controller (6A10) that is configured to input and output a signal (6A11) to the computer (COMP). The *cannabis* mass sensor (6A7), *cannabis* conveyor (6A5), and *cannabis* conveyor motor (6A9) are coupled so as to permit the conveyance, distribution, or output of a precise flow of *cannabis* via a *cannabis* transfer line (6A12).

FIG. 17 displays a fiber-starch distribution module (6B) including a fiber-starch tank (6B2) that is configured to accept fiber-starch (6B1). The fiber-starch tank (6B2) has an interior (6B3), a fiber-starch input (6B4), a fiber-starch conveyor (6B5), and a fiber-starch conveyor output (6B6). The fiber-starch tank (6B2) accepts fiber-starch (6B1) to the interior (6B3) and regulates and controls an engineered amount of fiber-starch (6B1) downstream to be mixed to form a multifunctional composition. The fiber-starch conveyor (6B5) has an integrated fiber-starch mass sensor (6B7) that is configured to input and output a signal (6B8) to the computer (COMP). The fiber-starch conveyor motor (6B9) has a controller (6B10) that is configured to input and output a signal (6B11) to the computer (COMP). The fiber-starch mass sensor (6B7), fiber-starch conveyor (6B5), and fiber-starch conveyor motor (6B9) are coupled so as to permit the conveyance, distribution, or output of a precise flow of fiber-starch (6B1) via a fiber-starch transfer line (6B12).

FIG. 17 displays a binding agent distribution module (6C) including a binding agent tank (6C2) that is configured to accept a binding agent (6C1). The binding agent tank (6C2) has an interior (6C3), a binding agent input (6C4), a binding agent conveyor (6C5), and a binding agent conveyor output (6C6). The binding agent tank (6C2) accepts binding agent (6C1) to the interior (6C3) and regulates and controls an engineered amount of a binding agent (6C1) downstream to be mixed to form a multifunctional composition. The binding agent conveyor (6C5) has an integrated binding agent mass sensor (6C7) that is configured to input and output a signal (6C8) to the computer (COMP). The binding agent conveyor motor (6C9) has a controller (6C10) that is configured to input and output a signal (6C11) to the computer (COMP). The binding agent mass sensor (6C7), binding agent conveyor (6C5), and binding agent conveyor motor (6C9) are coupled so as to permit the conveyance, distribution, or output of a precise flow of binding agent (6C1) via a binding agent transfer line (6C12).

FIG. 17 displays a density improving textural supplement distribution module (6D) including a density improving textural supplement tank (6D2) that is configured to accept a density improving textural supplement (6D1). The density improving textural supplement tank (6D2) has an interior (6D3), a density improving textural supplement input (6D4), a density improving textural supplement conveyor (6D5), and a density improving textural supplement conveyor output (6D6). The density improving textural supplement tank (6D2) accepts density improving textural supplement (6D1) to the interior (6D3) and regulates and controls an engineered amount of a density improving textural supplement (6D1) downstream to be mixed to form a multifunctional composition. The density improving textural supplement conveyor (6D5) has an integrated density improving textural supplement mass sensor (6D7) that is configured to input and output a signal (6D8) to the computer (COMP). The density improving textural supplement conveyor motor (6D9) has a controller (6D10) that is configured to input and output a signal (6D11) to the computer (COMP). The density improving textural supplement mass sensor (6D7), density improving textural supplement conveyor (6D5), and density improving textural supplement conveyor motor (6D9) are coupled so as to permit the conveyance, distribution, or output of a precise flow of density improving textural supplement (6D1) via a density improving textural supplement transfer line (6D12).

FIG. 17 displays a moisture improving textural supplement distribution module (6E) including a moisture improving textural supplement tank (6E2) that is configured to accept a moisture improving textural supplement (6E1). The moisture improving textural supplement tank (6E2) has an interior (6E3), a moisture improving textural supplement input (6E4), a moisture improving textural supplement conveyor (6E5), and a moisture improving textural supplement conveyor output (6E6). The moisture improving textural supplement tank (6E2) accepts a moisture improving textural supplement (6E1) to the interior (6E3) and regulates and controls an engineered amount of a moisture improving textural supplement (6E1) downstream to be mixed to form a multifunctional composition. The moisture improving textural supplement conveyor (6E5) has an integrated moisture improving textural supplement mass sensor (6E7) that is configured to input and output a signal (6E8) to the computer (COMP). The moisture improving textural supplement conveyor motor (6E9) has a controller (6E10) that is configured to input and output a signal (6E11) to the computer (COMP). The moisture improving textural supplement mass sensor (6E7), moisture improving textural supplement conveyor (6E5), and moisture improving textural supplement conveyor motor (6E9) are coupled so as to permit the conveyance, distribution, or output of a precise flow of moisture improving textural supplement (6E1) via a moisture improving textural supplement transfer line (6E12).

FIG. 17 displays an insect distribution module (6G) including an insect tank (6G2) that is configured to accept insects (6G1). The insect tank (6G2) has an interior (6G3), an insect input (6G4), an insect conveyor (6G5), and an insect conveyor output (6G6). The insect tank (6G2) accepts insects (6G1) to the interior (6G3) and regulates and controls an engineered amount of insects (6G1) downstream to be mixed to form a multifunctional composition. The insect conveyor (6G5) has an integrated insect mass sensor (6G7) that is configured to input and output a signal (6G8) to the computer (COMP). The insect conveyor motor (6G9) has a controller (6G10) that is configured to input and output a signal (6G11) to the computer (COMP). The insect mass sensor (6G7), insect conveyor (6G5), and insect conveyor motor (6G9) are coupled so as to permit the conveyance, distribution, or output of a precise flow of insects (6G1) via an insect transfer line (6G12). In embodiments, the insects may be Orthoptera order of insects including grasshoppers, crickets, cave crickets, Jerusalem crickets, katydids, weta, lubber, acrida, and locusts. However, other orders of insects, such as cicadas, ants, ants, mealworms, agave worms, worms, bees, centipedes, cockroaches, dragonflies, beetles, scorpions, tarantulas, and termites.

FIG. 17 displays a multifunctional composition mixing module (6F) including a multifunctional composition tank (6F1) that is configured to accept a mixture including *cannabis*, fiber-starch (6B1), binding agent (6C1), density improving textural supplement (6D1), moisture improving textural supplement (6E1), and insects (6G1) via a multifunctional composition transfer line (6F0).

The multifunctional composition tank (6F1) has an interior (6F2), a multifunctional composition tank input (6F3), screw conveyor (6F9), multifunctional composition output (6F10). The multifunctional composition tank (6F1) accepts *cannabis*, fiber-starch (6B1), binding agent (6C1), density improving textural supplement (6D1), moisture improving textural supplement (6E1), and insects (6G1) to the interior (6F2) and mixes, regulates, and outputs a weighed multifunctional composition stream (6F22).

The multifunctional composition tank (6F1) has a top section (6F4), bottom section (6F5), at least one side wall (6F6), with a level sensor (6F7) positioned thereon that is configured to input and output a signal (6F8) to the computer (COMP). The screw conveyor (6F9) has a multifunctional composition conveyor motor (6F11) with a controller (6F12) that is configured to input and output a signal (6F13) to the computer (COMP). From the multifunctional composition output (6F10) of the multifunctional composition tank (6F1) is positioned a multifunctional composition weigh screw (6F14) that is equipped with a multifunctional composition weigh screw input (6F15), a multifunctional composition weigh screw output (6F16), and a mass sensor (6F17) that is configured to input and output a signal (6F18) to the computer (COMP). The multifunctional composition weigh screw (6F14) also has a weigh screw motor (6F19) with a controller (6F20) that is configured to input and output a signal (6F21) to the computer (COMP).

The multifunctional composition mixing module (6000) involves mixing the *cannabis* with fiber-starch materials, binding agents, density improving textural supplements, moisture improving textural supplements, and optionally insects, to form a multifunctional composition.

The multifunctional composition may be further processed to create foodstuffs not only including ada, bagels, baked goods, biscuits, bitterballen, bonda, breads, cakes, candies, cereals, chips, chocolate bars, chocolate, coffee, cokodok, confectionery, cookies, cooking batter, corn starch mixtures, crackers, crêpes, croissants, croquettes, croutons, dolma, dough, doughnuts, energy bars, flapjacks, french fries, frozen custard, frozen desserts, frying cakes, fudge, gelatin mixes, granola bars, gulha, hardtack, ice cream, khandvi, khanom buang, krumpets, meze, mixed flours, muffins, multi-grain snacks, nachos, nian gao, noodles, nougat, onion rings, pakora, pancakes, panforte, pastas, pastries, pie crust, pita chips, pizza, poffertjes, pretzels, protein powders, pudding, rice krispie treats, sesame sticks, smoothies, snacks, specialty milk, tele-bhaja, tempura, toffee, tortillas, totopo, turkish delights, or waffles.

In embodiments, the fiber-starch materials may be comprised of singular or mixtures of cereal-grain-based materials, grass-based materials, nut-based materials, powdered fruit materials, root-based materials, tuber-based materials, or vegetable-based materials. In embodiments, the fiber-starch mass ratio ranges from between about 100 pounds of fiber-starch per ton of multifunctional composition to about 1800 pounds of fiber-starch per ton of multifunctional composition.

In embodiments, the binding agents may be comprised of singular or mixtures of agar, agave, alginin, arrowroot, carrageenan, collagen, cornstarch, egg whites, finely ground seeds, furcellaran, gelatin, guar gum, honey, katakuri starch, locust bean gum, pectin, potato starch, proteins, *psyllium* husks, sago, sugars, syrups, tapioca, vegetable gums, or xanthan gum. In embodiments, the binding agent mass ratio ranges from between about 10 pounds of binding agent per ton of multifunctional composition to about 750 pounds of binding agent per ton of multifunctional composition.

In embodiments, the density improving textural supplements may be comprised of singular or mixtures of extracted arrowroot starch, extracted corn starch, extracted lentil starch, extracted potato starch, or extracted tapioca starch. In embodiments, the density improving textural supplement mass ratio ranges from between about 10 pounds of density improving textural supplement per ton of multifunctional composition to about 1000 pounds of density improving textural supplement per ton of multifunctional composition.

In embodiments, the moisture improving textural supplements may be comprised of singular or mixtures of almonds, brazil nuts, cacao, cashews, chestnuts, coconut, filberts, hazelnuts, Indian nuts, macadamia nuts, nut butters, nut oils, nut powders, peanuts, pecans, pili nuts, pine nuts, pinon nuts, pistachios, soy nuts, sunflower seeds, tiger nuts, and walnuts. In embodiments, the moisture improving textural supplement mass ratio ranges from between about 10 pounds of moisture improving textural supplement per ton of multifunctional composition to about 1000 pounds of moisture improving textural supplement per ton of multifunctional composition.

In embodiments, insects may be added to the multifunctional composition. In embodiments, the insect mass ratio ranges from between about 25 pounds of insects per ton of multifunctional composition to about 1500 pounds of insects per ton of multifunctional composition.

In embodiments, the *cannabis* ratio ranges from between about 25 pounds of *cannabis* per ton of multifunctional composition to about 1800 pounds of *cannabis* per ton of multifunctional composition.

It will be appreciated that the foregoing examples, given for purposes of illustration, are not to be construed as limiting the scope of this disclosure. Although only a few exemplary embodiments of this disclosure have been described in detail above, those skilled in the art will readily appreciate that many variation of the theme are possible in the exemplary embodiments without materially departing from the novel teachings and advantages of this disclosure. Accordingly, all such modifications are intended to be included within the scope of this disclosure that is defined in the following claims and all equivalents thereto. Further, it is recognized that many embodiments may be conceived in the design of a given system that do not achieve all of the advantages of some embodiments, yet the absence of a particular advantage shall not be construed to necessarily mean that such an embodiment is outside the scope of the present disclosure.

Thus, specific systems and methods of an automated fluidized bed level and density measurement system have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the foregoing text sets forth a detailed description of numerous different embodiments of the disclosure, it should be understood that the scope of the disclosure is defined by the words of the claims set forth at the end of this patent. The detailed description is to be construed as exemplary only and does not describe every possible embodiment of the disclosure because describing every possible embodiment would be impractical, if not impossible. Numerous alternative embodiments could be implemented, using either current technology or technology developed after the filing date of this patent, which would still fall within the scope of the claims defining the disclosure.

Thus, many modifications and variations may be made in the techniques and structures described and illustrated herein without departing from the spirit and scope of the present disclosure. Accordingly, it should be understood that the methods and apparatus described herein are illustrative only and are not limiting upon the scope of the disclosure.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

LISTING OF REFERENCE NUMERALS farming superstructure system (FSS)
liquid distribution module (LDM)
plant growing module (PGM)
first growing assembly (100, 100', 100", 100''')
first interior (101)
top (102, 102')
bottom (103, 103')
longitudinal axis (AX1)
fabric (104, 104')
upper-section (105)
lower-section (106)
*cannabis* (107)
lights (L1)
controller (CL1)
signal (XL1)
fan (FN1)
controller (CF1)
signal (XF1)
liquid distributor (108)
restrictions (109)
drain port (110, 110')
drain conduit (111, 111')
support connection (111X)
first drain connection (112, 112')
first liquid supply conduit (113, 113')
support connection (113X, 113X')
liquid input (114, 114')
first smaller diameter (D2)
first connection (X1)
first reducer (R1)
first growing assembly liquid supply valve (V3, V3')
controller (CV3)
signal (XV3)
back-flow prevention valve (BF1)
temperature sensor (T1)
signal (XT1)
upper temperature sensor (T1C)
signal (XT1C)
partition temperature sensor (T1B)
signal (XT1B)
lower temperature sensor (T1A)
signal (XT1A)
CO2 input (115)
CO2 header connection (115X)
CO2 supply conduit (116)
second carbon dioxide supply valve (V8)
controller (CV8)
signal (XV8)
CO2 flow sensor (FC1)
signal (XFC1)
gas quality sensor (GC1)
signal (XGC1)
second growing assembly (200, 200',200",200''')
second interior (201)
top (202, 202')
bottom (203, 203')
longitudinal axis (AX2)
fabric (204, 204')
upper-section (205)
lower-section (206)
*cannabis* (207)
lights (L2)
controller (CL2)
signal (XL2)
fan (FN2)
controller (CF2)
signal (XF2)
liquid distributor (208)
restrictions (209)
drain port (210, 210')
drain conduit (211, 211')
support connection (211X)
second drain connection (212, 212')
second liquid supply conduit (213, 213')
support connection (213X, 213X')
liquid input (214, 214')
second smaller diameter (D3)
second connection (X2)
second reducer (R2)
second growing assembly liquid supply valve (V4, V4')
controller (CV4)
signal (XV4)
back-flow prevention valve (BF2)
temperature sensor (T2)
signal (XT2)
upper temperature sensor (T2C)
signal (XT2C)
partition temperature sensor (T2B)
signal (XT2B)
lower temperature sensor (T2A)
signal (XT2A)
CO2 input (215)
CO2 header connection (215X)
CO2 supply conduit (216)
third carbon dioxide supply valve (V9)
controller (CV9)
signal (XV9)
CO2 flow sensor (FC2)
signal (XFC2)
gas quality sensor (GC2)
signal (XGC2)
carbon dioxide tank (CO2T)
carbon dioxide (CO2)
first carbon dioxide supply valve (V10)
carbon dioxide pressure sensor (CO2P)
carbon dioxide supply header (CO2H)
common drain conduit (517)
drain input (518)
common reservoir (500, 500')
reservoir pH sensor (PH0)
signal (XPH0)
reservoir temperature sensor (T0)
signal (XT0)
reservoir oxygen emitter (EZ)

signal (XEZ)
reservoir electrical conductivity sensor (E1)
signal (XE1)
upper level switch (LH)
signal (XLH)
lower level switch (LL)
signal (XLL)
reservoir recirculation pump (P0)
reservoir recirculation outlet (510)
reservoir recirculation pump suction conduit (512)
reservoir recirculation pump discharge conduit (514)
reservoir recirculation filter (F3)
reservoir heat exchanger (HX2)
reservoir recirculation inlet (516)
liquid supply header (300, 300')
diameter (D1)
reservoir transfer outlet (302)
pump suction conduit (303)
pump discharge conduit (304)
pump (P1)
motor (MP1)
controller (CP1)
signal (XP1)
pump (P1')
first filter (F1)
first filter inlet valve (FV1)
first filter outlet valve (FV2)
second filter (F2)
second filter inlet valve (FV3)
second filter outlet valve (FV4)
filter back-flush supply valve (FV5)
filter back-flush discharge valve (FV6)
filter back-flush supply conduit (306)
filter back-flush outlet (307)
filter back-flush pump (308)
filter back-flush discharge conduit (309)
level control valve (LCV)
controller (CCV)
signal (XCV)
level control discharge conduit (310)
connection (311)
filter (F4)
waste treatment unit (312)
ozone unit (313)
filter inlet pressure sensor (P2)
signal (XP2)
filter discharge pressure sensor (P3)
signal (XP3)
pressure tank (PT)
growing assembly liquid supply valve (V1)
controller (CV1)
signal (XV1)
liquid flow sensor (F0)
signal (XF0)
electrical conductivity sensor (E2)
signal (XE2)
first oxygen emitter (EZ1)
signal (XEZ1)
second oxygen emitter (EZ2)
signal (XEZ2)
third oxygen emitter (EZ3)
signal (XEZ3)
liquid heat exchanger (HX3)
liquid temperature sensor (T3)
signal (XT3)
water supply (01)
water supply conduit (02)
first water inlet (03)
second water inlet (03')
third water inlet (03")
fourth water inlet (03''')
first water treatment unit (A1)
first input (04)
first output (05)
first contaminant depleted water (06)
positively charged ion depleted water (06A)
filter (y1)
activated carbon (y2)
adsorbent (y3)
cation (y4)
anion (y5)
polishing unit (y6)
low voltage shut-off switch (LVV-1)
low voltage shut-off switch (LVV-2)
second water treatment unit (A2)
second input (07)
second output (08)
second contaminant depleted water (09)
negatively charged ion depleted water (09A)
third water treatment unit (A3)
third input (10)
third output (11)
third contaminant depleted water (12)
undesirable compounds depleted water (12A)
first water pressure sensor (13)
water input conduit (14)
contaminant-laden water (15)
water supply valve (16)
controller (17)
solution tank (18)
interior (19)
water input (20)
diptube (20a)
water supply conduit (21)
water output (22)
water discharge conduit (23)
water supply pump (24)
high level sensor (25)
low level sensor (26)
second water pressure sensor (27)
pressurized liquid transfer conduit (28)
first pressurized liquid transfer conduit (28A)
second pressurized liquid transfer conduit (28B)
third pressurized liquid transfer conduit (28C)
fourth pressurized liquid transfer conduit (28D)
pressurized liquid (29)
first split pressurized liquid (29A)
second split pressurized liquid (29B)
third split pressurized liquid (29C)
fourth split pressurized liquid (29D)
flow sensor (30)
water quality sensor (33)
oxygen emitter (35)
oxygen emitter connection (36)
mixer (38)
motor (39)
load cell (40)
contaminant depleted water valve (V0A)
controller (CV0A)
signal (XV0A)
contaminant depleted water valve (V0B)
controller (CV0B)
signal (XV0B)
contaminant depleted water valve (V0C)

controller (CV0C)
signal (XV0C)
contaminant depleted water valve (V0D)
controller (CV0D)
signal (XV0D)
water heat exchanger (HX1)
macro-nutrient supply tank (600)
macro-nutrients (601)
macro-nutrient transfer conduit (602)
macro-nutrient supply valve (V5)
controller (CV5)
signal (XV5)
macro-nutrient flow sensor (F5)
signal (XF5)
macro-nutrient reservoir input (Z1)
input (603)
load cell (604)
mixer (605)
diptube (606)
micro-nutrient supply tank (700)
micro-nutrients (701)
micro-nutrient transfer conduit (702)
micro-nutrient supply valve (V6)
controller (CV6)
signal (XV6)
micro-nutrient flow sensor (F6)
signal (XF6)
micro-nutrient reservoir input (Z2)
input (703)
load cell (704)
mixer (705)
diptube (706) (not shown)
pH adjustment solution supply tank (800)
pH adjustment solution (801)
pH adjustment solution transfer conduit (802)
pH adjustment solution supply valve (V7)
controller (CV7)
signal (XV7)
pH adjustment solution flow sensor (F7)
signal (XF7)
pH adjustment solution reservoir input (Z3)
input (803)
load cell (804)
mixer (805)
diptube (806) (not shown)
first vertically stacked system (1500)
second vertically stacked system (1500')
third vertically stacked system (1500")
fourth vertically stacked system (1500''')
first vertical support structure (VSS1)
first vertical support structure (VSS1')
second vertical support structure (VSS2)
second vertical support structure (VSS2')
first horizontal support structure (SS1)
first horizontal support structure (SS1')
second horizontal support structure (SS2)
second horizontal support structure (SS2')
base height (H0)
liquid level (LIQ)
reservoir height (H500)
first base height (H100A)
first partition height (H100B)
first growing assembly height (H100C)
second base height (H200A)
second partition height (H200B)
second growing assembly height (H200C)
total height (HT)

width (W1500)
spacing (1500S)
enclosure (ENC)
interior (ENC1)
liquid level (LIQ')
reservoir height (H500')
first base height (H100A')
first partition height (H100B')
first top height (H100C')
second base height (H200A')
second partition height (H200B')
second top height (H200C')
total height (HT')
temperature control unit (TCU)
first side wall (1W)
second side wall (2W)
third side wall (3W)
fourth side wall (4W)
top (5W)
floor (1FL)
air input (Q1)
air supply entry conduit (Q2)
air supply (Q3)
inlet distributor (Q4)
air heater (HXA)
heat transfer medium input (Q5)
heat transfer medium output (Q6)
first humidity sensor (Q8)
signal (Q9)
second humidity sensor (Q10)
signal (Q11)
air supply fan (Q12)
air supply fan motor (Q13)
controller (Q14)
signal (Q15)
water (Q16)
water transfer conduit (Q17)
water input valve (Q18)
water flow sensor (Q19)
signal (Q20)
water and gas mixing section (Q21)
air output (Q22)
air discharge exit conduit (Q23)
air filter (Q24)
condensate (Q25)
enclosure condensate input (Q26)
condensate conduit (Q27)
common tank condensate input (Q28)
first undesirable compounds-laden condensate (Q29)
humidity control unit (HCU)
compressor (Q30)
refrigerant (Q31)
condenser (Q32)
metering device (Q33)
evaporator (Q34)
fan (Q35)
motor (Q36)
controller (Q37)
signal (Q38)
condensate (Q39)
second undesirable compounds-laden condensate (Q40)
enclosure temperature sensor (QT0)
signal (QXT0)
enclosure humidity sensor (QH0)
signal (QXH0)
heat exchanger inlet gas temperature sensor (QT1)
signal (QXT1)

heat exchanger outlet gas temperature sensor (QT2)
signal (QXT2)
heat exchanger heat transfer medium inlet temperature (QT3)
signal (QXT3)
heat exchanger heat transfer medium outlet temperature (QT4)
signal (QXT4)
computer (COMP)
memory (MEM)
code (CODE)
I/O (input output interface)
processor (PROC)
width (104W)
length (104L)
supports (104A)
multi-point temperature sensor (MPT100)
first signal (XMPT1)
second signal (XMPT2)
third signal (XMPT3)
fourth signal (XMPT4)
fifth signal (XMPT5)
sixth signal (XMPT6)
seventh signal (XMPT7)
eighth signal (XMPT8)
base width (104W0)
first distance (104W1)
second distance (104W2)
third distance (104W)
fourth distance (104W4)
fifth distance (104W5)
sixth distance (104W6)
seventh distance (104W7)
eighth distance (104W8)
analyzer (AZ0
analyzer signal (XAZ)
growing medium (GM1, GM2)

What is claimed is:

1. A method to grow a plurality of *cannabis* plants, the method comprises:
growing said plurality of *cannabis* plants within an interior of an enclosure; condensing water vapor from within said interior of said enclosure to produce condensate; mixing said condensate with an additional source of water to produce a water mixture; supplying said water mixture to said plurality of *cannabis* plants, wherein:
said additional source of water includes treated water, said treated water comprises water treated by a water treatment system, said water treatment system includes one or more water treatment systems selected from the group consisting of an ultraviolet unit, an ozone unit, a microwave unit, activated carbon, a cation, an anion, an adsorbent, and a membrane.

2. The method according to claim 1, wherein:
said plurality of *cannabis* plant are grown within a plurality of growing assemblies, wherein said plurality of growing assemblies grow said plurality of *cannabis* plants in a growing medium.

3. The method according to claim 2, wherein:
said growing medium includes one or more growing mediums selected from the group consisting of rockwool, perlite, amorphous volcanic glass, vermiculite, clay, clay pellets, LECA (lightweight expanded clay aggregate), coco-coir, fibrous coconut husks, soil, dirt, peat, peat moss, sand, soil, compost, manure, fir bark, foam, gel, oasis cubes, lime, gypsum, and quartz.

4. The method according to claim 3, wherein:
said growing medium comprises a microorganism, said microorganism includes one or more microorganisms selected from the group consisting of bacteria, diazotroph bacteria, diazotrop archaea, *Azotobacter vinelandii*, fungi, arbuscular mycorrhizal fungi, *Glomus etunicatum*, *Glomus intraradices*, *Rhizophagus irregularis*, and *Glomus mosseae*.

5. The method according claim 3, comprising:
draining at least a portion of said water mixture from said plurality of growing assemblies to produce drained water, and supplying at least a portion of said drained water back to said plurality of growing assemblies.

6. The method according claim 1, comprising:
prior to supplying said water mixture to said plurality of *cannabis* plants, passing said water mixture through a valve.

7. The method according to claim 1, comprising:
prior to supplying said water mixture to said plurality of *cannabis* plants, passing said water mixture through a pump.

8. The method according to claim 1, comprising:
prior to supplying said water mixture to said plurality of *cannabis* plants, oxygenating said water mixture to produce microbubbles and/or nanobubbles of oxygen suspended within said water mixture.

9. The method according to claim 1, comprising:
prior to supplying said water mixture to said plurality of *cannabis* plants, mixing said water mixture and with an additive, said additive includes one or more additives selected from the group consisting of a macro-nutrient, a micro-nutrient, a carbohydrate, an enzyme, a microorganism, and a vitamin;
wherein:
said macro-nutrient includes one or more macro-nutrients selected from the group consisting of nitrogen, phosphorus, potassium, calcium, magnesium, and sulfur;
said micro-nutrient includes one or more micro-nutrients selected from the group consisting of iron, manganese, boron, molybdenum, copper, zinc, sodium, chlorine, and silicon;
said carbohydrate includes one or more carbohydrates selected from the group consisting of sugar, sucrose, molasses, and a plant syrup;
said enzyme includes one or more enzymes selected from the group consisting of an amino acid, orotidine 5'-phosphate decarboxylase, OMP decarboxylase, glucanase, beta-glucanase, cellulase, and xylanase;
said microorganism includes one or more microorganisms selected from the group consisting of bacteria, diazotroph bacteria, diazotrop archaea, *Azotobacter vinelandii*, fungi, arbuscular mycorrhizal fungi, *Glomus etunicatum*, *Glomus intraradices*, *Rhizophagus irregularis*, and *Glomus mosseae*;
said vitamin includes one or more vitamins selected from the group consisting of vitamin B, vitamin C, vitamin D, and vitamin E.

10. The method according claim 1, comprising:
prior to supplying said water mixture to said plurality of *cannabis* plants, mixing said water mixture with an acid.

11. The method according to claim 1, comprising:
harvesting said plurality of *cannabis* plants to produce a plurality of harvested *cannabis* plants.

12. The method according to claim 11, comprising:
after harvesting said plurality of *cannabis* plants, grinding at least a portion of said plurality of harvested *cannabis* plants.

13. The method according to claim 11, comprising:
after harvesting said plurality of *cannabis* plants, mixing at least a portion of said plurality of harvested *cannabis* plants with an ingredient, said ingredient includes one or more ingredients selected from the group consisting of a fiber-starch material, a binding agent, a density improving textural supplement, a moisture improving textural supplement, and insects; wherein:
said fiber-starch material includes one or more fiber-starch materials selected from the group consisting of a cereal-grain-based material, a grass-based material, a nut-based material, a powdered fruit material, a root-based material, a tuber-based material, and a vegetable-based material;
said binding agent includes one or more binding agents selected from the group consisting of agar, agave, alginin, arrowroot, carrageenan, collagen, cornstarch, egg whites, finely ground seeds, furcellaran, gelatin, guar gum, honey, katakuri starch, locust bean gum, pectin, potato starch, protein, *psyllium* husks, sago, sugar, syrup, tapioca, vegetable gum, and xanthan gum;
said density improving textural supplement includes one or more density improving textural supplements selected from the group consisting of extracted arrowroot starch, extracted corn starch, extracted lentil starch, extracted potato starch, and extracted tapioca starch;
said moisture improving textural supplement includes one or more moisture improving textural supplements selected from the group consisting of almonds, brazil nuts, cacao, cashews, chestnuts, coconut, filberts, hazelnuts, Indian nuts, macadamia nuts, nut butter, nut oil, nut powder, peanuts, pecans, pili nuts, pine nuts, pinon nuts, pistachios, soy nuts, sunflower seeds, tiger nuts, and walnuts; and
said insects includes one or more insects selected from the group consisting of Orthoptera order of insects, grasshoppers, crickets, katydids, weta, lubber, acrida, locusts, cicadas, ants, mealworms, agave worms, worms, bees, centipedes, cockroaches, dragonflies, beetles, scorpions, tarantulas, and termites.

14. The method according to claim 1, comprising:
growing said plurality of *cannabis* plants within said interior of said enclosure, and evacuating additional water vapor from within said interior of said enclosure to reduce a humidity within said interior of said enclosure.

15. The method according to claim 1, comprising:
growing said plurality of *cannabis* plants within said interior of said enclosure, and evacuating a gas from within said interior of said enclosure, and filtering said gas.

16. The method according to claim 15, comprising:
after filtering said gas, introducing said gas back to said interior of said enclosure.

17. The method according to claim 1, wherein:
said interior of said enclosure comprises a shipping container and/or a building.

18. The method according to claim 1, comprising:
providing a source of pressurized carbon dioxide; and
reducing a pressure of said pressurized carbon dioxide by flowing said pressurized carbon dioxide through at least one valve, to produce a pressure-reduced source of carbon dioxide having a pressure lesser than said pressure of said pressurized carbon dioxide; and
introducing said pressure-reduced source of carbon dioxide to said interior of said enclosure.

19. The method according to claim 1, wherein:
prior to supplying said water mixture to said plurality of *cannabis* plants, subjecting at least a portion of said water mixture to an ultraviolet water treatment system.

20. The method according to claim 11, wherein:
said plurality of harvested *cannabis* plants include *cannabis* flowers and *cannabis* leaves; and
trimming at least a portion of said *cannabis* leaves from at least a portion of said *cannabis* flowers to produce trimmed *cannabis* flowers.

21. The method according to claim 1, wherein:
said condensate is mixed with said treated water within said water treatment system.

22. The method according to claim 1, wherein:
prior to supplying said water mixture to said plurality of *cannabis* plants, treating said water mixture in an additional water treatment system, said additional water treatment system includes one or more additional water treatment systems selected from the group consisting of a filter, an ozone unit, a microwave unit, activated carbon, a cation, an anion, an adsorbent, and a membrane.

23. A method to grow a plurality of *cannabis* plants, the method comprises:
growing said plurality of *cannabis* plants within an interior of an enclosure;
condensing water vapor from within said interior of said enclosure to produce condensate;
mixing said condensate with an additional source of water to produce a water mixture, said additional source of water comprises treated water, wherein said treated water comprises water treated by a water treatment system, said water treatment system includes one or more water treatment systems selected from the group consisting of a filter, an ultraviolet unit, an ozone unit, a microwave unit, activated carbon, a cation, an anion, an adsorbent, and a membrane;
treating said water mixture in an additional water treatment system to produce an additionally treated water mixture, wherein said additional water treatment system includes one or more additional water treatment systems selected from the group consisting of a filter, an ultraviolet unit, an ozone unit, a microwave unit, activated carbon, a cation, an anion, an adsorbent, and a membrane; and
supplying said additionally treated water mixture to said plurality of *cannabis* plants.

24. The method according to claim 23, comprising:
prior to supplying said additionally treated water mixture to said plurality of *cannabis* plants, converting said additionally treated water mixture from a liquid into a mist and/or a vapor; and
supplying said additionally treated water mixture as said mist and/or said vapor to said plurality of *cannabis* plants as additional water vapor to increase and/or maintain a moisture and/or a humidity within said interior of said enclosure.

25. The method according to claim 23, wherein:
said plurality of cannabis plants are grown within a plurality of growing assemblies, wherein said plurality of growing assemblies grow said plurality of *cannabis* plants in a growing medium;

said growing medium includes one or more growing mediums selected from the group consisting of rockwool, perlite, amorphous volcanic glass, vermiculite, clay, clay pellets, LECA (lightweight expanded clay aggregate), coco-coir, fibrous coconut husks, soil, dirt, peat, peat moss, sand, soil, compost, manure, fir bark, foam, gel, oasis cubes, lime, gypsum, and quartz; and draining at least a portion of said additionally treated water mixture from said plurality of growing assemblies to produce drained water; and supplying at least a portion of said drained water to said plurality of growing assemblies.

26. The method according claim 23, comprising:

prior to supplying said additionally treated water mixture to said plurality of *cannabis* plants, mixing said additionally treated water mixture and with an additive, said additive includes one or more additives selected from the group consisting of a macro-nutrient, a micro-nutrient, a carbohydrate, an enzyme, and a vitamin; wherein:

said macro-nutrient includes one or more macro-nutrients selected from the group consisting of nitrogen, phosphorus, potassium, calcium, magnesium, and sulfur;

said micro-nutrient includes one or more micro-nutrients selected from the group consisting of iron, manganese, boron, molybdenum, copper, zinc, sodium, chlorine, and silicon;

said carbohydrate includes one or more carbohydrates selected from the group consisting of sugar, sucrose, molasses, and a plant syrup;

said enzyme includes one or more enzymes selected from the group consisting of an amino acid, orotidine 5'-phosphate decarboxylase, OMP decarboxylase, glucanase, beta-glucanase, cellulase, and xylanase;

said vitamin includes one or more vitamins selected from the group consisting of vitamin B, vitamin C, vitamin D, and vitamin E.

27. The method according to claim 23, comprising:

harvesting said plurality of cannabis plants to produce a plurality of harvested *cannabis* plants; and mixing at least a portion of said plurality of harvested cannabis plants with an ingredient, said ingredient includes one or more ingredients selected from the group consisting of a fiber-starch material, a binding agent, a density improving textural supplement, a moisture improving textural supplement, and insects; wherein:

said fiber-starch material includes one or more fiber-starch materials selected from the group consisting of a cereal-grain-based material, a grass-based material, a nut-based material, a powdered fruit material, a root-based material, a tuber-based material, and a vegetable-based material;

said binding agent includes one or more binding agents selected from the group consisting of agar, agave, alginin, arrowroot, carrageenan, collagen, cornstarch, egg whites, finely ground seeds, furcellaran, gelatin, guar gum, honey, katakuri starch, locust bean gum, pectin, potato starch, protein, psyllium husks, sago, sugar, syrup, tapioca, vegetable gum, and xanthan gum;

said density improving textural supplement includes one or more density improving textural supplements selected from the group consisting of extracted arrowroot starch, extracted corn starch, extracted lentil starch, extracted potato starch, and extracted tapioca starch;

said moisture improving textural supplement includes one or more moisture improving textural supplements selected from the group consisting of almonds, brazil nuts, cacao, cashews, chestnuts, coconut, filberts, hazelnuts, Indian nuts, macadamia nuts, nut butter, nut oil, nut powder, peanuts, pecans, pili nuts, pine nuts, pinon nuts, pistachios, soy nuts, sunflower seeds, tiger nuts, and walnuts;

said insects includes one or more insects selected from the group consisting of Orthoptera order of insects, grasshoppers, crickets, katydids, weta, lubber, acrida, locusts, cicadas, ants, mealworms, agave worms, worms, bees, centipedes, cockroaches, dragonflies, beetles, scorpions, tarantulas, and termites.

* * * * *